US008811188B1

(12) United States Patent
Bagchi et al.

(10) Patent No.: US 8,811,188 B1
(45) Date of Patent: Aug. 19, 2014

(54) PROTOCOL FOR SECURE AND ENERGY-EFFICIENT REPROGRAMMING OF WIRELESS MULTI-HOP SENSOR NETWORKS

(75) Inventors: Saurabh Bagchi, West Lafayette, IN (US); Ness B. Shroff, West Dublin, OH (US); Issa M. I. Khalil, Al Ain (AE); Rajesh K. Panta, West Lafayette, IN (US); Mark D. Krasniewski, Austin, TX (US); James V. Krogmeier, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 152 days.

(21) Appl. No.: 13/361,639

(22) Filed: Jan. 30, 2012

Related U.S. Application Data

(63) Continuation of application No. 11/758,636, filed on Jun. 5, 2007, now Pat. No. 8,107,397.

(60) Provisional application No. 60/810,962, filed on Jun. 5, 2006, provisional application No. 60/910,533, filed on Apr. 6, 2007.

(51) Int. Cl.
| | |
|---|---|
| *H04L 12/26* | (2006.01) |
| *H04W 84/02* | (2009.01) |
| *G06F 9/445* | (2006.01) |
| *H04W 52/02* | (2009.01) |
| *H04L 12/56* | (2006.01) |

(52) U.S. Cl.
CPC ............. *H04W 84/02* (2013.01); *G06F 8/65* (2013.01); *H04W 52/02* (2013.01); *H04L 45/02* (2013.01)
USPC ........... 370/241; 370/254; 370/310; 370/465; 717/172

(58) Field of Classification Search
None
See application file for complete search history.

(56) References Cited

U.S. PATENT DOCUMENTS

| | | | | |
|---|---|---|---|---|
| 2003/0233538 | A1* | 12/2003 | Dutertre ....................... | 713/151 |
| 2004/0039925 | A1* | 2/2004 | McMillan et al. ............ | 713/189 |
| 2006/0077918 | A1 | 4/2006 | Mao et al. | |
| 2007/0258508 | A1* | 11/2007 | Werb et al. .................... | 375/140 |

OTHER PUBLICATIONS

Hui, J.W. et al., "The Dynamic Behavior of a Data Dissemination Protocol for Network Programming at Scale," *Proceedings of the 2nd International Conference on Embedded Networked Sensor Systems*, Baltimore, MD, Nov. 3-5, 2004, (14 pages).

(Continued)

*Primary Examiner* — Kevin C Harper
(74) *Attorney, Agent, or Firm* — Maginot, Moore & Beck LLP

(57) ABSTRACT

A protocol for optimizing the energy for code upload to sensors in a wireless sensor network and speeding up the dissemination if multiple sources of code are available. Energy optimization is achieved by equipping each node with limited non-local topology information, which it uses to determine the time when it can sleep since code is not being distributed in its vicinity. Another aspect of the invention is a protocol that facilitates secure upload of code in the wireless sensor network. The secure communication protocol divides the sensor field into control groups each with a control node, and manages data exchange between nodes within a control group through the mediation of a control head which provides the common key. The keys are refreshed periodically and the control nodes are changed periodically to enhance security. The protocol facilitates secure communication between sensor nodes despite the compromise of other nodes in the network.

6 Claims, 18 Drawing Sheets

Three level hierarchy for key management in SECOS

(56) References Cited

OTHER PUBLICATIONS

Bruce Schneier, *Applied Cryptography, Second Edition: Protocols, Algorithms, and Source Code in C*" John Wiley & Sons, New York, NY, 2nd edition, © 1996, title page, copyright page and pp. 189, 205, 206.

William Stallings, *Cryptography and Network Security: Principles and Practices*, 4th edition, Pearson Prentice Hall, Upper Saddle River, NJ, © 2006, title page, copyright page and pp. 181-189.

NIST Special Publication 800-67, Version 1.1, "Recommendation for the Triple Data Encryption Algorithm (TDEA) Block Cipher," May 2004, revised May 19, 2008, 40 pgs.

Khalil, I. et al., "LiteWorp: A Lightweight Countermeasure for the Wormhole Attack in Multihop Wireless Networks," *International Conference on Dependable Systems and Networks (DSN '05)*, Yokohama, Japan, Jun. 28-Jul. 1, 2005, pp. 612-621.

Khalil, I. et al., "DICAS: Detection, Diagnosis and Isolation of Control Attacks in Sensor Networks," *IEEE/CreateNet SecureComm 2005*, Athens, Greece, Sep. 5-9, 2005, pp. 89-100.

Marti, S. et al., "Mitigating Routing Misbehavior in Mobile Ad Hoc Networks,"*ACM/IEEE International Conference on Mobile Computing and Networking*, Boston, MA, Aug. 6-11, 2000, pp. 255-265.

Karlof, C. et al., "Secure Routing in Sensor Networks: Attacks and Countermeasures," *Proceedings of the IEEE International Workshop on Sensor Network Protocols and Applications*, May 11, 2003, pp. 113-127.

Noel, S. et al., "Modern Intrusion Detection, Data Mining, and Degrees of Attack Guilt," *Applications of Data Mining in Computer Security*, Daniel Barbara and Sushil Jajodia (eds.), Kluwer, 2002.

Lin, L, et al., "Asymptotically Optimal Power-Aware Routing for Multihop Wireless Networks With Renewable Energy Sources," *Proceedings of IEEE INFOCOM '05*, Miami, FL, Mar. 2005, vol. 2, pp. 1262-1272.

Chlipala, A. et al., "Deluge: Data Dissemination for Network Reprogramming at Scale," c. 2004, available at: http://www.cs.berkeley.edu/~jwhui/research/deluge/cs262/cs262a-report.pdf, 13 pgs.

Khalil, I., et al., "SECOS: Key Management for Scalable and Energy Efficient Crypto on Sensors," CERIAS Tech Report, TR-2003-330, 2003, 25 pgs.

Lu, Y. et al., Abstract, Purdue University Computing Research Institute Fall 2004 Seminar Series, Seminar #2, Sep. 15, 2004, 2 pgs.

Khalil, I., et al., "Secure Communication in Sensor Networks Resistant to Node Compromise," Slide Show Presentation at Purdue University Research Institute Fall 2004 Seminar Series, Seminar #2, Sep. 15, 2004, 9 pgs.

Škraba, P., et al., "RFID Wake-up in Event Driven Sensor Networks," *SIGCOMM 2004*, Portland, Oregon, Aug. 30-Sep. 3, 2004, 1 pg.

Kulkarni, S. et al., "MNP: Multihop Network Reprogramming Service for Sensor Networks," *25th IEEE International Conference on Distributed Computing Systems*, Columbus, OH, Jun. 6-10, 2005, pp. 7-16.

Levis, P. et al., "Trickle: A Self-Regulating Algorithm for Code Propogation and Maintenance in Wireless Sensor Network," *Proceedings of the First USENIX/ACM Symposium on Networked Systems Design and Implementation (NSDI 2004)*, San Francisco, CA, Mar. 29-31, 2004, pp. 15-28.

Malhotra, N. et al., "Location Estimation in Ad Hoc Networks with Directional Antennas," *25th IEEE International Conference on Distributed Computing Systems*, Columbus, OH, Jun. 6-10, 2005, pp. 633-642.

Khanna, G. et al., "Fault Tolerant Energy Aware Data Dissemination Protocol in Sensor Networks," *International Conference on Dependable Systems and Networks*, Florence, Italy, Jun. 28-Jul. 1, 2004, pp. 795-804.

Shnayder, V. et al., "Simulating the Power Consumption of Large-Scale Sensor Network Applications," *Proceedings of the 2nd International Conference on Embedded Networked Sensor Systems*, Nov. 3-5, 2004, Baltimore, MD, pp. 188-200.

Wheeler, D. et al., "TEA, a Tiny Encryption Algorithm," *Fast Software Encryption: Second International Workshop*, Leuven, Belgium, Dec. 14-16, 1994, pp. 363-366.

Rivest, R. L., "The RC5 Encryption Algorithm," *Fast Software Encryption: Second International Workshop*, Leuven, Belgium, Dec. 12-16, 1994, pp. 86-96.

Deng, J. et al., "A Performance Evaluation of Intrusion-Tolerant Routing in Wireless Sensor Networks," *Proc. of IEEE 2nd International Workshop on Information Processing in Sensor Networks (IPSN'03)*, Palo Alto, CA, Apr. 22-23, 2003, pp. 349-364.

Bruschi, D. et al., "Secure Multicast in Wireless Networks of Mobile Hosts: Protocols and Issues," *Mobile Networks and Applications*, vol. 7, No. 6, Dec. 2002, pp. 503-511.

Newsome, J et al., "The Sybil Attack in Sensor Networks: Analysis & Defenses," *Proc. of 3rd IEEE/ACM Information Processing in Sensor Networks (IPSN '04)*, Berkeley, CA, Apr. 26-27, 2004, pp. 259-268.

Krasniewski, M. et al., "TIBFIT: Trust Index Based Fault Tolerance for Arbitrary Data Faults in Sensor Networks," *International Conference on Dependable Systems and Networks (DSN '05)*, Yokohama, Japan, Jun. 28-Jul. 1, 2005, pp. 672-681.

Du, W. et al., "A Pairwise Key PreDistribution Scheme for Wireless Sensor Networks," *ACM Transactions on Information and System Security*, vol. 8, No. 2, May 2005, pp. 228-258.

Kwon, S. et al., "Energy-Efficient Interference-Based Routing for Multi-hop Wireless Networks" *INFOCOM 2006. 25th IEEE International Conference on Computer Communications Proceedings*, Barcelona Spain, Apr. 23-29, 2006, pp. 1-12.

Intanagonwiwat, C. et al., "Directed Diffusion for Wireless Sensor Networking," *IEEE/ACM Trans. Netw.*, vol. 11, No. 1, Feb. 2003, pp. 1-15.

Kim, S. et al.,"SAFE: A Data Dissemination Protocol for Periodic Updates in Sensor Networks," *Proceedings of the 23rd International Conference on Distributed Computing Systems Workshops*, Providence, RI, May 19-22, 2003, pp. 228-234.

Ye, F.et al., "A Two-Tier Data Dissemination Model for Large-Scale Wireless Sensor Networks," *Proceedings Of The 8th Annual International Conference on Mobile Computing and Networking*, Atlanta, GA, Sep. 23-28, 2002, pp. 148-159.

Kulik, J. et al., "Negotiation-Based Protocols for Disseminating Information in Wireless Sensor Networks," *Wirel. Netw.*, vol. 8, No. 2-3, Mar.-May 2002, pp. 169-185.

Khanna, G. et al., "Fault Tolerant Energy Aware Data Dissemination Protocol in Sensor Networks," *2004 International Conference on Dependable Systems and Networks*, Florence, Italy, Jun. 28-Jul. 1, 2004 , pp. 795-804.

Heinzelman, W. et al., "An Application-Specific Protocol Architecture for Wireless Microsensor Networks," *IEEE Transactions on Wireless Communications*, vol. 1, No. 4, Oct. 2002, pp. 660-670.

Lindsey, S. et al., "Data Gathering Algorithms in Sensor Networks Using Energy Metrics," *IEEE Transactions on Parallel and Distributed Systems*, vol. 13, No. 9, Sep. 2002, pp. 924-935.

Cabuk, S. et al., "Analysis and Evaluation of Topological and Application Characteristics of Unreliable Mobile Wireless Ad-hoc Network," *10th IEEE Pacific Rim Dependable Computing Conference (PRDC '04)*, Mar. 3-5, 2004, Papeete, Tahiti, pp. 248-257.

Khosla, R. et al., "Performance Comparison of SPIN Based Push-Pull Protocols," *IEEE Wireless Communications and Networking Conference (WCNC)*, Hong Kong, Mar. 11-15, 2007, 6 pgs.

Daemen, J. et al., "AES Proposal: Rijndael," c. Mar. 9, 1999, 47 pgs.

\* cited by examiner

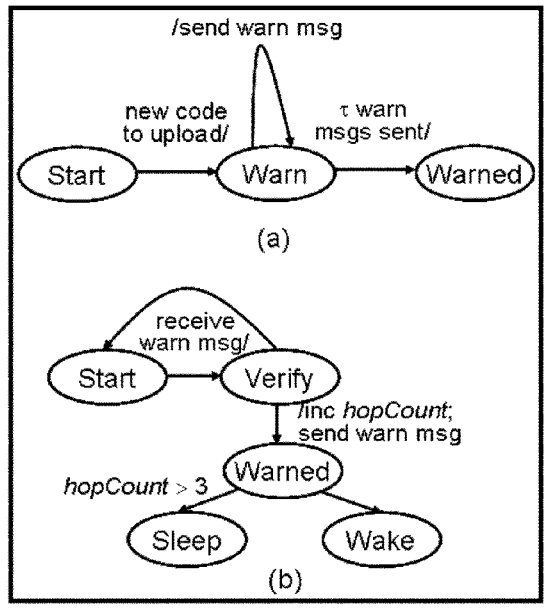
Figure 1. State machine in blitzkrieg phase. The labels on the edges are of the form a/b where a is the input that triggers the state transition and b is the output that is generated as part of the state transition.
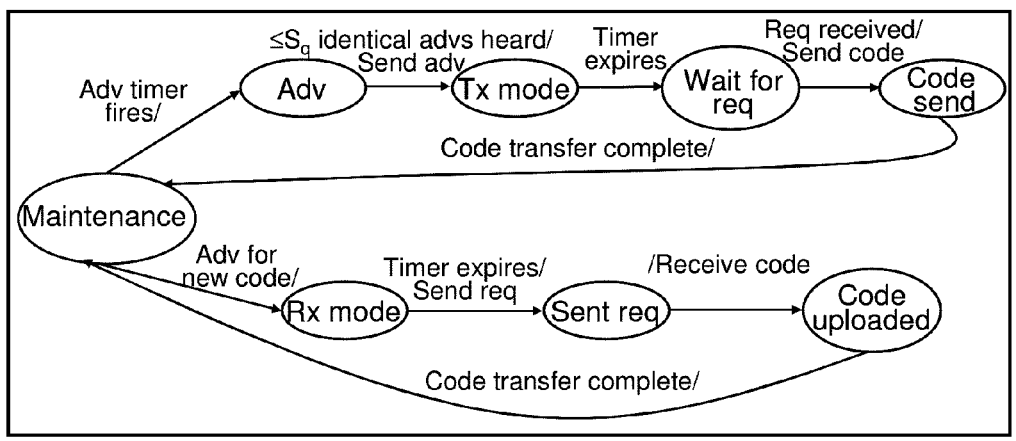
Figure 2. State machine in distribution phase

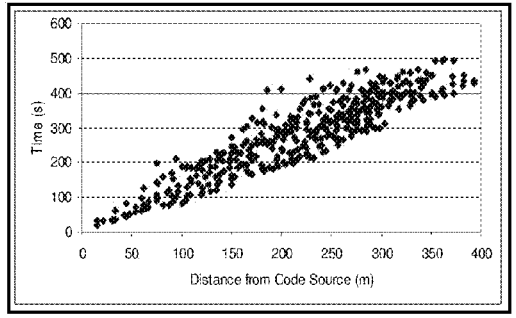
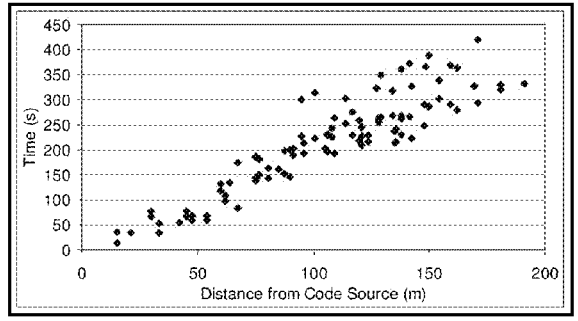
Figure 3. Time for dissemination of one page for a 400 node network
Figure 4. Time for dissemination of one page for a 100 node network
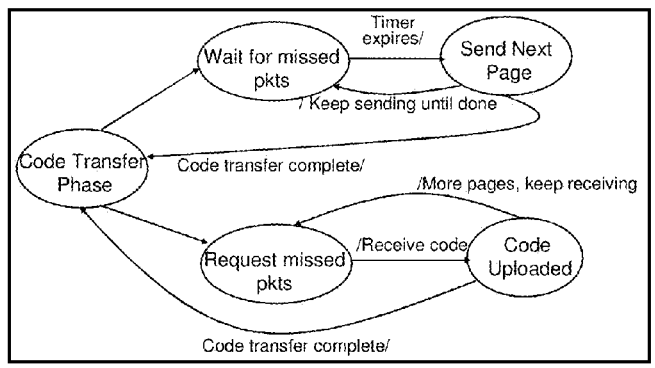
Figure 5. State transition diagram for multi-page mode
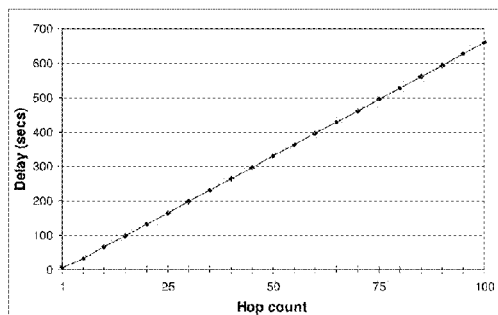
Figure 6 Time between blitzkrieg and distribution phases

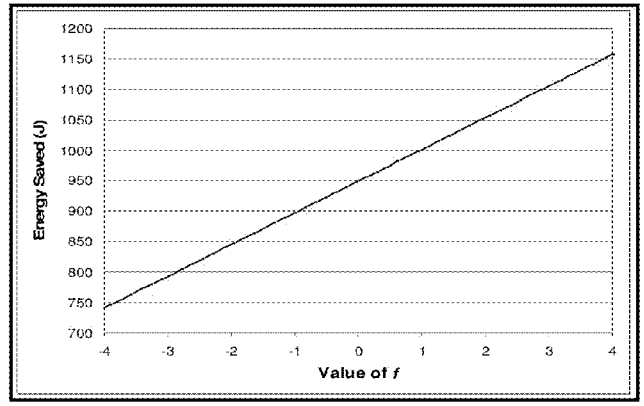
Figure 7. Energy savings with changing values of $f$
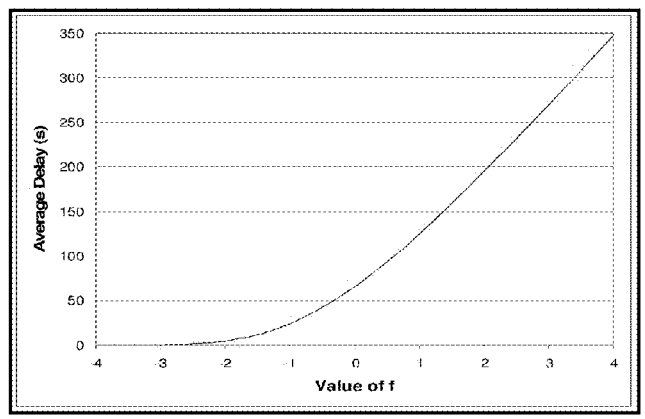
Figure 8. Average delay from sleeping in seconds for varying values of $f$
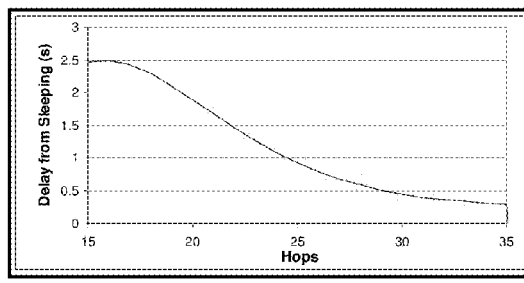
Figure 9. Sleeping delay with # hops $f=-1.0$
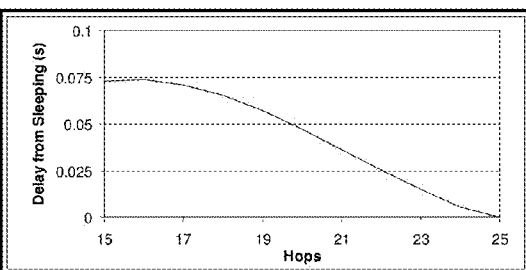
Figure 10. Sleeping delay with # hops $f=-2.0$

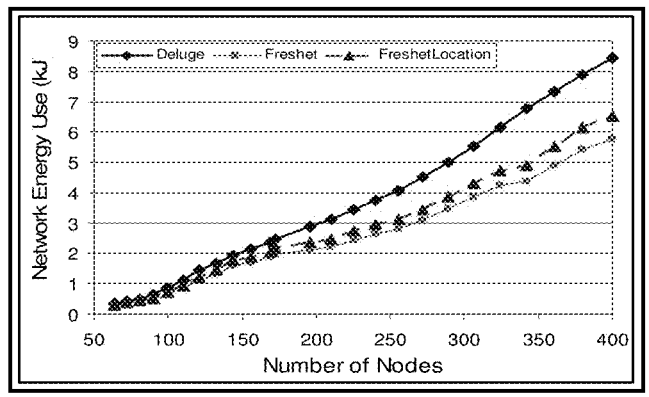
Figure 11. Radio energy usage of the entire network for a given number of nodes
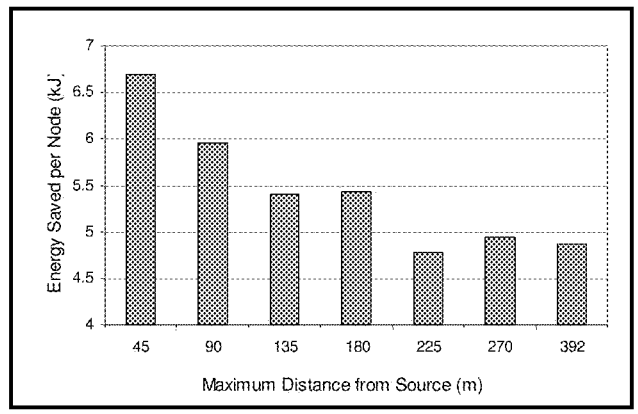
Figure 12. Average energy saved per node grouped by distance from code source
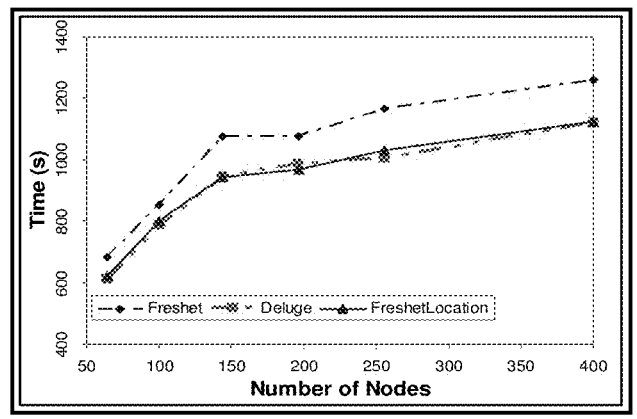
Figure 13. Time to complete code upload

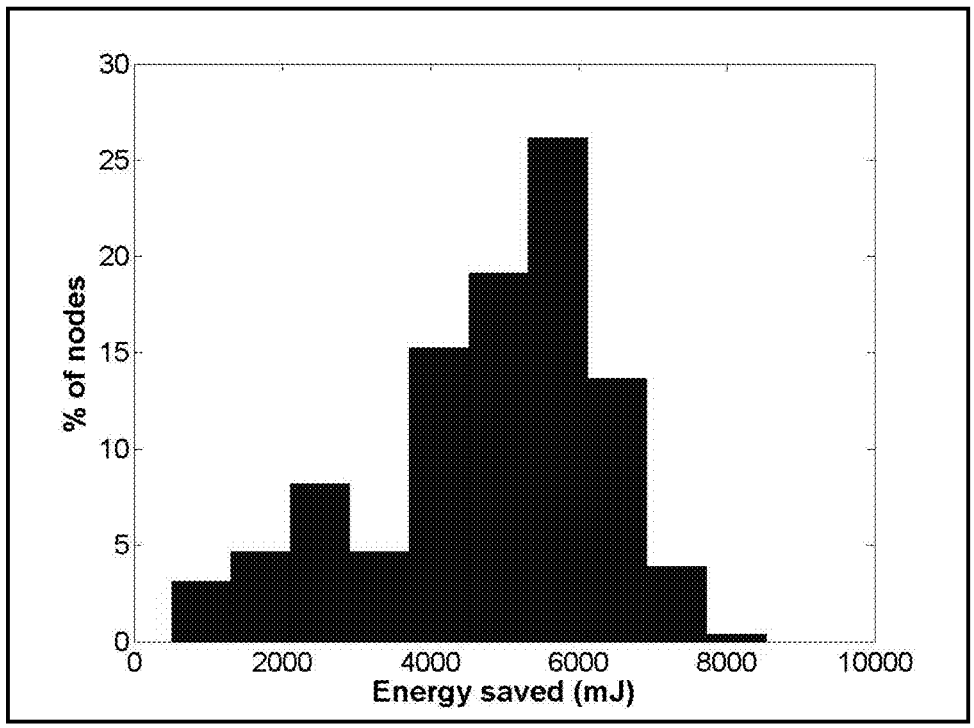
Figure 14. Profile of energy savings at 75% network completion
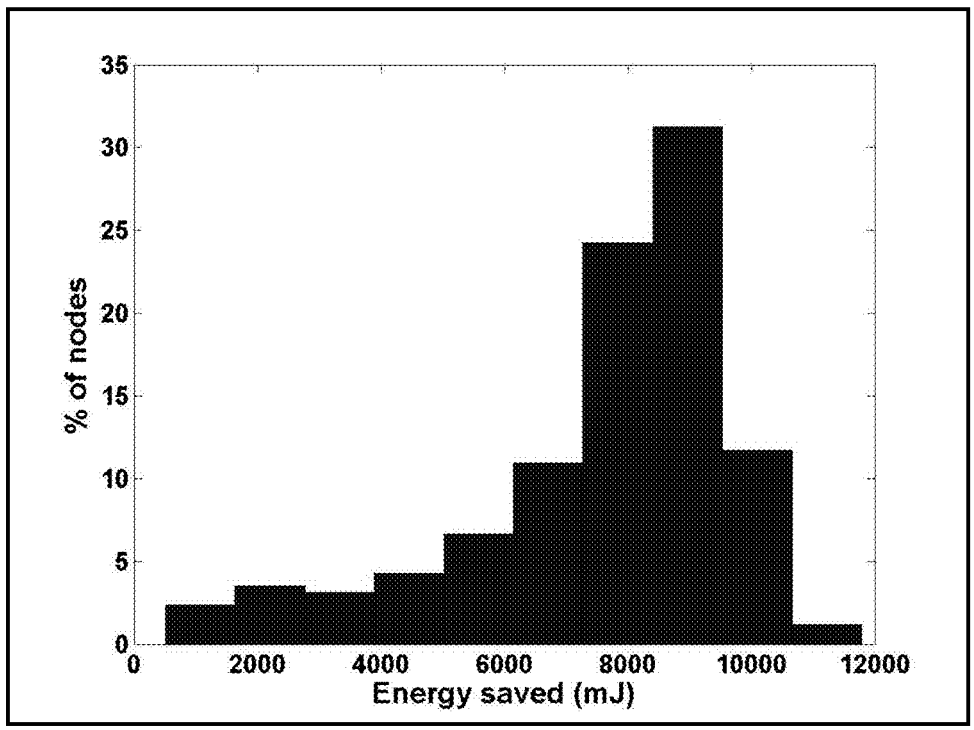
Figure 15. Profile of energy savings 150s after 92% of the network is completed

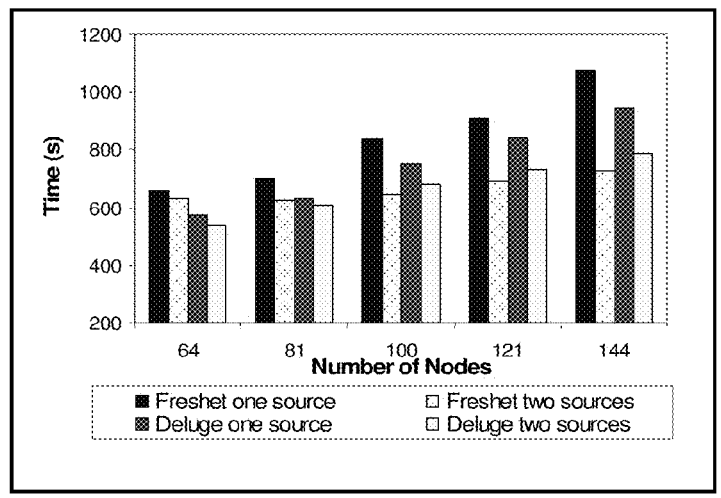
Figure 16. Time to completion of various distribution techniques. From left to right the techniques are Freshet one source, two sources, Deluge one source, and two sources.
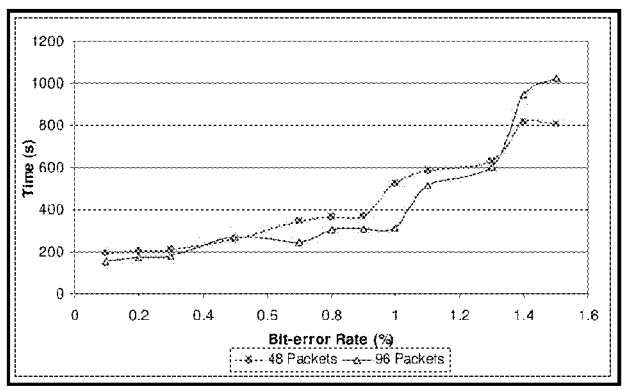
Figure 17. Effect of bit error rate on time for code upload with varying page sizes
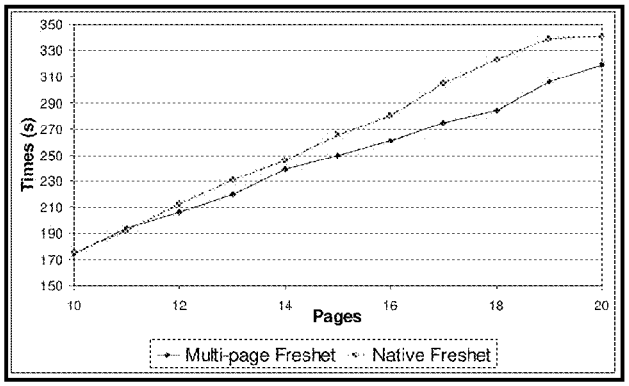
Figure 18. Comparison of baseline Freshet with multi-page Freshet

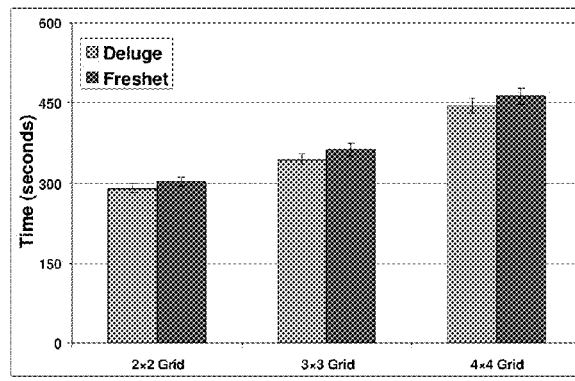
Figure 19. Reprogramming times of Freshet and Deluge
Figure 20. Linear topology with nodes being reprogrammed using Freshet and Deluge starting with node 0 as the originator ($N=1,2,...,16$)
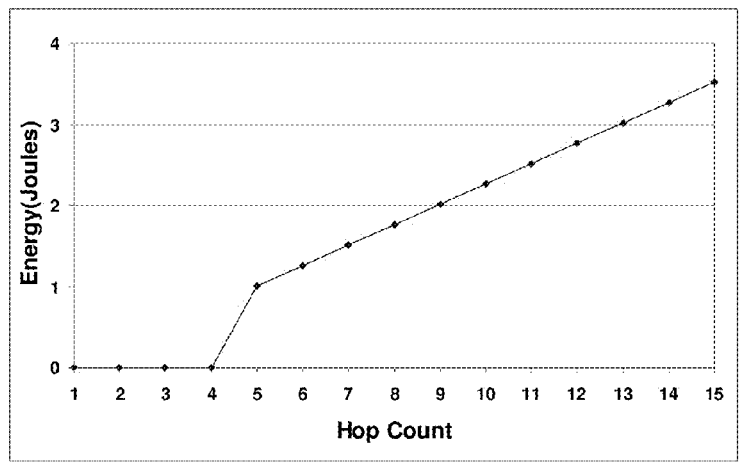
Figure 21. Energy saving achieved by Freshet over Deluge due to nodes sleeping between blitzkrieg and distribution phases

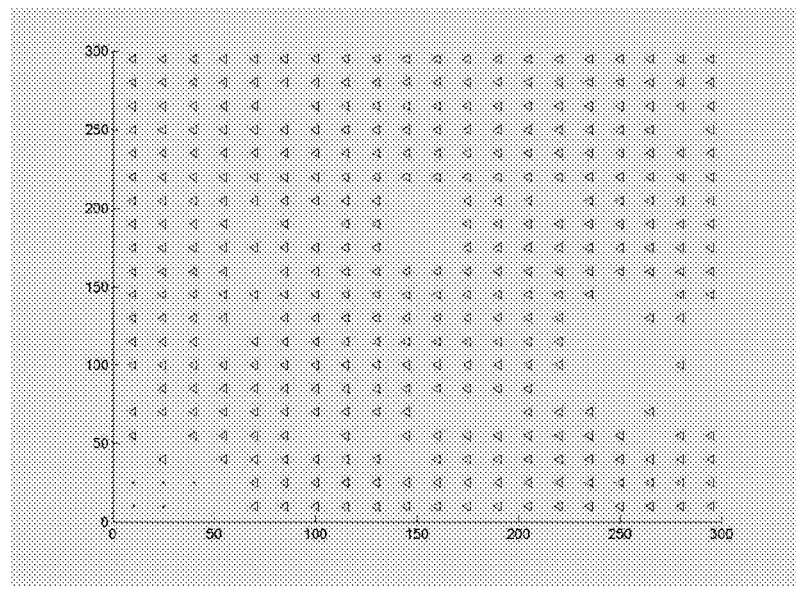
Figure 22(a) $t=15$
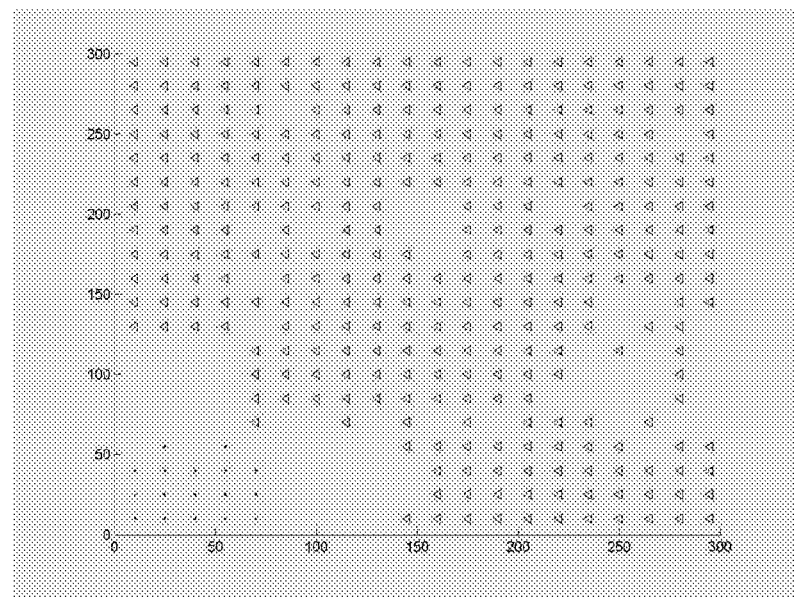
Figure 22(b) $t=30$
- Received 1 page or more
- Sleeping and have received 0 pages
- Sleeping and have received all pages
- Awake and have received 0 pages
Legend

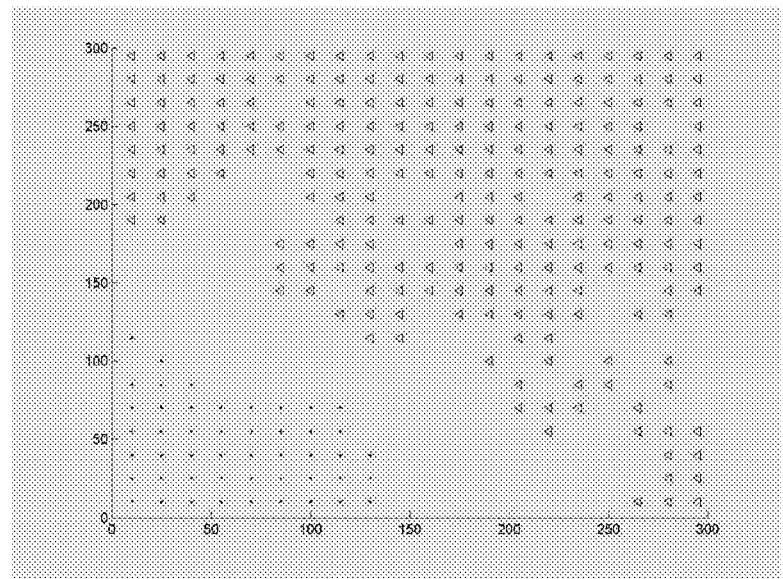
Figure 22(c) $t=75$
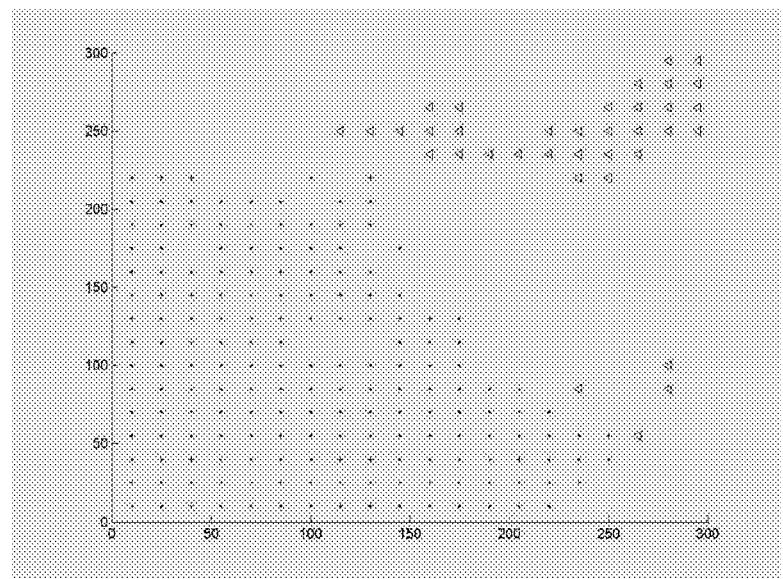
Figure 22 (d) $t=150$
• Received 1 page or more
◁ Sleeping and have received 0 pages
■ Sleeping and have received all pages
▨ Awake and have received 0 pages
Legend

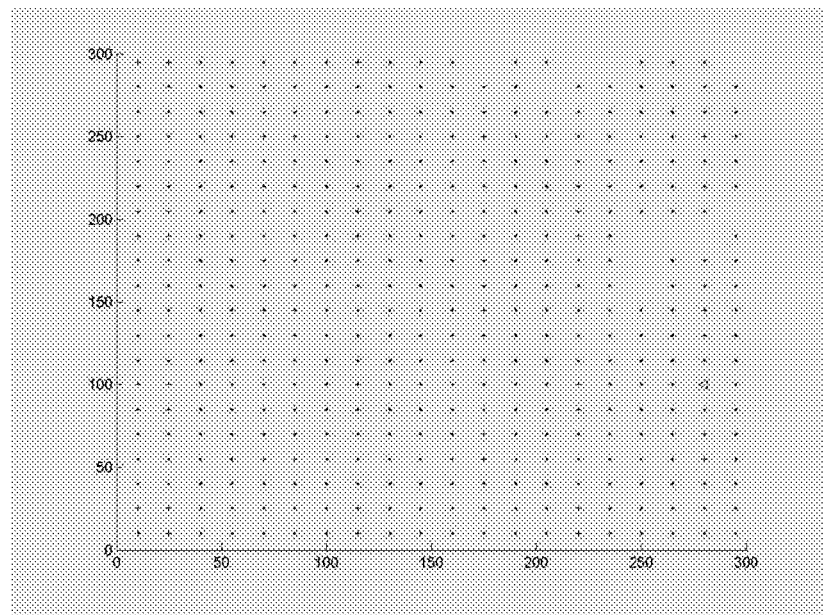
Figure 22(e) $t=300$
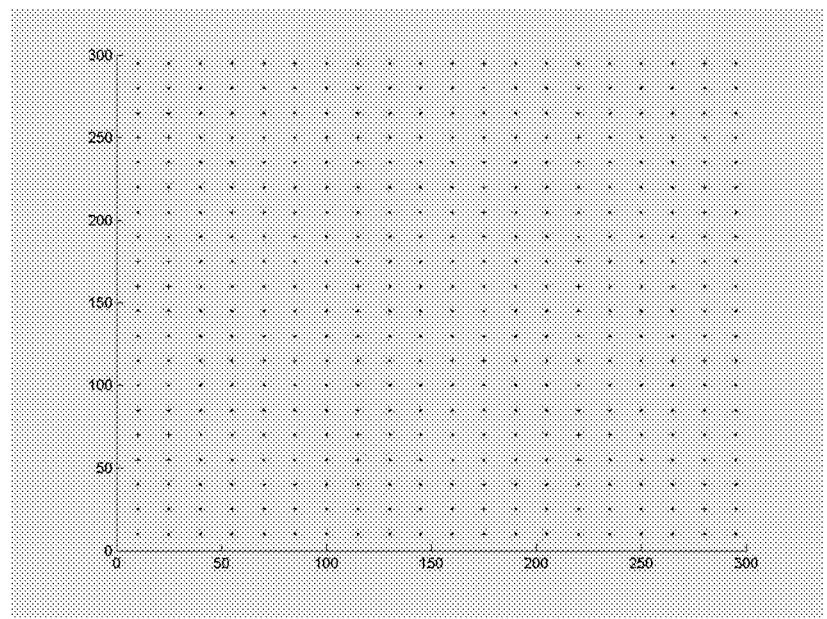
Figure 22(f) $t=450$
- Received 1 page or more
- ◁ Sleeping and have received 0 pages
- ■ Sleeping and have received all pages
- ▒ Awake and have received 0 pages
Legend

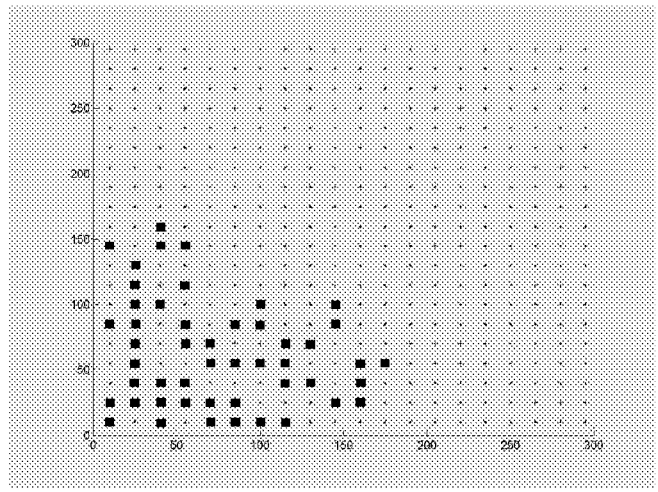
Figure 22(g) $t=650$
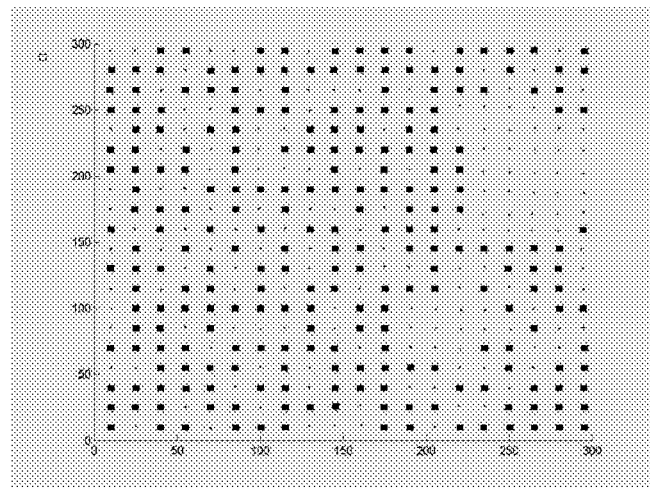
Figure 22(h) $t=900$
- Received 1 page or more
- Sleeping and have received 0 pages
- Sleeping and have received all pages
- Awake and have received 0 pages
Legend
Figure 22. Nodes sleeping in the network over time. Triangles are sleeping nodes, dots have at least 1 page

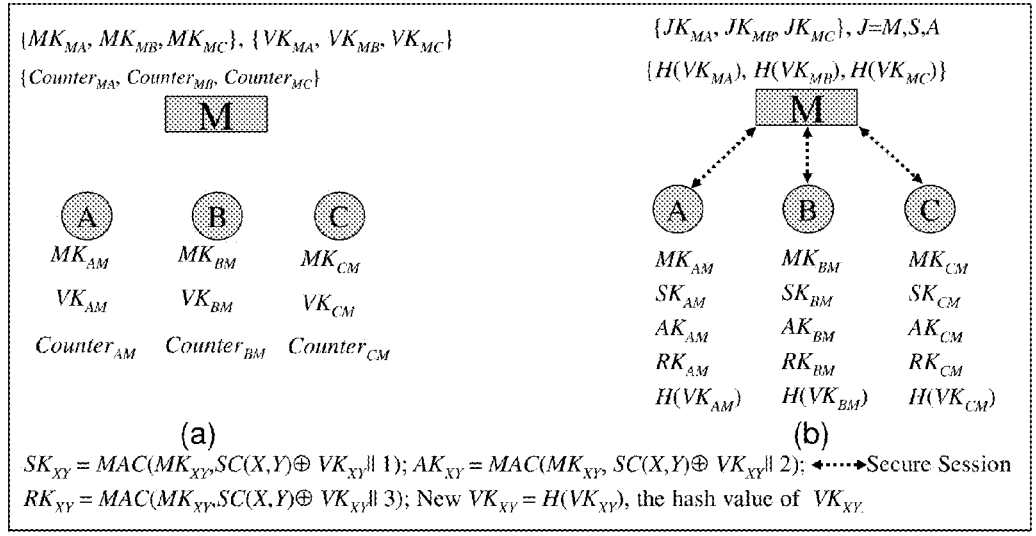
Figure 23. Initial key setup between base station and three sensing nodes
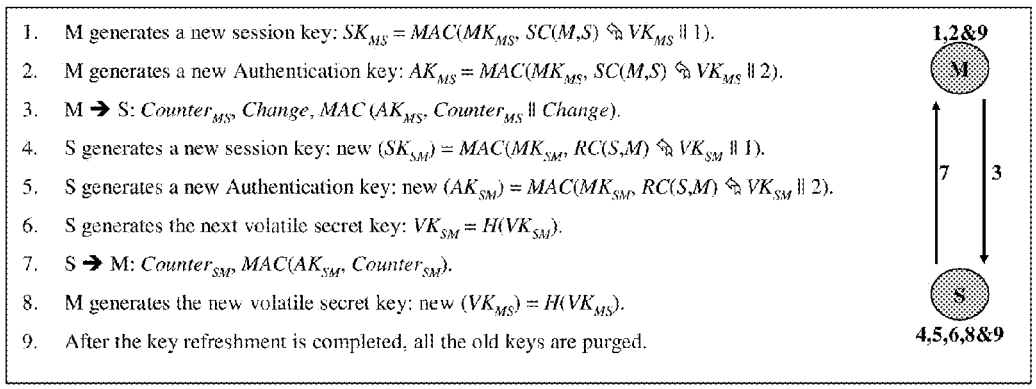
Figure 24. Key Refreshment and Counter Synchronization Procedure

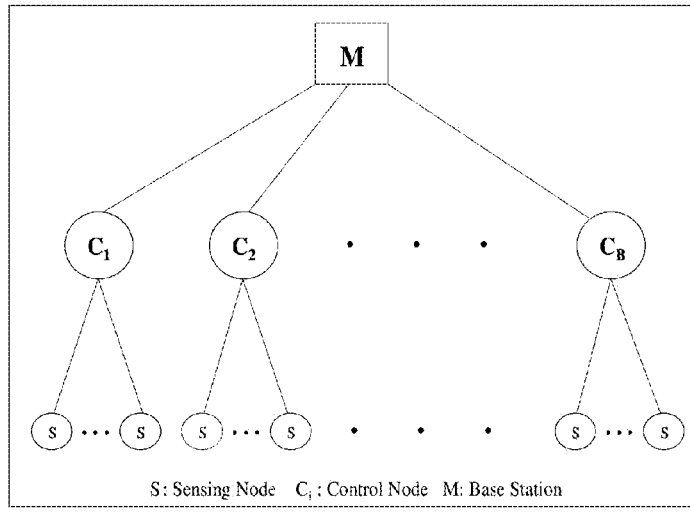
Figure 25. Three level hierarchy for key management in SECOS
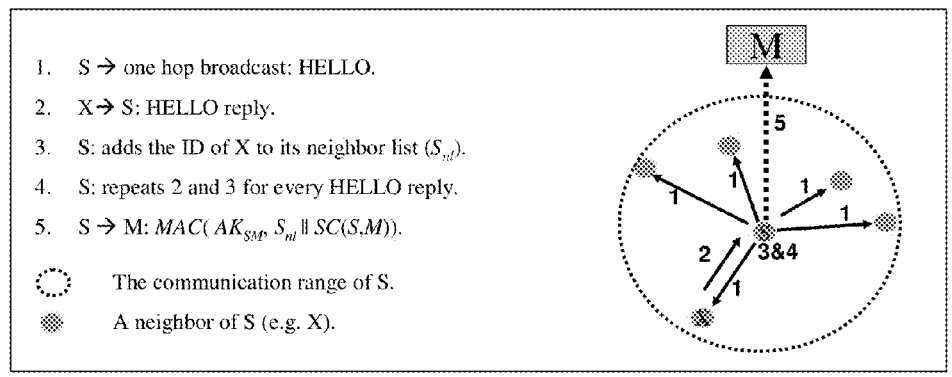
Figure 26. Building the Topology

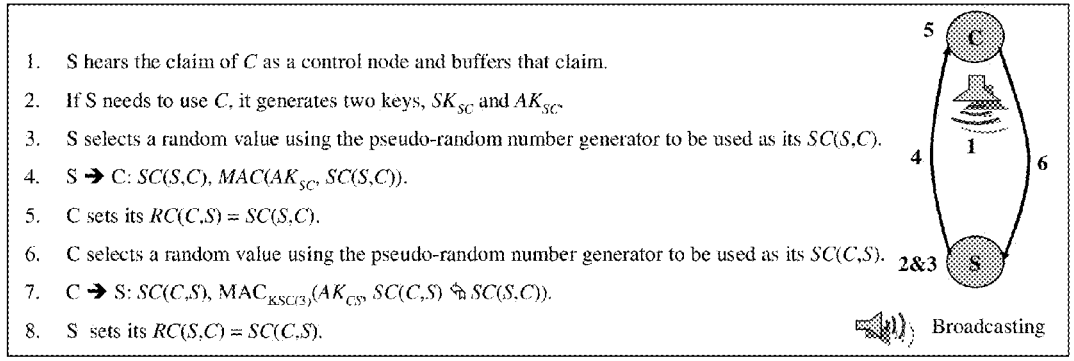
Figure 27. Challenging the Control Node
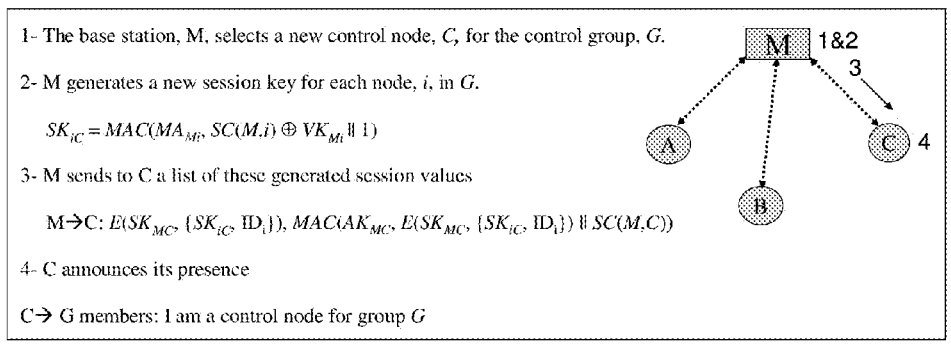
Figure 28. Control node refreshment

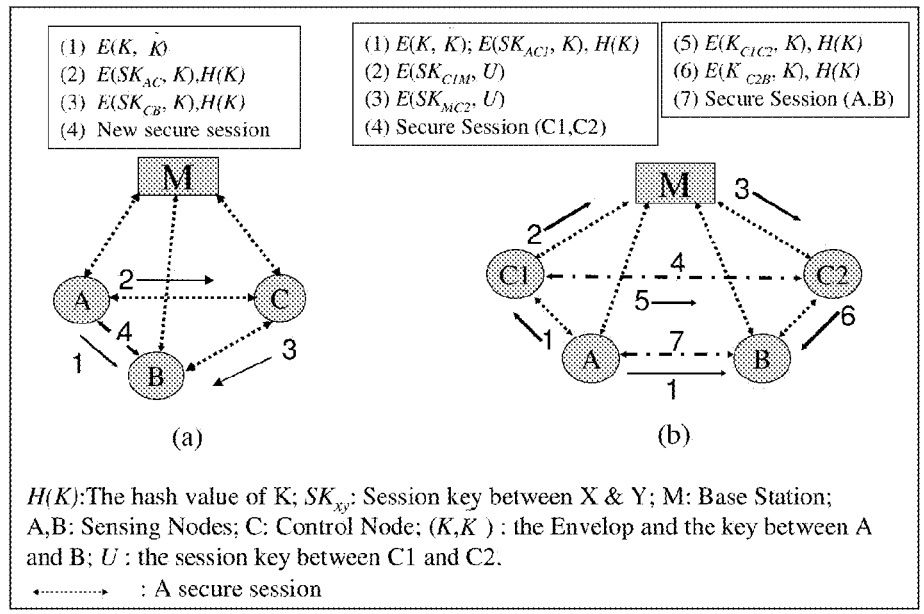
Figure 29. (a) Intra-group communication; (b) Inter-group communication using two control nodes. The two control nodes do not have a secure session when the process starts.
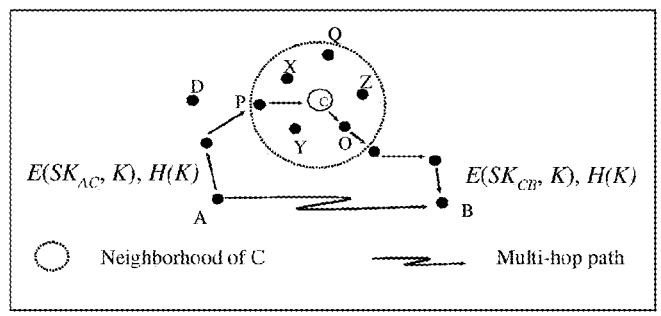
Figure 30. Example for Detection of Masquerading Nodes
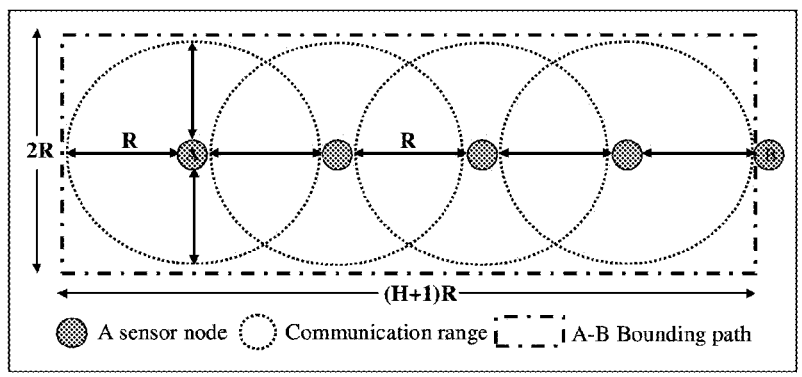
Figure 31. The Bounding Path between A and B

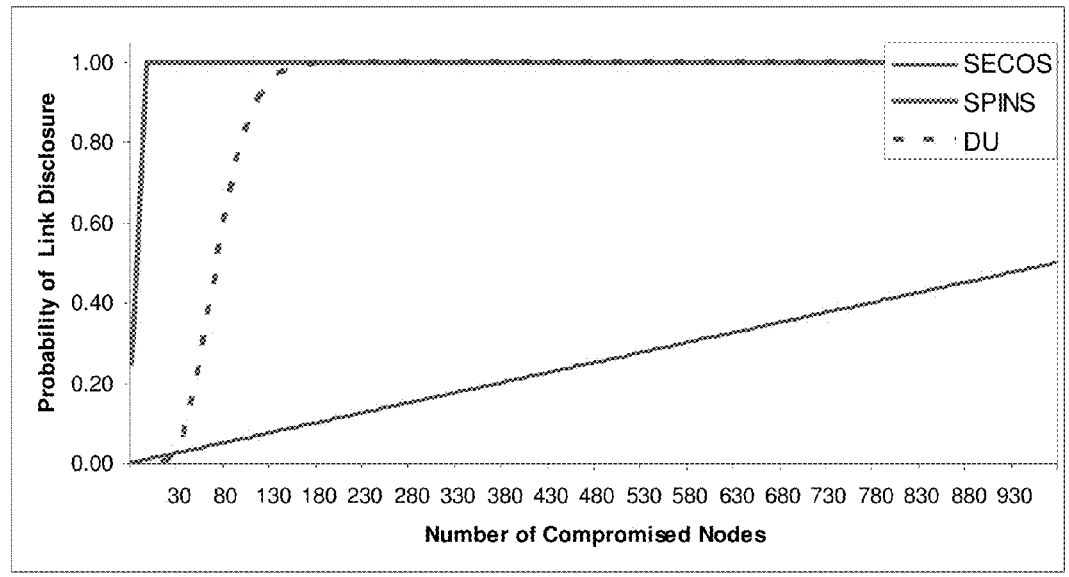
Figure 32. Probability of compromising a randomly selected link between two uncompromised nodes as a function of the number of compromised nodes in the network.
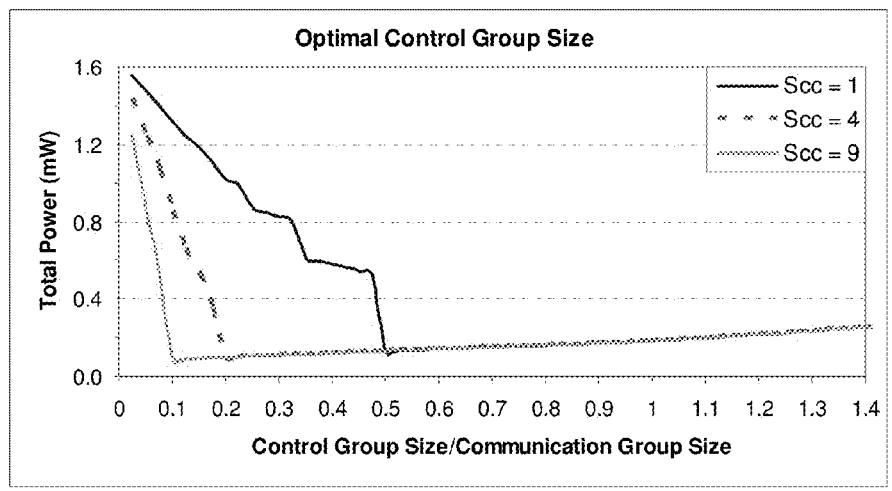
Figure 33. Total power consumed in SECOS with varying control group size.

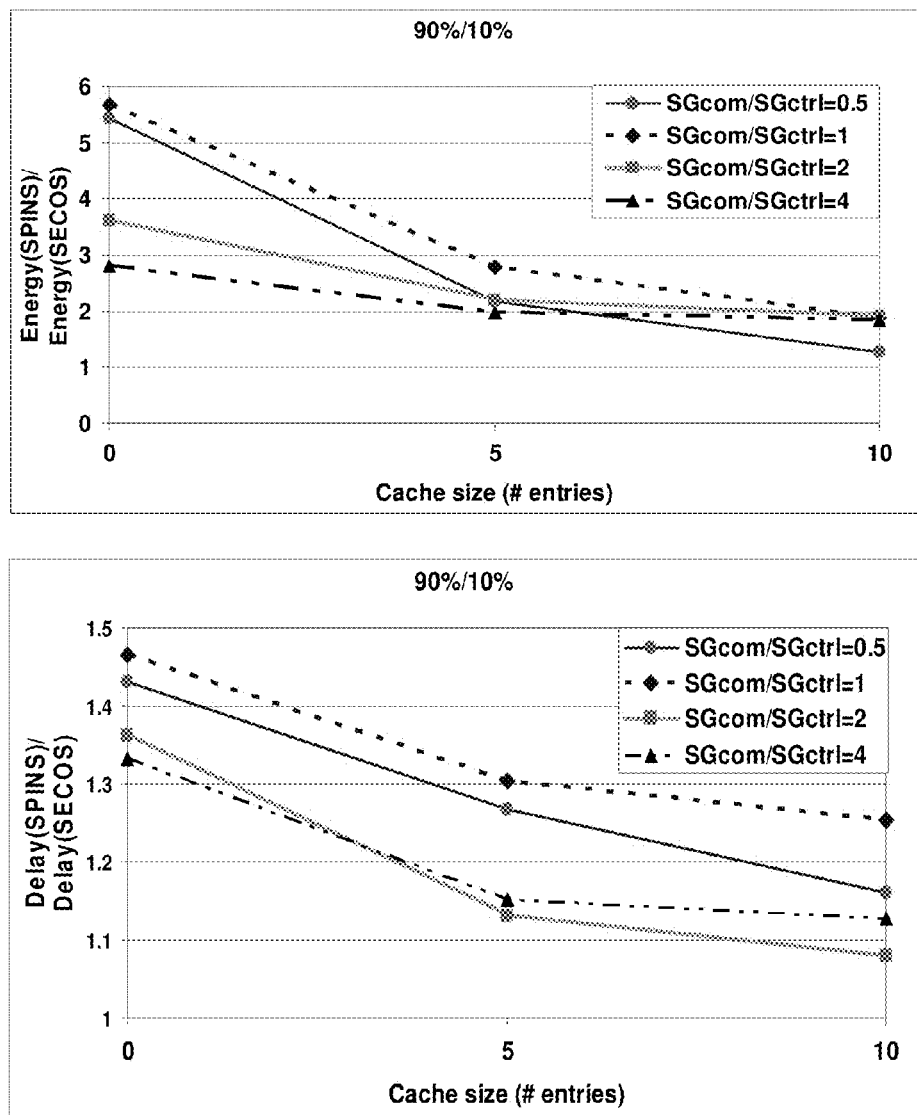
Figure 34. Ratio of (a) overhead energy expended and (b) end-to-end data latency for SPINS and SECOS with varying cache sizes for different communication group sizes

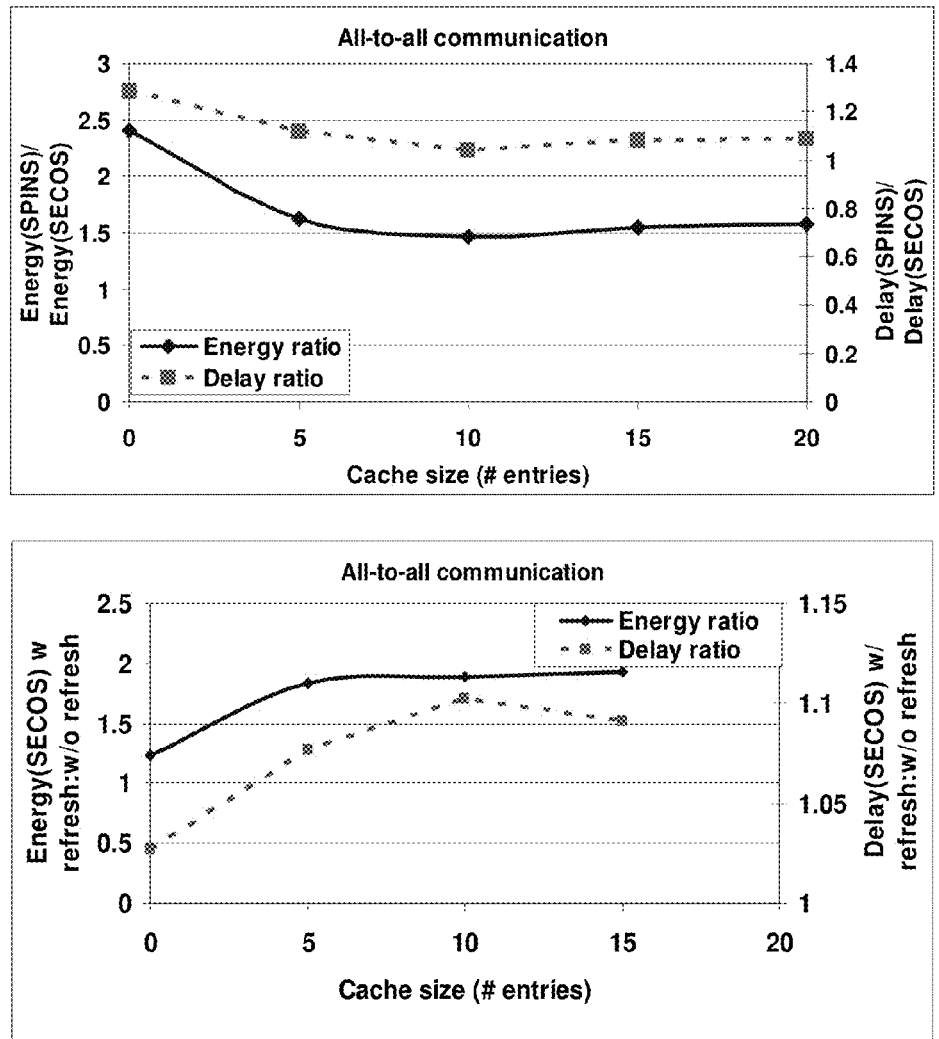
Figure 35. Ratio of overhead energy and delay for (a) SPINS: SECOS (b) SECOS with key refreshment and control node change: SECOS without these techniques

PROTOCOL FOR SECURE AND ENERGY-EFFICIENT REPROGRAMMING OF WIRELESS MULTI-HOP SENSOR NETWORKS

CROSS-REFERENCE TO RELATED APPLICATIONS

This application is a continuation of application Ser. No. 11/758,636, filed on Jun. 5, 2007, now U.S. Pat. No. 8,107, 397, issued Jan. 31, 2012, which claims the benefit of Provisional Patent Application No. 60/810,962, filed Jun. 5, 2006, and Provisional Patent Application No. 60/910,533, filed Apr. 6, 2007, which applications and patent are hereby incorporated by reference.

GOVERNMENT RIGHTS

This invention was made with government support under Grant No. 0330016-ECS awarded by the National Science Foundation. The government has certain rights in the invention.

BACKGROUND OF THE INVENTION

This invention relates to wireless sensor networks and, more particularly, to methods of wirelessly reprogramming sensor nodes securely and in an energy-efficient manner over multiple hops. Reprogramming becomes necessary when new functionality is desired, for example, or when it is required to modify existing functionality, e.g., by changing a parameter or parameters.

Large scale sensor networks may be deployed for long periods of time during which the requirements from the network or the environment in which the nodes are deployed may change. The change may necessitate uploading a new version of existing code or retasking the existing code with different sets of parameters. A primary requirement is that the reprogramming be done while the nodes are in situ, embedded in their sensing environment. This has spurred interest in remote multihop reprogramming protocols over the wireless link. For such reprogramming, it is desirable to have the code updates be 100% reliable and reach all desired destination nodes. This is a challenge since the network's functionality is likely degraded, if not reduced to zero, during the period when the nodes are being reprogrammed. Another challenge is to minimize the resource cost of the reprogramming and querying for availability of new code.

Several sensor network reprogramming approaches have appeared in the literature. TinyOS includes limited support for network programming via XNP (Crossbow Network Programming). However, XNP only operates over a single hop and does not provide incremental updates of a code image. The Multihop Over the Air Programming (MOAP) protocol extends this to operate over multiple hops. MOAP introduced several concepts which are used by later protocols, such as local recovery using unicast NACKs and broadcast of the code. However, MOAP does not leverage the pipelining effect with segments of the code image. Two more sophisticated protocols are Deluge and MNP, respectively described in the following papers which are hereby incorporated by reference: J. W. Hui and D. Culler, "The Dynamic Behavior of a Data Dissemination Protocol for Network Programming at Scale," at the Proceedings of the 2nd international conference on Embedded networked sensor systems, Baltimore, Md., USA, pp. 81-94, 2004; S. S. Kulkarni and L. Wang. "MNP: Multihop Network Reprogramming Service for Sensor Networks," at the 25th IEEE International Conference on Distributed Computing Systems, pp. 7-16, 2005.

Deluge and MNP both use a three-way handshake and segmentation into pages and packets. A binary image to be transmitted to the sensor nodes is initially only available from a few sources, e.g., base stations located in the sensor field. The code progressively ripples through the network with the exchange happening between neighbors through a three-way handshake of advertisement, request, and actual code transfer. The advertisement and the request may collectively be referred to as meta-data. The meta-data is typically much smaller in size than the code and is used to suppress redundant data transmission. Deluge builds on a protocol known as Trickle which determines when to propagate code in a one-hop case. Deluge leverages overheard advertisements or requests to decide when to create a new advertisement or send a new code update. MNP is designed in part to choose a local source of the code which can satisfy the maximum number of nodes. It provides energy savings by turning off the radio of all the nodes that are not selected as the sender. While this protocol does provide advantages, it has been found to download code significantly more slowly than Deluge.

While useful methods of reprogramming wireless multi-hop sensor networks are known, there remains a need for greater energy efficiency while preserving reliability of code dissemination in a multi-hop sensor network, as well as a need for improvements in overall performance in terms of the combination of reliability, efficiency and speed.

Security is another issue of concern for sensor networks, which are being deployed in situations where it is important to protect the message communication from eavesdropping or tampering. The deployments in military situations in hostile territory have strict security requirements for message communication. Some deployments in civilian situations have security requirements as well, e.g., in patient monitoring systems where communications should be secured for privacy reasons. A sensor network used for monitoring environmental conditions in public places (such as, concentration of toxins in the air, biometric sensors in airports) should have its inter-node communication protected against tampering as a guard against possible terrorist attacks directed to critical civilian infrastructures. These networks must also continue to function correctly in the event of certain nodes being taken over by an adversary.

Cryptography is the foundational technology used for protecting and securing the communication in sensor networks. This technology relies on keys as the centerpieces, and many attacks focus on disclosing these keys. This makes the management of the keys (the process by which keys are generated, stored, protected, distributed, used, and destroyed) in a large-scale network of up to hundreds of thousands of sensor nodes a very important and challenging problem. Sensor nodes are constrained in their energy availability, memory and computational resources, and communication bandwidth. These constraints make it impractical to use asymmetric algorithms for key management. These algorithms are very computationally intensive, and consequently, energy intensive since at their heart they involve exponentiation and modulus operations of large numbers. The common approach, therefore, is to use symmetric key cryptography where the two end-points of a communication share a secret key. The challenge is to manage the keys for symmetric cryptography in a scalable manner. The scalability goal implies that the end-to-end communication delay, energy overhead for key management, and the dollar cost of deployment should increase gradually with increasing size of the sensor network. Since the sensor nodes may be placed in hostile environments, we must also design for the possibility that some nodes may be taken over or compromised. The sensor nodes are inherently less reliable than wired platforms and therefore, a protocol must be designed to function in the face of some nodes being unavailable. Radio communication is recognized as more energy consuming than computation by several orders of magnitude. Consequently, the key management protocol should minimize the number of overhead control messages and the overhead number of bytes added to data messages.

Some symmetric key management protocols rely on a common shared secret key between all the nodes in the network leading to a highly insecure deployment. At the other end of the spectrum, some protocols have a separate shared key for each pair of nodes, which leads to a large amount of key storage that grows as the square of the number of nodes, and is therefore not scalable. The requirement to minimize communication overhead makes most of the proposed purely symmetric algorithms impractical since they add a fixed size overhead number of bytes to the payload and sensor networks typically have small sized packets.

Many key management protocols for ad-hoc networks have been proposed in the literaturem but they suffer from one or more of the problems of weak security guarantees if some nodes are compromised, lack of scalability, high energy overhead for key management, and increased end-to-end data latency.

SUMMARY OF THE INVENTION

One aspect of the present invention is a method of multi-hop reprogramming for a wireless sensor network using a three-way handshake protocol for transfer of new code, said handshake protocol including advertising, request and data transfer messages. The network has at least one originator and a plurality of sensor nodes, and the method comprises propagating a warning message containing information about the nature of new code to be transmitted, the warning message including network topology information indicative of the routing of the warning message from the originator; at each node which receives the warning message, estimating the propagation time from the originator based on the network topology information contained in the warning message and, based on the propagation time length, conditionally disabling RF circuitry to reduce power consumption during a corresponding sleep period. Each node updates the network topology information indicative of the routing of the warning message and forwards the updated warning message to other nodes in the network; and each node wakes up at the end of the sleep period and initiates a three-way handshake protocol for transfer of code, the node receiving advertising messages from other nodes relating to new code, sending request messages for needed code, receiving needed code, and sending advertising messages to other nodes in the network relating to received code.

Another aspect of the present invention is a method of reprogramming for a wireless sensor network which comprises segmenting code into multiple pages each split into multiple packets; performing a three-way handshake in units of a page, transmitting each page in units of a packet; and enabling each node to receive pages out of order from multiple sources.

Other aspects of the invention, and the objects and advantages thereof, will be more apparent upon reading the following detailed description in conjunction with the accompanying drawings.

BRIEF DESCRIPTION OF THE DRAWINGS

FIGS. 1 and 2 depict a state machine in blitzkrieg phase and distribution phase, respectively, for an energy-efficient reprogramming protocol referred to herein as Freshet in accordance with one aspect of the present invention.

FIGS. 3 and 4 illustrate the time for dissemination of one page of code for networks of different sizes.

FIG. 5 is a state transition diagram for multi-page mode in accordance with one aspect of the present invention.

FIG. 6 illustrates the time between blitzkrieg and distribution phases in accordance with one aspect of the present invention.

FIG. 7 is a graph of energy savings with changing values of f.

FIG. 8 is a graph of average delay from sleeping in seconds for varying values of f.

FIGS. 9 and 10 are graphs of sleeping delay as a function of the number of hops.

FIG. 11 shows radio energy usage of a sensor network for a given number of nodes.

FIG. 12 shows average energy saved per node grouped by distance from code source.

FIG. 13 illustrates the time to complete code upload.

FIGS. 14 and 15 are profiles of energy savings at different stages of network completion.

FIG. 16 compares the time to completion for several distribution techniques.

FIG. 17 shows the effect of bit error rate on time for code upload with varying page sizes.

FIG. 18 shows a comparison of baseline Freshet with multi-page Freshet.

FIG. 19 illustrates reprogramming times of Freshet and Deluge.

FIG. 20 depicts a linear topology with nodes being reprogrammed using Freshet and Deluge starting with node 0 as the originator (N=1, 2, . . . , 16).

FIG. 21 shows energy saving achieved by Freshet over Deluge due to nodes sleeping between blitzkrieg and distribution phases.

FIG. 22 visually depicts the behavior of a network over time during code upload. Triangles indicate nodes that are sleeping without having received any pages of new code, small dots indicate notes that have received at least 1 page, and solid squares indicate nodes that are sleeping after having received all pages.

FIG. 23 depicts an initial key setup between a base station and three sensing nodes in accordance with another aspect of the present invention referred to herein as SECOS.

FIG. 24 depicts a key refreshment and counter synchronization procedure in accordance with SECOS.

FIG. 25 depicts a three-level hierarchy for key management in SECOS.

FIG. 26 illustrates building the topology.

FIG. 27 illustrates challenging the control node.

FIG. 28 illustrates control node refreshment.

FIG. 29 illustrates (a) Intra-group communication; (b) Inter-group communication using two control nodes. The two control nodes do not have a secure session when the process starts.

FIG. 30 depicts an example for detection of masquerading nodes.

FIG. 31 depicts a bounding path between nodes A and B.

FIG. 32 is a graph of the probability of compromising a randomly selected link between two uncompromised nodes as a function of the number of compromised nodes in the network.

FIG. 33 is a graph of the total power consumed in SECOS with varying control group size.

FIG. 34 illustrates the ratio of (a) overhead energy expended and (b) end-to-end data latency for SPINS and SECOS with varying cache sizes for different communication group sizes.

FIG. 35 illustrates the ratio of overhead energy and delay for (a) SPINS:SECOS (b) SECOS with key refreshment and control node change:SECOS without these techniques.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Freshet—A Protocol for Energy-Efficient, on-Demand Reprogramming of Large-Scale Sensor Networks One aspect of the present invention is a protocol referred to herein as Freshet. Freshet recognizes, as an initial proposition, that a brute force flooding method for reprogramming large-scale sensor networks is not feasible due to the enormous bandwidth overheads. In view of limited bandwidth resources and the energy consumption due to communication, it is important to suppress redundant transmissions of the data and the meta-data. The suppression uses the shared nature of the wireless medium and the capacity of a node to overhear its neighbors' communication. For example, if a node A in the network has version v and a neighbor node B requests pages of version v'(<v) from a node C, then A can proactively send the more recent code to B. This will cause a suppression of the transmission from C to B if C and A are neighbors. Next, we use pipelining of the different pages in a binary image to expedite the code upload. Each interested node may initiate the process of forwarding the code in units of a page as it receives the pages and aggregates them to create its own complete binary image. This is in contrast to the approach in Mote Over the Air Programming (MOAP) where the forwarding happens only when the entire code has been assembled at a node. Since a binary image may consist of many pages and the wireless links are failure prone, the MOAP approach may lead to excessive retransmissions and therefore bandwidth overheads. Freshet can also speed up the process when multiple sources of code are available. The key insight to enable this is to allow nodes to receive pages out of sequence for streams from different sources. This leads to somewhat more state maintenance at the node but substantially speeds up the process.

Freshet has the design goal of reducing the energy consumption due to code upload. For this, it attacks the single biggest source of energy drain—idle listening energy. A fundamental insight used in Freshet is that nodes can be put to sleep by making the advertisement-request-data handshake happen only at certain points in time. When new code is introduced into the network, Freshet has an initial phase, the blitzkrieg phase, when information about the code propagates through the network rapidly along with some topology information. The topology information is used by each node to estimate when the code will arrive in its vicinity and the three way handshake will be initiated—the distribution phase. Each node can go to sleep in between the blitzkrieg phase and the distribution phase thereby saving energy. The potential for energy savings grows with the size of the network. Freshet also optimizes the energy consumption by exponentially reducing the meta-data rate during conditions of stability in the network (the quiescent phase) when no new code is being introduced.

Freshet, while it shares most of the design goals and some design features of Deluge and MNP, is different in several important aspects. For example, Freshet optimizes the energy consumption more aggressively through turning off the nodes between the blitzkrieg phase and the distribution phase using limited topology information. It also trades off the responsiveness of the protocol to newly joining nodes for saving further energy during the steady state. It also uses out of order paging to speed up the code update with multiple sources of the code.

1 Freshet Design Features

The following table provides a quick reference for the meanings of certain parameters used in this section:

| Parameter | Meaning |
| --- | --- |
| v | Version number of the code |
| p | Current page of the code |
| $p_{max}$ | Maximum (total) page number of the code |
| w | If a node hears more than w warning messages, it does not send the warning message. |
| $t_{off}$ | Time for the three way handshake between two neighbor nodes |
| $b_n$ | Number of neighbors of a given node |
| $\tau$ | In quiescent phase, each node listens for a period of $\tau/2$ and then decides with probability $1 - 1/b_n$ that is should sleep for the next $\tau/2$ period |
| numSrc | Number of originators |

Initially, a few specialized nodes, such as base stations, have the entire code image. These nodes are called originators, to distinguish them from sources of the code, since any node can act as a source as soon as it has received a subset of the code image. The binary code image is segmented into equal sized pages and each page is split into multiple packets. The code is transferred through the links in units of a packet while the three-way handshake happens in units of a page. Each new image injected into the network has a version number attached to it, which increases monotonically. A node obtains code through monotonically increasing page numbers. When a node hears of code for a later version, it suspends any transfers for the code of the earlier version. Each node maintains local state of tuples of (v, p, $p_{max}$) where v gives the version number, p the current page with the node, and $p_{max}$ is the maximum page number. Thus looking at a code image transfer packet, a node can uniquely determine if it needs the packet.

Freshet uses spatial multiplexing to transfer the code. This implies that a node can transfer the code to a neighbor before it has received all the pages for a given version. In effect, the node can initiate transfer once it has the first page for the version. This makes the delay proportional to the sum of the network diameter and the code size rather than the product of the two.

Features of Freshet are described in further detail below, beginning with three subsections describing the three phases in Freshet that each node goes through, i.e., the blitzkrieg phase, the distribution phase and the quiescent phase.

1.1 Blitzkrieg Phase

In the blitzkrieg phase, Freshet propagates information about the nature of the new code to all nodes in the network. This is accomplished through a fourth type of message, a warning message, apart from the advertisement, request, and broadcast data messages. This message contains information about the new code in the form of the version number, the number of pages, and how far the sending node is from the data source, in terms of hop counts. The blitzkrieg phase enables energy optimization since each node can use the hop count information to determine when it will enter the distribution phase.

The pseudo-code showing the operation of the blitzkrieg phase is shown below at the end of the next subsection. The hop count is incremented by each intermediate node routing the warning message. Every time a node hears a unique warning message with code information more recent than its own, it starts a short, randomized timer. Once this timer fires, and the node has not heard more than w warning messages with the same code version as its own, it sends out the warning message. The node sends the exact same message as the one it first received, except that it increments the hop count from the original message. This information therefore gives the receiver an estimate of how many intervening nodes from the node have the data and have seen and propagated the warning message. Based on empirical results of time to propagate code over one hop, Freshet estimates when the hop count is sufficiently large that energy savings are possible by stopping advertising and turning the node's antenna off. In this exposition, we will use the term a node going off to sleep to mean its antenna being turned off. If the node has some sensing task, for which it needs to stay awake, without communicating, it can continue to do so. On getting the hop count information, the node starts a timer for how long to cease advertisements and go to sleep.

Given that the sleeping will happen for a source to node distance beyond h hops, a node $h_a$ hops away sleeps for time $t_{off}*(h_a-(h-1))$, where $h_a>h$ and $t_{off}$ is the time for the three way handshake between two neighbor nodes. This parameter is estimated empirically in the sensor network test bed. The additive nature of this formula stems from the result from Deluge that the time to propagate a page is linear in the number of hops for a fixed object size. With further accurate information about the topology, it may be possible for each node to estimate the timeout more accurately.

We discuss in Section 1.4 an extension to Freshet where accurate location information is available.

The blitzkrieg phase causes each node to relay the warning message a fixed number of times, the redundancy being used to guard against losses. The blitzkrieg phase does not require any synchronization between the nodes and each node terminates its blitzkrieg phase when it has sent out the fixed number of warning messages. The state machine representations for an originator node and a general node in the blitzkrieg phase are shown in FIGS. 1(a) and 1(b) respectively. FIG. 1(a) shows the process at the beginning of a code update to transmit warning messages. Once a node either hears newer code or a warning message from another source, it sends warning messages until it has sent and heard τ messages.

In FIG. 1(b), we see that once a node has heard a warning message, it verifies that the metadata is an update to its current code image. If this is determined to be the case, the node starts sending out warning messages. Once finished, the node sleeps if it is more than 3 hops from code update, and stays awake otherwise. There are tradeoffs in determining how far away a node may be before it sleeps after the blitzkrieg phase.

Freshet uses 3 hops as the cutoff point because it balances energy savings with code proximity. Consider the nodes, say belonging to a set called A, that receive the blitzkrieg message directly from the originating node, call it node B. However, there may be other nodes, say belonging to a set called C, within range of the originator for which the blitzkrieg packet directly from the originator was dropped. But when the actual code transfer occurs, nodes in set C receive enough packets from node B to successfully download the code, as if they had originally been in set A. Since some nodes for each blitzkrieg message may fall into set C, there needs to be some concession to incorporate these nodes. This is done by allowing a threshold for hop count for sleeping that is greater than 1. On the other hand, to allow for more energy savings Freshet would like to turn the radio off for as many nodes as possible. This factor pushes the value of the threshold lower. Empirically, 3 hops was determined as a suitable value; 2 typically was too restrictive on the nodes that could receive code updates and 4 typically saved less energy without significantly altering the download time.

The major energy expenditure for the radio is the idle receive time and not the transmission energy level or number of messages sent. Therefore, Freshet seeks to turn off the radio between the blitzkrieg and the distribution phases. MNP turns off the radio of nodes which are not selected as senders of code (during their counterpart of the distribution phase), but does not address radio usage in the long time periods before and after code updates. Since a node can go to sleep between the time that code is injected into the network and when it arrives in the node's vicinity, a large network that needs to disseminate a large data object can save substantial amounts of energy in Freshet.

1.2 Distribution Phase

The distribution phase of Deluge achieves efficient and robust dissemination of code pages. Thus, Freshet leaves this phase unchanged and chooses to improve upon aspects of Deluge not associated with the active distribution of code, while still maintaining the same performance. This phase is described in brief here for the sake of completeness.

The state machine representation for a general node in the distribution phase is shown in FIG. 2, and suitable pseudo-code for a node in the blitzkrieg and distribution phases is shown below:

```
1. if (warning message heard)
      a. Upgrade version of code, update number of pages needed, record hopCount
      b. Increment hopCount and send warning message with same code information
      c. if hopCount > 3
            i.  Sleep for SleepFactor*(hopCount-3)
      d. else
            i.  Stay awake for normal code transfer
      e. endif
2. endif
3. if (advertisement for new code heard)
      f. Upgrade version of code, update number of pages needed
```

```
        g.   Propagate warning message with code version, number of pages, origin node, hopCount 0
        h.   Request needed code pages and enable normal Deluge
   4. endif
   5. if (updated advertisement not heard)
        i.   Send advertisement message with code version, page number
        j.   Wait for code request
        k.   Initiate code transfer once request is received
   6. endif
```

Lines 1-2 of the above pseudo-code correspond to the blitzkrieg phase, lines 3-4 correspond to the blitzkrieg phase followed immediately by the distribution phase, and lines 5-6 to the distribution phase. Note that certain features of Freshet taken from Deluge (like advertisement and data message suppressions) are not mentioned in the pseudocode. In line 1a, the node has heard the warning message, so it updates its internal code data. It records the hopCount, code version, and number of pages in the code based on the warning message. In line 1b, the node then increments the hopCount and sends the message forward. Lines 1c through 1e show how the node determines whether it will sleep. If the node is more than 3 hops away from the origin node, then the node will sleep; otherwise the node stays awake and participates in normal code transfer.

Lines 3 and 4 illustrate a case where the blitzkrieg and distribution phases occur in succession. Lines 5 through 6 illustrate the distribution phase. Once a node is close enough to download the new code, line 3 may occur. The node hears the advertisement for the new code and then propagates that information throughout the network. The node then requests the needed code page and begins downloading.

Line 5 addresses the case where the advertisement the node hears is for code it already has, in which case the node sends an advertisement with the code it has. It then waits for nodes to request the needed code.

The distribution phase does not need any synchronization between the nodes. It begins once a node wakes up from the sleep induced by the warning message of the blitzkrieg phase, or, if it was determined that the node need not go to sleep, then right after the completion of the blitzkrieg phase. The distribution phase functions through a three-way handshake protocol of advertisement, request, and broadcast code. The operation of each node is periodic according to a fixed size time window. The first part of the window is for listening to advertisements and requests and sending advertisements. The second part of the window is for transmitting or receiving code corresponding to the received requests. Within the first part of the time window, a node randomly selects a time at which to send an advertisement with meta-data containing the version number, the number of complete pages it has, and the total number of pages in the image of this version. When the time to transmit the advertisement comes, the node sees whether it has heard $s_a$ advertisements with identical meta-data, and if so, it suppresses the advertisement. When a node hears code that is newer than its own, it sends a request for that code and the lowest number page it needs, to the node that advertised the new code. In the second part of the periodic window, the node transmits packets with the code image, corresponding to the pages for which it received requests. Since a node only fills its pages in monotonically increasing order, it eliminates the need for maintaining large state for missing holes in the code. For receiving the code, each node uses the shared broadcast medium that allows overhearing and can fill in a page requested by a neighbor, subject to the monotonicity constraint mentioned above.

In addition to the advertisement suppression mentioned above, Freshet uses several mechanisms for message suppression. The first is sender selection. When a node needs new code, it designates the node to send the new code image. This sender is selected by the most recently heard advertisement and the other senders are thus quieted. The second mechanism is request suppression. When a node overhears a request for the same code it needs, then it suppresses its request, unless it does not receive the new code within some time interval.

1.3 Quiescent Phase

A node enters the quiescent phase once code has been disseminated completely within the transmission range of the node. Thus, it no longer hears requests and it has itself acquired the complete code image. Since there will be no further code transfers for the immediate future, the node does not need to advertise at all. The two distinct scenarios that are to be handled in the quiescent phase are when a new node enters the network and when new code is injected into an existing network.

In Trickle, a scheme is proposed for sending an advertisement every so often to ensure that if a new node is added to the network, it is aware of the current code status. See, e.g., P. Levis, N. Patel, S. Shenker, and D. Culler, "Trickle: A Self-Regulating Algorithm for Code Propogation and Maintenance in Wireless Sensor Network," *Proceedings of the First USENIX/ACM Symposium on Networked Systems Design and Implementation* (NSDI 2004), 2004, which is hereby incorporated by reference.

However, since the quiescent phase is typically the most long-lasting phase, Freshet optimizes the energy consumption further by switching to a complete pull-based mechanism to service new nodes. If any new node enters the network, it will advertise its old data and thus will alert the already present nodes that they need to start transmitting again. As it is difficult to decide deterministically when a node may safely shut off its radio, the quiescent phase operates by ensuring that all nodes in the network are awake at least half the time. Since this new node may enter the network at any location and new code may be injected at any time, only a portion of the network can sleep and the nodes that sleep must probabilistically ensure that the network will still respond to any new events. The means of accomplishing this is through recording how many neighbors, $b_n$, are within each node's vicinity. Consider a time slot of length τ. Each node listens for a period τ/2 and then decides with probability $1-1/b_n$ that it should sleep for the next τ/2 period. This design is a tradeoff between energy saving and responsiveness of the network to new code or new nodes. The decision to have the node sleep half the time was modeled off of Trickle's methodology of equally dividing the time period into a listen and a send window. Further experimentation is required to determine the optimal sleep period for a given network.

In the case where new code enters the network, nodes that are awake will propagate the warning message throughout. Therefore all nodes awake when this occurs will be prepared for the new update. However, the portion of the network that was sleeping may have problems being prepared for the next update. However, note that it is very unlikely that the node will miss the code update completely, as it will be awake for half the time. Consequently, it will either have heard the initial warning messages or be aware when the code reaches a few hops away, as the nodes that received warning messages will have awakened by then and be sending advertisements to the surrounding nodes.

Freshet can function in either a dynamic or a static network. The dynamic nature may be a result of failures, which will cause new routes to be discovered that Freshet will use in the propagation of code. For a mobile network, two cases have to be considered. One is the node which wishes to upgrade its code is moving, in which case the node disregards any network topology information obtained earlier and stays awake for the code transfer. Since the energy expended due to motion is significantly higher than that due to listening energy, this appears to be a reasonable choice. An exception would be the case where the transportation was provided by a host, such as a walking person. This case would rarely be practical since a fairly large network would require either many persons to move all the nodes in a synchronized manner and the network's environment is often not suitable to human intervention. The second case is the originator is mobile. It executes the blitzkrieg phase twice—once at the old location canceling the hop count information and again at the new location to update the nodes with the correct hop information. Note that a mobile originator that cancels its original warning message could negatively affect the network performance. Nodes more than h hops from the originator, where h is the number of hops beyond which nodes sleep before entering the distribution phase, may be asleep when the originator sends out the cancellation message. In this case, if the new location of the originator is closer to those nodes, then the distribution of code will be delayed. The speed of the mobile originator would also affect network performance. A slow-moving originator that moves across a large portion of the network may reach its new location at a much later time, such that the network has re-entered the quiescent phase while waiting for the code update. In this case, there would be a small impact on performance since it would be akin to have a newer version of the code appear in a neighborhood when nodes are in the quiescent phase. On the other hand, a fast-moving originator could reach parts of the network that are sleeping. In this case, code upload would take longer waiting for the nodes to awake.

Suitable pseudo-code for the quiescent phase is shown below:

```
1. if (heard redundant advertisements)
     a. R ++
     b. Call TestQuiescencePhase(R)
2. endif
3. TestQuiescencePhase(R)
4. {
5. if (R > 5)
     a. Choose random number from 0 to 1
     b. If Rand > 1−1/$b_N$ then Sleep for advertisement period τ/2
6. endif
7. }
```

The quiescent phase is initiated only after 6 or more redundant advertisements are heard, in which case the node assumes that every node in its vicinity has the most recent download, so it is now reasonable to sleep. R is the number of redundant advertisements heard, N is the number of neighbors. Lines 5a and 5b show that as the node has more neighbors it is more likely to sleep for a predefined interval τ/2.

1.4 Location Information

In this extension, we equip Freshet with precise location information for the nodes. In the basic version of Freshet, the only network information available to a node is the number of hops it is distant from the source of the data. However, due to the variability of the wireless channel, not all hops are made equal. Simply put, a single hop channel between two nodes 50 ft apart may be substantially more unreliable than one between nodes 10 ft apart. The unit time to transfer code of multiple packets over the lower reliability link will be higher since all the packets of a page must be received for the page to be successful. The wireless channel characteristic is dynamic and therefore, the number of hops traversed by the warning message may not be representative of the number of hops traversed during the actual code upload. The hypothesis is that given richer information on network topology, a node may improve its knowledge of how far it is from an injected code image and thus improve the estimate of the time to sleep. In the basic version, the design is motivated by energy savings and therefore each node picks a conservatively high value of time to sleep, giving an operating point of low energy consumption and high delay. The information that we choose for refining this estimate is the location information. Each node is aware of its location and disseminates this with the warning message during the blitzkrieg phase.

In this system model, each node either knows its own location with special hardware, such as a GPS receiver, or may obtain it through a network protocol using nodes with location information, such as the protocol in N. Malhotra, M. Krasniewski, C. Yang, S. Bagchi, and W. Chappell, "Location Estimation in Ad Hoc Networks with Directional Antennas," *Proceedings. 25th IEEE International Conference on Distributed Computing Systems (ICDCS 2005)*, pp. 633-642, 2005, which is hereby incorporated by reference. The mapping of distance from code source to delay can be made through analysis, provided the constituent delays can be represented using closed form formulae. In the case of our experimental testbed, this appears not to be the case due to the nature of the MAC layer protocol called B-MAC, which is a variant of the 802.11 CSMA/CA MAC protocol. The determination of the time to propagate code is thus from a predetermined equation based on empirical results. The empirical result depends on the size and density of nodes in the network and thus, this is additional information pre-loaded into each node. In the current design, the nodes make a lower bound estimate on the code propagation time to optimize for latency. FIGS. 3 and 4 demonstrate the correlation between the distance from the code source and the time to disseminate code using the TOSSIM simulations. Both figures represent the time for complete download of the first page.

These figures are generated by running Freshet without any sleeping nodes and thus give an estimate of the best case performance, i.e., lowest delay for code propagation. The behavior of this characteristic is approximately linear with distance (correlation of line is 0.83 and 0.82 respectively for the 400 and 100 node networks), so we can approximate the time for a node to sleep through linear regression analysis for a given network size.

1.5 Multiple Page Transfer

The second extension is to optimize the number of control messages using knowledge of the pattern of code dissemination. The authors of [6] show that even with aggressive advertisement suppression in Deluge 18% of all packets are control packets. In particular, when a new code image enters the network, handshakes for each page—the cycle of advertisement, request, and code—delay progress in pushing code through the network. We target this source of overhead in Freshet to increase the utilization of the channel bandwidth. The underlying intuition is that if a large fraction of the neighbors of a node need several pages, the node can send these pages without repeated iterations of the handshake cycle. We call this mode the multi-page mode.

This trigger for the multi-page mode is reached by listening to advertisement messages. When a code sender only hears advertisements for older code images, then this sender is aware that its new update will be needed by all nodes within its immediate range. In this case, it is beneficial to optimize channel use by sending the multiple requested pages as quickly as possible without sending advertisements for each individual page. A node needing code assumes that the sender will send the appropriate pages without continuing to request those pages. If a node doesn't successfully receive all the packets of a page, then it sends a request for a retransmission. This is the only source of control packets in the multi-page mode. Following a given wait period, the sender transmits the next page without having had to advertise it, and without having had it requested. This reduces the code upload delay and improves channel utilization.

FIG. 5 shows the state transition diagram for this handshake scenario—the upper half corresponds to the sending node and the lower half to the receiving node.

1.6 Multiple Originators

This component of the design of Freshet deals with situations where a network may have multiple identical code sources in different locations. In many cases with a deployed sensor network it is hard to access nodes inside the mesh of the network, but easy to access the outside edges of the network. A user may deploy additional sources with the goal of reducing the time to propagate code through the network. Recollect that the term originator refers to one of the original sources that initiated the code propagation.

In Freshet, the use of multiple data originators would effectively partition the network into smaller portions. We propose a scheme to distribute pages out of order to improve dissemination in the network as a whole. Through out of order dissemination of pages it is possible that when pages distributed from different originators meet, they may fill in the "gaps" in each node's code image. This allows us to create fresh sources from which code can be disseminated. In this design, it is fundamentally important to design negotiation scheme so that collisions between multiple nodes trying to push code can be handled.

Thus, we propose the concept of node parity, where the parity of a node is determined by which set of pages it chooses to disseminate first when it already knows that there are other originators in the network sending pages with different parity. In particular, Freshet has numSrc originators sending code of size $p_{max}$ pages into the network. For a given originator $s_j$, said to have parity j ($0 \le j < numSrc$), it will first send out pages numbered i such that i mod numSrc=1. After distributing these $p_{max}$/numSrc pages, it will then distribute pages numbered i such that i mod numSrc=j−1, j−2, ..., 0 and then numSrc−1, ..., j+1. It is assumed that the deployment of the originators is done with some thought—they are relatively evenly spread and are assigned non-overlapping parities.

The next problem is how to resolve conflicts between nodes with pages of different parity. For a node with an incomplete image there is the concept of cycles, one for each parity in the network, with the node switching through the different cycles. The following diagram depicts node behavior in a network with two parities. It goes through an even cycle and an odd cycle.

| Cycles for 2 originators | | | |
|---|---|---|---|
| Listen | Advertise/Req even pages | Listen | Advertise/Req odd pages |

Each cycle has one slot for listening and one for advertising and requesting. The cycle is dedicated to the particular parity when activity pertaining to both parities is happening around the node. However, if the node hears a consecutive advertisements of one parity, where a is a user-defined parameter, then it will use all available cycles for that parity. This is to ensure that cycles are not idled for pages of a given parity that are still far off from a node. As in Deluge, pages may only be downloaded sequentially within that parity. Thus, with two parities, the motes must download page 5 before page 7.

An optimization in Freshet for interleaved pages is that if a node's radio is idle in a given cycle and data is available, the node will utilize the cycle to get the data. What is sacrosanct is that a node does not transmit meta-data outside the turn. This is important to prevent the protocol from thrashing in which only meta-data exchanges happen and the network's throughput goes to zero.

1.7 Coordination with User Application

We have to be aware that Freshet does not execute in isolation at the sensor nodes. The nodes run some user application which generally causes the node to operate with a low duty cycle, i.e., the node sleeps for most of the time and wakes up for short time interval to perform its tasks (like sensing, sending data to base station, etc.). This helps the node to reduce the power consumption due to idle listening and thus to lengthen the lifetime of the node. In our discussion of Freshet so far, we have assumed that Freshet can put the node to sleep according to its own calculation, disregarding the fact that the user application may require the node to be in the awake state to perform its tasks during this interval. In reality, Freshet cannot make this unilateral decision. Here we discuss the simple change to Freshet so that it can co-exist with low duty cycle user applications.

We address this issue by mandating that Freshet is informed of the sleep-awake schedule of the user application. The condition for putting a node to the sleep state becomes:
1. User application puts the node to the sleep state AND
2. Freshet puts the node to the sleep state either between the blitzkrieg and the distribution phases (according to Section 1.1) or during the quiescent phase (according to Section 1.3).

The pseudo-code for managing the sleep/awake schedule is shown below and includes references to 4 timers used by Freshet: Freshet_sleep_timer, Freshet_awake_timer, UA_sleep_timer, and UA_awake_timer. If these are hardware timers (there are 4 for the Mica2 platform), then the microcontroller can also be in the sleep state when the node is put to sleep. UA_sleep_interval and UA_awake_interval are the user application defined awake and sleep intervals respectively.

1. UA_awake_timer.fired( )
    UA_sleep = FALSE
    UA_sleep_timer.start(UA_awake_interval)
2. UA_sleep_timer.fired( )
    UA_sleep = TRUE
    UA_awake_timer.start(UA_sleep_interval)
    Put the node to sleep
3. Freshet decides to put a node to the sleep state (either between blitzkrieg phase and distribution phase or during quiescent phase)
    $t_1$ = Duration for which Freshet decides to put the node to the -continued

```
            sleep state if(UA_sleep = = FALSE)
                t₂ = UA_awake_interval-(time elapsed since
                UA_awake_timer fired)
                Freshet_sleep_timer.start(t₂)
            else
                Freshet_sleep_timer.start(0)
4.      Freshet_sleep_timer.fired( )
            t₃ = UA_sleep_interval-(time elapsed since UA_sleep_timer fired)
            if(t₃ < t₁)
                Freshet_awake_timer.start(t₃)
            else
                Freshet_awake_timer.start(t₁)
        Put the node to sleep
5.      Freshet_awake_timer.fired( )
Wake up the node
```

1.8 Time Between Blitzkrieg and Distribution Phases

Next, we analyze the separation in time between the blitzkrieg and the distribution phases. For a node one hop away from the originator of the new code, this time interval is the time for a single round of a three way handshake. Assuming perfect pipelining of the single page of the code, the time interval $T_{delay,h}$ between the blitzkrieg and the distribution phases for a node h hops away from the originator of the new code is $T_{delay,h}$=h.$T_{round}$ where $T_{round}$ is the time for a single round of the three way handshake. $T_{round}$ consists of following components:

$$T_{round} = T_{adv} + T_{req} + T_{data}$$

where $T_{adv}$ is the time used by the nodes in advertising their metadata before the node requiring the new code decides to send the request. $T_{req}$ is the time used for requesting the data and $T_{data}$ is the time required to send one page of data.

To calculate $T_{adv}$, $T_{req}$ and $T_{data}$, we need to find the expected number of transmissions required for a successful transmission of a packet. Let $P_s$ be the probability of a successful transmission of a packet over a single hop. Assuming that the retransmissions of a packet are independent, the probability that the number of transmissions of a packet, $N_{tx}$, equals k is given by $$P(N_{tx}=k) = (1-P_s)^{k-1} P_s$$

The expected number of transmissions for a given packet is $$E[N_{tx}] = \sum_{k=1}^{\infty} k(1-P_s)^{k-1} P_s = \frac{1}{P_s}$$

$T_{adv}$ can be approximated as follows:

$$T_{adv} = E[N_{tx}](t_l + GX^2 + T_x + T_{proc})$$

where $t_l$ is the approximate time interval between two advertisements. Note that reprogramming protocols like Deluge divide time into intervals $[t_l, t_h]$ and each node decides whether to advertise or not in a given interval based on the number of similar advertisements it has heard in the previous interval. We take the lower value $t_l$ because once the originator gets the new version of the code, it sets its advertisement period to $t_l$ and the nodes hearing the advertisement from the originator also set their advertisement periods to $t_l$. We also assume that there were not enough similar advertisements in the previous interval to prevent the node from advertising in the current interval. $GX^2$ is the MAC delay for a single packet, where X is the number of contending nodes. The MAC delay is difficult to compute analytically for 802.11 and no closed form solutions exist. The curve shown in [21] indicates that for the region of interest (low contention) the delay is approximately proportional to the square of the number of contending nodes. Here G is the proportionality constant and X is the number of contending nodes. $T_x$ is the transmission time for a single packet. $T_{proc}$ is i the processing time required by a node after receiving the packet. $T_{req}$ can be calculated as follows:

$$T_{req} = E[N_{tx}] E[N_{reqs}] (E[t_r] + GX^2 + T_x + T_{proc})$$

where $E[N_{reqs}]$ is the expected number of requests a node makes to complete a given page and $E[t_r]$ is the expected time between two requests.

$T_{data}$ can be calculated approximately as follows:

$$T_{data} = E[N_{tx}] N (GX^2 + T_x + T_{proc})$$

where N is the number of packets in a page.

FIG. 6 shows the time interval between the blitzkrieg and the distribution phases as a function of hop count for a grid network with δ=10 ft separation between adjacent nodes. Probability of successful transmission of a packet $P_s$ is taken as 0.9. For Deluge, $t_l$=2 seconds, $t_r$=0.5 seconds and N=48 packets.

From the above-referenced paper by Hui et al. regarding Deluge, we take $E[N_{reqs}]$=5.4. For mica2 node, transmission rate is 19.2 Kbps and hence $T_x$=0.015 seconds. We take $T_{proc}$=0.001 seconds. To calculate MAC delay $GX^2$, we take G=1, per G. Khanna, S. Bagchi, and W. Yu-Sung, "Fault Tolerant Energy Aware Data Dissemination Protocol in Sensor Networks," at the *International Conference on Dependable Systems and Networks*, pp. 795-804, 2004, which is hereby incorporated by reference.

For a given node, the number of contending nodes varies with the location of the node in the network. For example, for the grid network, the nodes along the diagonal of the grid have higher number of contending nodes while those at the periphery have less contending nodes. We assume that the network is large and hence the average number of contending nodes is $9/4δ^2$ (eliminating boundary effects) and the number of contending nodes is $9/4δ^2 \times \pi r^2$ where r is the transmission range. The interference range of a node may be different from its transmission range. The difference can be easily accommodated in our analysis by replacing the communication range with the given interference range. FIG. 6 shows that the time between the blitzkrieg and the distribution phases is quite large for the nodes distant from the originator of the code. Under Freshet the nodes can sleep for this duration, and thus Freshet can conserve the energy for network reprogramming which increases with the network size.

1.9 Effect of Hop Estimation on Code Propagation

In this analysis we will inspect the effect of hop estimation on saving energy and delaying download of a code update. Let us assume a square network of arbitrarily large size. The code source is node A, and we will investigate the propagation time to a node B h hops away from A.

Let the expected propagation time of one page between two nodes one hop away be D and the variance be V. The propagation delay between any two nodes is assumed independent of that between the next set of nodes. Let X be the random variable for the time to propagate one page from node A to node B. Using the central limit theorem, X follows a Normal distribution with mean $D_{agg}$=h*D and variance $σ^2$=h*V, for reasonably large h, say greater than 10. Given these parameters, we wish to select a sleep period for node B that ensures high energy savings and guarantees with high probability that the code update reaches node B while B is awake. Therefore we wish to select the time to sleep, $T_{sleep}$, as some value $D_{agg}$+f*σ, where f is in the set of real numbers, greater or less than zero. Since X is normally distributed, we can calculate the probability for a given f that B will be awake when it sees the code update; we can also calculate the expected energy savings for a given value of f. Since Deluge does not turn off its radio at all, the energy savings of Freshet corresponds to the entire time that the radio is turned off. Therefore, the expected energy savings for parameter f is (3 V)(7.03 mA)($D_{agg}$+fσ) (using parameters for the Mica2 mote). Assuming that D is 50 s and V is 225 $s^2$ (reasonable values as seen from the experiments—the high value of D is explained by the fact that each page has 48 packets, each of which needs to be received at the end of the link), this expression is graphed in FIG. 7 for h=30. This figure shows the energy savings increasing linearly with f. However, there is a significant tradeoff for high f values. For instance, at f=0 there is 0.5 probability that node B will be asleep when the code update reaches it. This naturally seems problematic and will prevent a fast dissemination of the update.

To determine the expected additional delay due to sleeping (conditional expectation, conditioned on the fact that there is additional delay due to sleeping), we subtract from the sleeping time, the expected time when the code reaches the node. For a given f the expected delay will be $$E[\text{Delay}] = (D_{agg} + f\sigma) - E[\overline{X} \mid x \leq D_{agg} + f\sigma] = \qquad (1)$$

$$(D_{agg} + f\sigma) - \frac{\int_{-\infty}^{D_{agg}+f\sigma} x * e^{-(x-D_{agg})^2/2\sigma^2} dx}{\int_{-\infty}^{D_{agg}+f\sigma} e^{-(x-D_{agg})^2/2\sigma^2} dx}$$

This expression is evaluated for f from −4 to 4 and is shown in FIG. 8. It increases super-linearly with increasing f.

We extend our analysis to see what the effect is when the network experiences multiple delays due to nodes sleeping when the code reaches them. Let us consider a square network and a node A as the code source and a set S of nodes equidistant from A. While nodes in S are sleeping, the network is partitioned. Each set of nodes after S will be labeled S+k, where k=1, . . . , ∞ is the number of hops between S and the set S+k. We again assume that there is no additional delay due to sleeping at S due to nodes closer to A than S sleeping.[1]

[1] Henceforth in the discussion, we will abbreviate additional delay due to sleeping by simply delay, where there is no scope for confusion. The implicit understanding is that normal delays due to propagation will be added to get the total delay.

There are two cases to be considered for analyzing the delay of the set of nodes S+n—the case where there is no prior sleeping and the case where there is prior sleeping. Let the total sleep delay at S+n be represented by R[S+n] and D(S+n) be the expected value of delay due to sleep of S+n under the condition that there is no delay due to sleeping prior to S+n. Let $P_{asleep}$ represent the probability that $x \leq D_{agg}+f\sigma$ at a given node S+i. Therefore, probability that all nodes prior to S+n are awake when they receive the code update is $(1-P_{asleep})^{n-1}$. For small enough n, $P_{asleep}$ can reasonably be taken to remain constant since the time to sleep is proportional to the number of hops. Thus, the expected delay at S+n given that there is no prior sleeping is $D(S+n)*(1-P_{asleep})^n$, where D(S+n) is from equation (1) but with the modification to $D_{agg}$ and σ according to the number of hops. The second component is the delay due to previous nodes. The delay at node S is R[S]=D(S). The delay at nodes S+1 is broken into two cases—one where S is awake and another where S is asleep, giving the expectation expression $P_{asleep}*D(S+1)*(1-P_{asleep})\pm P_{asleep}*P_{asleep}*X$. X is the expected delay due to sleeping at S+1 given sleeping at S. The sleeping delay at S is R[S], but this sleep is time that S+1 may still sleep without any sleeping delay incurred.

Therefore, the quantity X is the difference between the expected sleep at S+1 and the total sleep at $S=D(S+1)P_{asleep}-R[S]$. To force X to be positive, we define $X=\max(D(S+1)P_{asleep}-R[S], 0)$. Extending this analysis to nodes S+n, X becomes the difference between D(S+n) and the sum of all R[S+i] from i=0 to n−1. R[S+n] becomes $(1-P_{asleep})^n*P_{asleep}*D(S+n)+(1-(1-P_{asleep})^n)*(D(S+n)P_{asleep}-\Sigma R[S+i])$, which simplifies to $(P_{asleep}*D(S+n)-(1-(1-P_{asleep})^n)*\Sigma R[S+i])$.

FIGS. 9 and 10 show the delay from sleeping as hops from the source are increased, with the set S at hop 15 for f=−1 and f=−2. It is noteworthy that as the number of hops increases, the delay due to excess sleeping will disappear. Thus beyond a certain number of hops (35 for f=−1, 25 for f=−2), the nodes will always be awake when the code arrives. The accumulation of delay shows that if the code reaches some part of the network that is asleep and must wait, the delay due to sleeping incurred at that point has progressively less effect as the code goes away from that part of the network.

2 Experiments and Results

We simulate Deluge (from TinyOS release 1.1.11) and Freshet (built on top of this release of Deluge) using TOSSIM. While TOSSIM does not imitate hardware precisely, its purpose in these experiments is to compare Deluge's performance to that of Freshet in larger networks. Any changes in code dissemination time or behavior a real-world environment due to the approximations of the simulator would apply equally to Deluge and Freshet. The code is fragmented into pages each consisting of 48 packets of 36 bytes. The nodes are arranged in a rectangular grid with constant 15 ft. spacing between adjacent grid points. A square placement of nodes on the grid is used to give N×N nodes, where N is varied for the experiments. Henceforth, the term "N nodes square" will imply a total of $N^2$ nodes in the network. The amount of sleep time for a node h hops away from the warning message is 8(h−1) for h≥4. This equation was found empirically and generally yielded adequate responsiveness in the network while still guaranteeing some period of sleeping for nodes far from the source of the code. For experiments with location information, we independently found the best fit for each network size. This helped create the most reasonable estimate of code propagation speed in a given network. The BER was set for each link through use of the TinyOS LossyBuilder tool. We used the default communication range of 50 ft for the simulations. This loss model is specific to the empirical setting of TOSSIM's LossyBuilder and is used as a reference model for comparison with Deluge.

TOSSIM does not have built in simulation for energy computation, nor does it have a radio model with power management features. Therefore, we used PowerTOSSIM to track energy usage. See, e.g., the following paper, which is hereby incorporated by reference: V. Shnayder, M. Hempstead, B. R. Chen, G. W. Allen, and M. Welsh, "Simulating the Power Consumption of Large-Scale Sensor Network Applications," at the *Proceedings of the 2nd International Conference on Embedded Networked Sensor Systems*, Baltimore, Md., USA, pp. 188-200, 2004. For energy consumption we used the Mica-2 hardware model with the parameters as in the following table.

| Energy model used for experiments | | | |
|---|---|---|---|
| Radio idle or receive | 7.03 mA | EEPROM Write current | 18.4 mA |
| Radio transmission (max transmit only) | 21.5 mA | EEPROM Write time | 12.9 ms |

-continued

Energy model used for experiments

| | | | |
|---|---|---|---|
| CPU Active, Idle | 8.0 mA, 3.2 mA | EEPROM Read current | 6.2 mA |
| Radio sleep | 1 µA | EEPROM Read time | 565 µs |

The completion time in Deluge scales linearly with object size. Through our Freshet experiments we found that energy use followed a linear increase with object size as well, and hence we do not discuss results with varying object size.

2.1.1 Single Originator Results

We ran our first set of experiments with code image consisting of 5 pages in networks of sizes of 6-20 motes square. The simulations are run 3 times for each network size. They are started with all the nodes being active, and at 10 seconds into the simulation the originator starts transmitting the code pages. The simulations are run until all the nodes receive all the pages, which is the time presented in the results as the time for code upload.

In all cases we are evaluating the radio energy usage of Deluge and Freshet. We also track the CPU energy usage and energy from EEPROM writes and reads, but we found that the differences in this energy use due to these heads between Deluge and Freshet were negligible.

FIG. 11 shows that as the number of nodes increases in the network Freshet saves more energy compared to Deluge. The energy gains of Freshet increase with network size since the energy spent per node is lower in Freshet.

These plots give the total energy spent in the network and therefore scale based on the energy used per node. Clearly, a larger network uses more energy due to more nodes, but since there is also more time for code to propagate, each node will need to spend more time waiting for code, which is used in Freshet for sleeping. This figure shows two main characteristics. First, the smaller networks use much less energy than the middle-sized networks. This is primarily due to the increase in the average hop distance between the originator and the nodes—in the 8×8 network the diameter of the network is 2-3 hops while in the 11×11 network it is 4-5 hops. Each hop increases download time and therefore increases energy use. However, as the network size continues to increase, the energy use begins to level off. We found that for up to a 10×10 network the propagation time is proportional to the product of the network diameter and the code size. Beyond that size it is proportional to the sum of the diameter and code size as shown in FIG. 11 and in accordance with the result reported in [6]. Thus the total energy plot is approximately linear as the network size increases and the energy consumption per node levels off. FIG. 11 also shows that Freshet with location information does not save as much energy as baseline Freshet, although it outperforms Deluge by a sizable margin. The location information "penalizes" Freshet because it causes nodes to turn their radios on earlier to minimize latency.

As far as time to completion, the location information grants greater granularity in estimating the time it will take code to reach the node. Let us consider nodes A, B, C, and D, where A is the code source, B is 15 feet from the code source, C is 30 feet, and D is 45 feet. The blitzkrieg phase working without location information propagates hop estimates through broadcast messages that if received properly will give the same hop count to node C and node B (and in some cases D). However, based on packet loss rates node C is less likely to receive that warning message at the same time as B, and therefore will probably be labeled as two hops from the sending node A. However, C is still within range of A when A starts transmitting the code update and will likely receive some packets directly from A. Thus, the hop based model gives a higher estimate of time for code to reach a node compared to the accurate location based estimate.

Our simulations found that on average a data message propagates 19 feet in a network with 15 foot spacing between nodes. This implies that approximately once every three hops the data message propagates to one node 15 feet away and another 30 feet away. So in practical terms the situation outlined above occurs about 7 times in a linear network of 1 by 20 nodes, and naturally more frequently in a 20 by 20 network. This jumping beyond the nearest hop is less likely during the transmission of the warning message because of the higher level of congestion in the network. This leads to the result that the blitzkrieg phase overestimates the number of hops a node is away from the source.

As would be indicated by the design, the energy savings happen for two reasons. The nodes far from the originator node use the blitzkrieg phase to turn off their radios for the appropriate period of time before they must start transferring pages. The second reason is that nodes near the source that complete their code transfers first will have lower duty cycles for their radios as they enter the quiescent phase.

FIG. 12 shows the average energy saved per node with distance from the code source for a 20×20 network. The energy saving is calculated as the difference between the idle radio power consumption and the node sleeping power consumption, multiplied by the time. The time is the time for the entire network to download the code completely.

The nodes closer to the originator are able to save energy through the quiescent phase by turning off their radios once they have acquired all of the code Similarly, nodes far from the code source can save energy through the blitzkrieg phase but must still spend more time with their radios on to acquire the code updates.

FIG. 13 shows the relative completion times for code upload of the three protocols. In all cases Deluge outperforms Freshet though Freshet with location information performs almost identically to Deluge. The location information helps Freshet minimize cases where the update reaches a sleeping node.

However, based on FIG. 11 we see that Freshet uses less energy without the location information. The tradeoff indicates a design consideration—in cases where speed takes precedence, then it is better to have location information, but in cases where energy is more important, then location information is not necessary or the scheme that calculates the sleeping time based on location information has to be modified.

FIGS. 14 and 15 demonstrate the profile of energy savings of the nodes in the network at two different time points of the code upload process. FIG. 14 shows the distribution of node energy savings when 75% of the network has got the complete code. The energy savings at this point are due to the estimate of the time between the blitzkrieg and the distribution phases and sleeping for part of it. FIG. 15 shows the same network 150 s after 92% of the network is completed. It is clear that a much larger percentage of the network has increased its energy savings in this time since the quiescent phase has set in.

2.1.2 Multiple Originator Results

Our second set of experiments was run with two originators at the top left and bottom right corners and code size of 4 pages in networks consisting of 8 through 12 nodes square. We compare the performance of Deluge, with one and two originators and Freshet, also with one and two originators. In Freshet, one originator is set to prioritize distribution of even numbered pages and the other odd numbered pages.

FIG. 16 summarizes our results with the two Freshet bars to the left of the two Deluge bars. Multiple originators always improve performance in networks with 100 nodes. Specifically, when the originators are farther apart due to the larger network, the interleaving of pages in Freshet outperforms both Deluge with one or two originators.

This result occurs because of collisions in the code pages from the two originators for Freshet. This problem is the hidden terminal problem and limits the functionality in networks with less than 100 nodes. For a sufficiently large network, however, page interleaving with proper contention resolution as in Freshet enables nodes near the middle of the network to complete downloading their code images earlier. They can then distribute code to others in the network.

2.2 Multiple Page Transfer

We conducted a series of experiments with different techniques for the multi-page transfer extension. The first experiment involved varying the number of packets sent per page, effectively increasing the size of the page sent per handshake and thereby reducing the control traffic. This network was a 2×10 network with uniform bit-error rates between adjacent nodes. The control parameter is the bit error rate (BER). This relationship is particularly important because it is the key in finding a proper page size. With a sufficiently reliable network, it is practical to send as many packets per page as possible. However with unreliable links, more control messages are used requesting packets lost in transmission. The advantage of limiting the page size is useful in networks with questionable reliability—a large page takes longer to download in a lossy network, increasing the time before the page can be propagated in a pipelined manner. In the experiment, packet size is constant at 36 bytes and each code image uploaded is 384 packets. The BER was varied till 1.5% and the effect on time to upload code measured for the two cases of 48 packets/page and 96 packets/page. FIG. 17 shows our results. For smaller BER, transmitting the larger sized pages is advantageous due to the reduced amount of control traffic. Once the BER passes 1% we see a sharp increase in the time to transmit the code image in both cases. Once the BER gets sufficiently large (>1.3%), the high loss rate of packets affects the performance of the larger-sized pages. Beyond BER 1.5%, the network did not function properly due to the high packet loss rate, which made simulations excessively long (1.5% BER≡11% packet loss rate).

The second experiment sought to demonstrate the effect of sending multiple pages without the intervening handshake of advertisement and request between pages (FIG. 18). The BER was configured through the TinyOS LossyBuilder utility, which generates network loss rates from the physical topology. Each page was the standard length of 48 packets. In the incremental page send mode, the node would continue to send pages till there was a request for retransmission due to packet loss. The experiment was conducted for getting the code uploaded into a node surrounded by 8 nodes on surrounding grid points each with the complete code. Visualize a 3×3 sub-grid with the middle node not having any part of the code. The number of pages in the code image was varied from 1 to 20. The results for less than 10 pages showed no noticeable difference. However, after 10 pages we noticed a significant difference between the standard Freshet and multi-page Freshet. This trend occurs because the extra control messages that normally occur in Freshet become sufficient to cause a delay in transmission of code.

2.3 Testbed Demonstration

As we discussed earlier, the advantages of Freshet over Deluge will be pronounced only for large networks with tens of hops. This would entail a testbed of several hundreds of nodes (note that as reported in [6], 75 nodes gave a 5 hop network). We do not have access to such a large testbed and therefore the purpose of the first set of the experiments on a 16 node testbed is to demonstrate that in small networks Freshet performs comparably to Deluge. In the second set of experiments, we demonstrate the energy savings achieved by Freshet for linear networks having up to 15 hops.

We perform the experiments using Mica2 nodes having a 7.37 MHz, 8 bit microcontroller. Each Mica2 node is equipped with 128 KB of program memory, 4 KB of RAM and 512 KB external flash which is used for storing multiple code images. These nodes communicate via a 916 MHz radio transceiver. For our experiments we used 2×2, 3×3 and 4×4 square grid networks having a distance of 5 ft between adjacent nodes in each row and column This creates a network of diameter 3 hops by setting the transmission power level to 25 (of a range of 1-255). Lower values of the transmission power to increase the number of hops result in poor reliability and are therefore not used. Experiments of network reprogramming using Freshet are carried out by installing Freshet and same version of application code on all nodes in the network. A new code image is injected into the source node (situated at one corner of the grid) via a computer attached to it. Then the source node starts disseminating the new application image to the network. Experiments with Deluge are performed similarly by having all nodes install Deluge instead of Freshet.

Reliability of code upload is an important evaluation metric. Any network reprogramming protocol must ensure that all nodes in the network receive the application image completely in a short period of time without expending too much energy. A second important metric is the time required to reprogram the network since the network functionality is degraded during reprogramming. Since the sensor network consists of energy-constrained sensor nodes, the reprogramming protocol should use minimum energy to increase the lifetime of the network. Both Deluge and Freshet are 100% reliable, i.e. all nodes in the network download every byte of the user application. So, in our experiments, we focus on time to reprogram the network and the energy consumed during reprogramming Time to reprogram the network is the time interval between the instant $t_o$ when the source node sends the first data packet to the instant $t_1$ when the last node (the one which takes the longest time to download the new application) completes downloading the new application. Since clocks maintained by the nodes in the network are not synchronized, we cannot take the difference between the time instant $t_1$ measured by the last node and $t_0$ measured by the source node. Although a synchronization protocol can be used to solve this issue, we do not use it in our experiments because we do not want to add to the load in the network (due to synchronization messages) or the node (due to the synchronization protocol). Instead, once each node completes downloading the new application image, it sends a special packet to the source node saying that it has completed downloading the new application. The source node measures the time instant $t_1$ when it receives such packet from each node. If the network has n nodes including the source node, the computer attached to the source node receives one $t_0$ and $(n-1)$ $t_1$'s. We take $$t_{prog} = \max_{t_1'} (t_1' - t_0)$$

as the reprogramming time. It should be noted that the actual reprogramming time is $$\max_{t_1'} (t_1' - t_0 - t_d)$$

where $t_d$ is required to send the special packet from the last node to the source node. Since $t_d$ is negligible compared to the reprogramming time, our formula is a reasonable approximation to the actual reprogramming time. Moreover, the time $t_d$ is included for both Freshet and Deluge.

FIG. 19 shows the average time taken by Freshet and Deluge to reprogram 2×2, 3×3 and 4×4 grid networks along with 99% confidence intervals. The reprogramming times shown in this figure are the averages taken over 10 experiments for each topology. For these small networks, the reprogramming times of Deluge and Freshet should be equal. But we found that Freshet took 3.98% to 4.89% more time than Deluge to reprogram these networks because the size of Freshet is one page more than that of Deluge.

Among the various factors that contribute to the energy used in the process of reprogramming, two important ones are the amount of radio transmissions in the network and the number of flash-writes (the downloaded application is written to the external flash). Since the radio transmissions are the major sources of energy consumption, we take the total number of bytes transmitted by all nodes in the network as the measure of energy used in reprogramming In our experiments, each node counts the number of bytes it transmits and logs that data to its external flash. By reading the external flash and taking the sum of the number of bytes transmitted by each node, we find the total number of bytes transmitted in the network for the purpose of reprogramming Both data packets and control packets (request and advertisement packets for Deluge and request, advertisement and warning packets for Freshet) are considered while calculating the number of bytes. In our experiments we found that Freshet transferred only 0.37% to 0.52% more number of bytes than Deluge. Although Freshet has one more packet type (warning packets) than Deluge, its contribution is negligible because number of warning packets is insignificant compared to the other packet types. Also note that we have not counted the advertisement packets transmitted in the network during quiescent phase. If we consider them, the number of bytes transmitted in the network by Freshet will be smaller than that by Deluge.

As mentioned above, the advantage of Freshet over Deluge in terms of energy savings can be demonstrated only in larger networks. To do this with the limited number of sensor nodes that we have, we ran the experiments on various linear topologies having up to 16 nodes. As shown in FIG. 20, a source node (node 0) situated at one end of the line disseminates code to all the nodes in the network. Let the nodes be arranged as shown in FIG. 20 where the node next to node 0 is node 1, the node next to node 1 is node 2 and so on. To achieve maximum possible hops between the source node and the farthest node from the source node, we restrict the communication of a node i with node (i−1) and node (i+1) only. Each node logs the amount of time it sleeps between the blitzkrieg and distribution phases to its external Flash. This is used to calculate the energy savings compared to Deluge by using the formula: Savings=Voltage×(Current for idle radio+Current for idle CPU)×Sleeping time (as calculated from the experiments). The energy savings achieved by Freshet are shown in FIG. 21. Note that this figure does not consider the energy saving because of the nodes sleeping in the quiescent phase. If we consider the energy savings in the quiescent phase also, the energy saving due to Freshet increases monotonically with time. FIG. 21 shows that as the distance (number of hops) between the node and the source node increases, the energy saving increases linearly. This is because the amount of time each node sleeps increases linearly with hop-count. Due to our design of no sleeping for up to 4 hops, the energy saving only shows up beyond 4 hops. Note that we assume that both Deluge and Freshet consume the same transmission energy since the numbers of packets transmitted in the network by Freshet and Deluge during reprogramming are almost equal (within 0.52%).

3 Visualization of Network Behavior during Code Upload

A visual example of the network's behavior over time is provided by FIG. 22, which shows the positions of sleeping nodes in a 20×20 network as time progresses. The originator node is in the bottom left corner of the area. The small dots represent the nodes that have at least one page, the bigger dots (small solid triangles) represent nodes that are asleep, and the lack of any dot at a grid point represents a node that is awake but does not have a page yet. Solid squares indicate nodes that are sleeping after having received all pages.

FIG. 22($a$), ($b$), and ($c$) show that initially most of the network is asleep. In (d) most of the nodes have now turned their radios back on, and by (e) nearly all nodes in the network have at least one page. FIG. 22($f$) shows the transfer of the code image to be complete, and in (g) we find that the nodes near the originator have now begun to sleep in the quiescent phase. By (h) a larger fraction of the network is sleeping in its quiescent phase.

These figures show that Freshet can reliably predict when to turn its motes' radios on and off, thereby saving substantial amounts of energy. In some cases we see that motes that are near those that have already obtained a complete page and should be ready for beginning the distribution phase, are actually asleep (some nodes to the right in (d)). However, this is the exception rather than the norm, implying that network coverage is generally unaffected.

4 Conclusions

The Freshet protocol provides reliable code dissemination in a multi-hop sensor network. Freshet functions in three phases for each new code image—blitzkrieg, distribution, and quiescent. It aggressively conserves energy by putting nodes to sleep between the blitzkrieg and the distribution phases as well as the quiescent phase. Freshet introduces a scheme to disseminate code from multiple originators, use location information, and reduce control message overhead. Freshet is demonstrated using the TOSSIM simulator for the Berkeley motes and is found to be between 20-45% more efficient in energy compared to the Deluge protocol, while requiring about 10% more time for propagating the code.

SECOS—A Protocol for Energy Efficient and Secure Communication in Sensor Networks

1. Introduction

Another aspect of the present invention is a protocol referred to herein as SECOS (Scalable & Energy-Efficient Secure Communication On Sensors) for key management in static sensor networks that uses symmetric cryptography. High-level design goals in SECOS are to (i) provide a scalable and secure key distribution channel for any-to-any communication in a large-scale sensor network, (ii) minimize the adverse fallout of compromising any sensor node, (iii) make key management energy efficient, and (iv) reduce the end-to-end delay of secure data communication.

Using node clustering, SECOS divides the sensor field into multiple control groups and assigns a rotating control node to each group. Communication within a group occurs through the use of keys exchanged with the help of the control node, while inter-group communication involves establishing a secure channel between the respective control nodes through the involvement of the base station. Effectively, SECOS imposes a three-level hierarchy of the nodes—a single base station, multiple control nodes, and a large number of sensing nodes. Of these, only the base station is fixed, assumed to be secure and assumed not to have any resource constraints, while all the rest, including the control nodes, are generic sensor nodes. Although node clustering is a well-known technique, it has to be used with special care for key distribution to protect the network against the compromised nodes that play a special role in node clustering. The control nodes are assumed to be susceptible to compromise and are monitored and can be removed from their privileged role. SECOS also provides techniques for secure initial deployment and revocation of suspect nodes.

A key decision choice in SECOS is the control group size. We present a simple mathematical analysis to determine an upper bound on the control group size, due to the resource constraints on the control node and the allowable security. We then present an equation that quantifies the energy cost of key management in terms of several factors, including the control group size, and derive the optimal control group size for the most energy-efficient key management.

A promising approach for sensor key management has been proposed in a system called SPINS, which uses the base station as an intermediary for secure communication between any two nodes. We create a simulation model for comparing SECOS and SPINS with respect to end-to-end data latency and energy overhead of key management. For a fair comparison, we make the key caches also available to SPINS, though the original work does not mention caches. The simulation results show that SECOS reduces the energy consumption by a factor ranging from 1.2 to 7 and the end-to-end data latency by a factor of 1.05 to 1.50 depending on the communication pattern and the cache size. A large cache means keys are available locally and then SECOS performs comparably to SPINS. However, this also implies additional storage requirement and the deployment is less secure to nodes being compromised.

SECOS makes the following contributions among others:
1. It provides a scalable protocol for key management that is sensitive to the sensor node's resource constraints, including computation, communication, and bandwidth. While current technology trends may remove some of the resource constraints, such as memory and processing power, in the foreseeable future, while the constraints of bandwidth and energy are expected to remain for some time to come.
2. It presents an energy efficient method for key management and substantial energy savings are demonstrated without introducing specialized high cost nodes in the network.
3. The protocol is resilient to some nodes being compromised due to attacks. In fact, it guarantees that, under a given set of assumptions, the communication between two uncompromised nodes cannot be exposed, irrespective of the number of other nodes that are compromised Similarly, the protocol can tolerate some nodes being unavailable due to natural failures.

2 Description of Secos

A few techniques are central to the design of SECOS:
1. Refreshing the keys and purging the caches. The keys are periodically refreshed and the key caches are purged regularly for two important security goals. The first is to minimize the adverse fallout of compromising some nodes in terms of the number of old messages that are exposed. The second goal is to defeat possible cryptanalysis attacks by analyzing plaintext and ciphertext pairs processed with the same encryption key.
2. Changing the nodes which play a privileged role. We do not wish to assume a large number of specialized well-protected nodes in our environment. Therefore, we design for the possibility of the nodes with special key management functionality being compromised and provide for them to be changed either on a time schedule, or when triggered by anomalous events. Another important goal of the control role rotation among the members of the control group is to achieve load balancing and even energy drain since the control node's activities are more demanding.
3. Neighbor watch. Each node maintains a list of its immediate neighbors and can overhear neighborhood traffic in order to detect compromised nodes.

2.1 System Assumptions and Attack Model

System Assumptions:

We assume that the links are bi-directional, which means that if a node A can hear node B then B can hear A. Also, we assume that the network has a static topology, though the functional roles a node plays (e.g., cluster head, data aggregator, etc.) may change. Also we assume that the sensor nodes are distributed uniformly on the sensor field.

We assume that the base station in SECOS is secure, not prone to failures, and does not have any resource constraints (bandwidth, energy, etc.). Protection against failures can be achieved by fault tolerant techniques such as redundancy for natural failures, or through a variety of possibly expensive security mechanisms, such as tamper proof hardware, for malicious failures. We assume that there is a certain amount of time from a node's deployment, called the compromise threshold time ($T_{Comp}$), that is minimally required to compromise the node. A sensor node deployed in a security critical environment must be designed to sustain possible break-in attacks at least for a short interval (say several seconds) when captured by the adversary; otherwise, the adversary could easily compromise all the nodes and thus take over the network. Therefore, instead of assuming that sensor nodes are tamper resistant which often turns out not to be true and very expensive, we assume there exists a lower bound on the time interval $T_{comp}$ that is necessary for an adversary to compromise a sensor node, and that the time $T_{ND}$ for a newly deployed sensor node to discover its immediate neighbors is smaller than $T_{comp}$. In practice, we expect $T_{ND}$ to be of the order of several seconds, so we believe it is a reasonable assumption that $T_{comp} > T_{ND}$. The current generation of sensor nodes can transmit at the rate of 40 Kbps whereas the size of an ID announcement message is very small (12 bytes if an ID is 4 bytes and the hardware address size is 8 bytes). The probability of collision is quite small when a non-persistent CSMA protocol is used for medium access control. Moreover, a node can broadcast its ID multiple times to increase the probability that it is received by all its neighbors. Furthermore, we assume that no external node exists in the network during the neighbor discovery.

Attack Model:

A malicious node can be either an external node that does not know the cryptographic keys, or an insider node, that possesses the keys. An insider node may be created, for example, by compromising a legitimate node. All these malicious nodes can exhibit Byzantine behavior and can collude amongst themselves. Any malicious node can for example eavesdrop on the traffic, inject new messages, replay and change old messages, spoof other identities, or pass traffic from one location of the network to a colluding node in another location (wormhole attack).

2.2 Keys in SECOS

SECOS uses five types of keys: the master key, the volatile secret key, the session key, the authentication key (MAC key), and the pseudo random number generator key (seed).

Some Notations.

We will use the following notations for keys in the paper. $K_{AB}$ (=$K_{BA}$) refers to any secret key shared between A and B. The five kinds of keys—the master key, the volatile secret key, the session key, the Authentication (MAC) key, and the random number generator key, will be denoted respectively as $MK_{AB}$, $VK_{AB}$, $SK_{AB}$, $AK_{AB}$, and $RK_{AB}$. $E(K,X)$ denotes the encryption of a message X using key K. $MAC(K, Z \oplus X \| Y)$ refers to the application of the MAC algorithm, keyed by key K, to the result of the concatenation of Y with the result of Z xor-ed with X. $H(X)$ is the hash value of X. Any symmetric key encryption algorithm suitable for sensor networks may be used for encryption and decryption. It is desirable that the cipher text be the same length as the plaintext in order to reduce the message transmission overhead. An example of such a protocol is the counter mode (CTR) of block ciphers, which is described in the following papers, which are hereby incorporated by reference: Bruce Schneier, "Applied Cryptography: Protocols, Algorithms, and Source Code," C. John Wiley & Sons, $2^{nd}$ edition; W. Stallings, *Cryptography and Network Security: Principles and Practices*, third edition, Prentice Hall, 2003. Any underlying block cipher algorithm could be used with the CTR mode, e.g. DES and its variants 3DES and DES-X. See. e.g., the following references, which are incorporated by reference: National Bureau of Standards (NBS), Specification For The Data Encryption Standard, Federal Information Processing Standards (FIPS) Publication 46, 1977; J. Daemen and V. Rijmen, AES proposal: Rijndael, 1999; D. Wheeler and R. Needham, TEA, a Tiny Encryption Algorithm, 1994, http://www.ftp.cl.cam.ac.uk/ftp/papers/djw-rmn/djw-rmn-tea.html; and R. L. Rivest, "The RC5 Encryption Algorithm," Workshop on Fast Software Encryption, pp. 86-96, 1995.

The master key is burnt into each sensor node at manufacture time and is shared with the base station. It is not used for encrypting message communication channels, but instead to generate other keys to be used for encryption and authentication. Compromising the communication channel does not reveal the master key since it is not used in any channel communication. The volatile secret key is also shared between the node and the base station. It is used, along with the master key, to generate the session and MAC keys. After each generation of session and MAC keys, a new volatile secret key is generated by applying a hash function to the current volatile secret key, after which the current one is deleted and replaced by the new one. This provides SECOS with forward secrecy; if a node gets compromised, previous communications of the node are not exposed. This is due to the fact that the attacker is not able to generate the old keys since the earlier volatile secret keys are not available at the time of compromise, even though the master key is. As in the case of the master key, crypt-analyzing the communication does not reveal the volatile secret key since it is not used in any channel communication.

The base station also shares two counters with each sensing node, one for each direction (sending and receiving) of communication SC(M,S) and RC(M,S). These counters are kept synchronized by incrementing them on messages sent or received between the sensor and the base station. During synchronization, the receive-counter value at one party is matched with the send-counter value at the other party. However, the counters need not to be exactly synchronized; they can be off by some known number Sync_diff. When the counters are not synchronized, the key generated at the base station using SC(M,S) may not match the one generated at the sensor node using RC(S,M). Therefore, the sensor node adjusts (increments/decrements) RC(S,M), generates the key, and compares the key with that generated by M. The sensor node continues to do that until the keys are either matched or the number of adjustments to RC(S,M) equals Sync_diff. In the latter case the sensor nodes initiate counter synchronization with the base station. In addition to the conventional use of counters to achieve semantic security, they are used in SECOS as a variable input for key generation. The semantic security prevents a malicious node from replaying old, properly authenticated messages that was used to establish keys between legitimate nodes. The use as the variable input is required in the key generation process to introduce randomness. These counters are used to replace the job of a nonce or a sequence number that ordinarily would be attached to every message to prevent the replay of old messages. However, due to the fact that communication is far more energy consuming than computation, we use the shared synchronized counters to minimize the transmission overhead of the sequence number or the nonce with every message. FIG. 24 presents an algorithm that is used to synchronize the counters during key refreshment. Therefore, for most of the time, the counter synchronization does not incur any overhead and comes as a by-product of key refreshment. For example during the course of our simulations no counter synchronization is required beyond that with the key refreshment. New keys are generated by applying MAC and hash functions over data that includes these counters. FIG. 23(*a*) shows the initial keying material that includes the master key, the volatile secret key, and the counters.

The rest of the keys are derived from the previous two keys with the help of MAC (e.g. HMAC) and hash (e.g. MD5) functions that are preloaded on the base station and the sensors. The session key between the base station and a sensor node is generated by the base station, by applying a MAC function over the result of concatenating the binary representation of the number 1 with the result of the SC(M,S) XOR-ed with the volatile secret key. The same session key is generated by the sensor node by applying a MAC function over the result of concatenating the binary representation of the number 1 with the result of the RC(S,M) XOR-ed with the volatile secret key. The MAC function is keyed by the master key as shown in the bottom of FIG. 23 for $SK_{XY}$. The purpose of the session key is to provide data confidentiality for communication between two nodes. A similar mechanism is used to generate a shared authentication key between the base station and the sensing node with concatenation of the binary representation of the number 2 instead of the number 1, as shown in the bottom of FIG. 23 for $AK_{XY}$. SECOS uses independent keys for encryption and authentication since it prevents any potential interaction between the primitives that might introduce a weakness and is therefore a good security design principle. SECOS uses the standard key refreshment procedure for the session key and the authentication key. The session key and the authentication key are refreshed periodically or when triggered by a certain event, such as the detection of an attack. The pseudo random key is generated by each entity by applying a MAC function over the same parameters as for the session key with concatenation of the binary representation of the number 3. This key is used as a seed for the pseudo random number generator (e.g. RC4), which is used to produce the stream cipher such as in the CTR mode of DES. This key is refreshed only when the pseudo random string it generates is exhausted, which depends on the pseudo random number generator algorithm used.

Sometimes a packet sent from a source may not reach its final destination either due to a malicious event such as a compromised node in the path dropping the packet or due to natural node or link failure. As a result, the shared counters between these two parties may become unsynchronized, and a procedure has to be invoked to resynchronize them. Key refreshment is accompanied by shared counter synchronization between the two parties. However, the counter synchronization could be launched without the need to refresh any key. FIG. 24 shows the key refreshment procedure between, the base station, M, and a regular sensor node, S. The one-bit flag, Change, is used if the counter synchronization is accompanied by key refreshment.

2.3 SECOS Structure

A flat layout with a powerful base station and sensing nodes distributed through the sensor field and the base station being responsible for key management is clearly not scalable to a large number of nodes. This motivates the hierarchical structure of SECOS. The hierarchical structure we propose for SECOS has clusters of sensor nodes based on geographical proximity. Each cluster has a specially designated node called the Control Node, which plays a privileged role for key management. The cluster is called a Control Group. SECOS does not impose any special requirements on the control node, and it can be any ordinary sensor node in the cluster. This has the advantage of reducing the possibility of targeted DOS attacks to the specialized nodes. The control node acts as the intermediary for key management. It is periodically changed for the purpose of security (the control node may get compromised), and for more even energy drain (the control node and its neighboring relay nodes drain energy faster). This hierarchical structure shown in FIG. 25 consists of three levels of nodes. The root is the base station that is assumed to have powerful resources and is well protected. The internal nodes are regular sensor nodes selected to play the role of control nodes. The leaves are regular sensor nodes.

An important parameter in SECOS is the size of the control group. The size has two sets of determining factors, which exert opposing effects. The size has to be bounded within a maximum due to three factors—the resource constraints of the control node, such as the communication bandwidth and the computation capacity; the security concerns of not exposing too many nodes if the control node is compromised; and limiting the energy overhead of intra-group key management by bounding the distance between a sensor node and its control node. However, the size has to be kept above a threshold so that most communication occurs within a control group rather than involving multiple control groups since intra-group communication is more energy efficient than inter-group communication. Section 4 provides a detailed mathematical analysis of the control group size.

2.4 Topology Building and Maintenance

It is necessary for the base station to have information about the topology of the network and for each node to have some local topology information. Here, we discuss how such information is initially obtained and subsequently how it is updated and maintained.

As mentioned earlier, each sensor shares a master key, a volatile secret key, and two counters with the base station from which each sensor node, upon deployment, computes shared session and MAC keys with the base station. As a result, a secure session is established between each node in the network and the base station. Also, in the initial deployment phase of the network, each node builds a list of its neighbors and communicates this list to the base station. We assume that a node cannot be compromised and no external malicious nodes exist within the time it takes to build this list, thus implying that the base station gets a correct view of the neighbor information. We say that two nodes, X and Y, are neighbors if X can hear the transmission of Y. Since we only consider bi-directional links, this implies that Y can also hear the transmission of X. The list of neighbors at each sensor node is built by locally broadcasting a HELLO message, which is a small packet holding the ID of the sender, and then receiving a reply message, which is also a small packet holding the ID of the sender from each node that heard the HELLO message. As soon as the sensor nodes are spread in the sensor field, each node S broadcasts the HELLO message. For each reply received, S adds the sender ID to its neighbor list. Then S sends the full list to the base station authenticated using the authentication key shared between S and M ($AK_{MS}$). Note that neighbor discovery is secure based on our assumption that no malicious nodes exist in the network during the neighbor discovery. Also note that neighbor discovery incurs a relatively negligible overhead since it is performed only once during the deployment of the network which is assumed to be static. This process is shown in FIG. 26. The base station uses these lists to build a connectivity graph that represents the initial network topology and from that the control groups. The connectivity graph is built using an N×N connectivity matrix that is initialized to 0. For every member i in the neighbor list of S that M receives, M sets the entry (S,i) of the connectivity matrix to 1. Using the connectivity matrix with the knowledge of the limits on the control group size and the maximum number of hops in the control group, the base station generates the control groups. For example, to generate the first control group, M adds node number 1 to the group, then the neighbors of node 1 are added, then the neighbors of each neighbor are added, and so on until the full control group is generated.

Alternately, a secure routing protocol such as INSENS can be used to build the topology information and communicate it to the base station during the routing table construction, as described in J. Deng, R Han, and S. Mishra, "The Performance Evaluation of Intrusion-Tolerant Routing in Wireless Sensor Networks," *Proc. of IEEE 2nd International Workshop on Information Processing in Sensor Networks* (IPSN'03), LNCS 2634, which is hereby incorporated by reference.

The base station has a global view of the entire network connectivity. When a compromised node is detected, its neighbors are informed, possibly through authenticated multicast, as described in D. Bruschi and E. Rosti, "Secure Multicast in Wireless Networks of Mobile Hosts Protocols and Issues," ACM/Baltzer Mobile Networks and Applications, special issue on multipoint communication in *Wireless Mobile Networks*, Vol. 6, No. 7, December 2002, which is hereby incorporated by reference.

2.5 Assigning and Changing the Control Node

The base station divides the network, based on the topology it built during the setup phase, into control groups consisting of geographically proximal nodes. For each control group, it then designates a node as a control node, say C, and sends it a list of session keys that the base station generates for each node in the group. The list of keys is sent in a message that is encrypted using the shared session key between the control node and the base station ($SK_{MC}$). The session key is not sent to the sensing nodes in the group. Each sensing node generates that key on its own by applying a MAC function over the result of concatenating the binary representation of 1 with the result of the RC(S,M) XOR-ed with the volatile secret key shared between the sensor node and the base station. The MAC function is keyed by the master key. This process is identical to how the shared session key between the sensor node and the base station is generated independently by both parties as shown in the lower part of FIG. 23 for $SK_{XY}$.

When a sensor node serves as a control node, it does not perform any sensing and uses all its available storage to store the keys. The motivation for this is to restrict the functionality of the control node to key management to facilitate control node monitoring by its neighbors. If the control node were to also send sensory data, it would be impossible for the neighbors to distinguish between control and data traffic since both are encrypted. Also, the key management functionality drains more energy than the regular sensing functionality and we wish to have as even a drain among the different nodes as possible. Finally, the control node requires memory resources to store the keys and does more computations to facilitate key management and we wish to reserve as much resource as possible for the control node to serve its control role. Typically sensor networks have redundant deployments whereby an event can be detected by multiple sensors. This leads us to believe that a reasonable number of nodes (the control nodes) may be exempted from the sensing functionality without adversely affecting the coverage on the sensor field.

After the control node, C, receives the list of nodes in the control group, it broadcasts to the group members a message claiming that it is the new control node for the group. This message includes the list of neighbors of the control node that was built during the initial topology discovery phase. When a group member receives the claim, it buffers the claim. When the member needs to use C, it challenges C. The heart of the challenge lies in generating a random number using the random number generation key introduced earlier, authenticating it with the MAC key that should be available at the legitimate control node, asking C to do some processing on the number, and send it back authenticated. During this challenge the two nodes establish two shared counters between them. These two counters provide the same functionality as the SC(M,S) and RC(M,S) that are shared between each node and the base station. If the new control node successfully passes the challenge, the sensor node replaces its current control node with the new one and if it is a neighbor node to the control node, it stores the list of neighbors of the new control node for the purpose of control node monitoring (Section 2.9). Note that now the node has a shared session key with the control node, which is different from the shared session key with the base station. The initial control node set up is shown in FIG. 28. FIG. 27 shows how a node, S, challenge a new control node, say C, in addition to the establishment of the shared counters between them.

As mentioned in Section 2, we want to minimize the adverse fall out of a control node being compromised and provide tolerance against control node failures by regularly changing the control node. The control node is changed by the base station based on a certain time schedule, or when some anomalous events are detected, e.g., a compromised control node is detected. When the base station decides to initiate the change, it follows the same procedure as outlined above in this section for a new control node being assigned. In response to the announcement from the new control node, the previous control node, after challenging the new control node and being satisfied, flushes all the cryptographic data in its cache and returns to its normal sensing mode.

2.6 Key Caches

Each sensor node has two types of caches: (i) Regular cache: stores the session keys used to encrypt data in message communication between itself and any other node. (ii) Key request cache: When a node initiates a data exchange and it does not have the session key for the receiver, it initiates a key establishment process. Subsequently, it may generate more data packets for the same receiver, before the key has been established. The key request cache stores the IDs of such receivers.

In addition, a control node has two types of cache: (i) Ring cache: It stores the session keys between itself and each node in its control group. (ii) Control cache: It stores the session keys with other control nodes, which are used for inter-group communication.

2.7 Node to Node Communication within Control Group

When a node, say A, needs to communicate with another node within its control group, say B, it first checks in its regular cache for the session key. If present, it uses the cached key. If not present, A generates two random keys K and $\tilde{k}$ and encrypts one of them ($\tilde{k}$) using the other (K) as a key. Let us call K the Envelop. Node A sends the encrypted message E(K, $\tilde{k}$) to B. Node A encrypts the key (K) and sends it to the control node C as $E(SK_{AC},K)$. The control node recovers the key K, encrypts it $E(SK_{BC},K)$, and forwards it to the destination B. When B receives the key K from the control node, it can decrypt and obtain the key $\tilde{k}$ that will be used as the shared session key between A and B. When B receives the message that A sent, it stores the message temporarily for the key to arrive from the control node. If B does not receive the key from the control node within a specified time, it drops the packet. Nodes A and B store the session key in their regular cache and continue to use it till the control node is changed, or the key is evicted due to cache replacement. The intra-group communication is shown schematically in FIG. 29(*a*), and the detailed message communication is shown below:

1—A ➔ B: A, B, E(K, $\tilde{k}$)
2—A ➔ C: A, B, $E(SK_{AC},K)$, H(K), $MAC(AK_{AC}, A\|B\|E(SK_{AC},K)\|H(K)\|SC(A,C))$.
3—C ➔ B: A, B, $E(SK_{BC},K)$, H(K), $MAC(AK_{BC}, A\|B\|E(SK_{BC},K)\|H(K)\|SC(C,B))$.

The MAC function is taken over the encrypted value of the Envelop. This has the advantage that the receiver doesn't have to decrypt the Envelop if the MAC authentication fails, which saves some computation.

2.8 Node to Node Communication Across Control Groups

If node A wishes to communicate with a node that lies in a different control group, then two control nodes are involved. Say A lies in group G1 and B in G2 and the respective control nodes are C1 and C2. If A does not have the session key with B cached, A generates two random keys (K and $\tilde{k}$) and sends the encrypted message E(K, k̃) directly to B. Node A encrypts the key (K) and sends it to C1 as E($SK_{AC1}$, K). Node C1 checks its control cache for the session key between itself and C2. If not present, C1 generates a key, say U, and sends it encrypted to the base station as E($SK_C$1M, U). The base station forwards the key encrypted to C2 as E($S_{MC2}$, U). Notice that there is no need to send a direct packet from the source control node to the destination control node as in the communication between two nodes within a control group, since the base station is assumed to be trusted. After the session key between C1 and C2 is established ($SK_{C1C2}$=U), C1 sends the key K to C2 as E($SK_{C1C2}$, K), and C2 forwards the key to B as E($SK_{C2B}$, K). Node B now has the key K and the message E(K, k̃) from A and proceeds as in the intra-group communication to extract k̃ and use it as the session key.

The inter-group communication is shown schematically in FIG. 29(b), and the detailed message exchange is shown in the following steps:

1—A ➔ B: A, B, E(K, k̃).
2—A ➔ C1: A, B, E($SK_{AC1}$, K), H(K), MAC($AK_{AC1}$, A∥B∥E($SK_{AC1}$, K)∥H(K)∥SC(A,C1)).
3—C1 checks its control cache for C2, if an entry exists go to step 6.
4—$C_1$ ➔ M: $C_1$, C2, E($SK_{C1M}$, U), MAC($AK_{C1M}$, C1∥C2∥E($SK_{C1M}$, U)∥SC(C1,M)).
5—M ➔ $C_2$: $C_1$, C2, E($S_{MC2}$, U), MAC($AK_{MC2}$, $C_1$∥C2∥E($S_{MC2}$, U)∥SC(M,C2)).
6—$C_1$ ➔ $C_2$: A, B, E($SK_{C1C2}$, K), H(K), MAC($AK_{C1C2}$, A∥B∥E($SK_{C1C2}$, K)∥H(K)∥SC(C1,C2)).
7—$C_2$ ➔ B: A, B, E($SK_{C2B}$, K), H(K), MAC($AK_{C2B}$, A∥B∥E($SK_{C2B}$, K)∥H(K)∥SC(C2,B)).

2.9 Monitoring Neighbor Nodes and the Control Node

The control node plays a privileged role in key management and a compromised control node can affect the energy overhead of the network. If the selected control node happens to be compromised, it can launch a DoS attack by refusing to exchange key material among the nodes in its control group. This causes the nodes in the control group to invoke the base station, which fulfils the key request; however this increases the energy consumption since the average number of hops to the base station is higher than that to the control node. Therefore, if the number of key management requests from the same control group goes beyond a threshold, the base station infers that the current control node is misbehaving and assigns a different control node. Hence if the sensor nodes can help the base station choose a probable good node as a control node, then the need to rotate the control nodes prematurely and the number of direct key exchange requests to the base station are reduced. Therefore, SECOS gives each sensor node the option of performing a neighbor watch, whereby it observes the source field of the packets going in and out of a neighbor control node. The neighbor watch may be performed by a node at random on a fraction of the packets going in and out of a neighbor control node or with a random periodicity. This fraction or periodicity is determined by the resources and the load at the node. Watching the control node helps in verifying that the control node's behavior does not deviate drastically from the expected functionality for key management. Occasional deviation is expected due to naturally occurring failures. However, one disadvantage of the neighbor watch is blackmailing in which a malicious node falsely accuses a good control node. Therefore, the monitoring is performed cooperatively by all the neighbors of the control node and the nodes in the control group. Energy efficient schemes for neighbor watch in sensor networks are described in the following papers, which are hereby incorporated by reference: I. Khalil, S. Bagchi, and N. Shroff, "Lite-Worp: A Lightweight Countermeasure for the Wormhole Attack in Multihop Wireless Networks," accepted to appear in the International Conference on Dependable Systems and Networks (DSN '05), Yokohama, Japan, Jun. 28-Jul. 1, 2005, available at: http://shay.ecn.purdue.edu/~dcsl/Publications/papers/93_Khalil_I_final.pdf; and I. Khalil, S. Bagchi, and C. Nina-Rotaru, "DICAS: Detection, Diagnosis and Isolation of Control Attacks in Sensor Networks," accepted to appear at *IEEE/CreateNet SecureComm* 2005, Athens, Greece, 5th-9th Sep. 2005, available at: http://shay.ecn.purdue.edu/~dcsl/Publications/papers/khalil_DICAS.pdf. Moreover, note that SECOS exchanged keys are secure even if the control node itself is compromised as will be shown in Section 3.1.

Local monitoring is an extension to the watchdog concept, which was used to negate the effect on throughput of misbehaving nodes that agree to forward packets but do not. The watchdog concept is described in S. Marti, T. J. Giuli, K. Lai, and M. Baker, "Mitigating Routing Misbehavior in Mobile Ad Hoc Networks," *ACM/IEEE International Conference on Mobile Computing and Networking*, 2000, which is hereby incorporated by reference. Local monitoring helps detect ID spoofing and Sybil attacks in which an attacker presents one (ID spoofing) or more (Sybil attack) spoofed identities to the network. See, e.g., the following papers, which are hereby incorporated by reference: J. Newsome, E. Shi, D. Song, and A. Perrig, "The Sybil attack in Sensor Networks: Analysis & Defenses," IPSN 2004, pp. 259-268; and C. Karlof and D. Wagner, "Secure Routing in Sensor Networks: Attacks and Countermeasures," SNPA 2003. These identities could either be new fabricated identities or stolen identities from legitimate nodes. Our detailed protocol called DICAS is described in the above-referenced DICAS paper by Khalil et al.; however we provide here a sketch of the detection mechanism. If a malicious node X masquerades as one of its neighbors Y, then the neighbor watch by Y detects this. However, if X masquerades as non-neighbor nodes O, then all the neighbors of X who are not neighbors of O detect the attack since each node knows its neighbors. For example, in FIG. 30, if the malicious node X tries to impersonate the non-neighbor node O, then all the neighbors of X, i.e., C, D, Q, P, and Y, will overhear the packet and D, P, and Q, which do not have O in their neighbor lists detect the masquerade and reject the packet.

An opinion about the control node is formed by observing its behavior in response to invocations of its key management routines. Initially, when a node C is assigned the role of a control node, it broadcasts a list of its neighbors. Each neighbor of the new control node sends this list to the base station and also compares the list with its own list of neighbors and marks the common nodes. The base station checks if the control node announced the right list, using its knowledge of the connectivity graph. FIG. 30 shows the list of neighbors of the control node C (O, P, Q, X, Y, Z) and some other nodes in the sensor field.

An 8-bit malicious counter (MalC) is used to quantify an observer's opinion of a node, with a higher value indicating greater suspicion. After the initial phase when C is assigned as a control node, each neighbor α of the control node starts the monitoring phase by setting MalC(α,C) to zero. A node α is called the guard node of a node of C over the link from μ to C if (i) α is a neighbor of C and (ii) μ is a neighbor of both C and α. A guard of C over the link from μ to C monitors the response of C to the key exchange traffic going over that link For example, in FIG. 30, nodes P and Q are neighbors of X as well as C, therefore, they are the guard nodes of the link from X to C. Node X is the guard node for link from P, Q, or itself to C. If node A needs to establish a new session key with node B, according to the protocol in Section 2.7, it sends the Envelop key to C. Node C receives the Envelop through one of its neighbors, say P. The guard nodes of the link from P to C (X and Y) overhear the Envelop that P forwards to C and buffers it to monitor what C does with it. If a guard node, say X, does not hear C forwarding the packet to the appropriate next hop within a certain time interval, it degrades its opinion of C by incrementing MalC(X,C). The receiver collision, which occurs when the receiving node does not receive the packet due to collision, is alleviated using MAC layer acknowledgment. The ambiguous collision, which prevents a node A from hearing if a node B has forwarded a packet, due to a collision at A, is alleviated by employing multiple guards.

It is more involved to detect if C forwards a garbage packet instead of the Envelop. Since the communication from A to C and C to B are both encrypted, the guards cannot observe the traffic. To solve the problem, A appends the hash of the Envelop to the packet. The hash is compared by C and if correct, re-appended to the packet before forwarding to B. The guards can observe the hash values coming in and out of C and suspect C if the incoming and the outgoing hash values are different. If, however, the values are identical and the destination B detects a mismatch, then C is considered suspicious by B. This enables nodes other than the guards of the control node to share in monitoring the control node. When the MalC(X,C) reaches a pre-determined threshold value, $T_{counter\_threshold}$, it sends an alert to the base station. $T_{counter\_threshold}$ is calculated to account for natural failures, such as node and link failure errors. The calculation of the threshold $T_{counter\_threshold}$ is addressed in the following paper, which is hereby incorporated by reference: M. Krasniewski, P. Varadharajan, B. Rabeler, S. Bagchi, and Y. C. Hu, "TIBFIT: Trust Index Based Fault Tolerance for Arbitrary Data Faults in Sensor Networks," accepted to appear in the *International Conference on Dependable Systems and Networks* (DSN '05), Yokohama, Japan, Jun. 28-Jul. 1, 2005.

We now analyze the protocol to update the malicious counter. To do that we use a scheme inspired by the idea of degree of attack guilt, as described in S. Noel, D. Wijesekera, C. Youman, "Modern Intrusion Detection, Data Mining, and Degrees of Attack Guilt," Applications of Data Mining in Computer Security, Daniel Barbara and Sushil Jajodia (eds.), Kluwer, 2002, which is hereby incorporated by reference. Each monitor may detect an event with a certain level of assurance, $L_{assurance}$, which lies between zero and one. A value of zero implies that the event is not considered suspect by the observer, while a value of one indicates that the observer is convinced that the event is a malicious event. The exact value is a function of the event and the observer (a guard node or a destination node). For example, if the control node modifies the Envelop but keeps the same hash value, then this does not appear as a malicious event to a guard node, but is a definite malicious event to the destination since the hash value does not match the packet content. Thus, the $L_{assurance}$ value at the guard node is zero, while that at the destination is one. For each event detected, the monitor α increments its MalC (α,C) by the result of multiplying $L_{assurance}$ by the maximum value of the counter $MalC_{max}$ (255 for an 8-bit counter). This implies that if the α is not certain ($L_{assurance}=0$) about the ongoing monitored event, it does not increment MalC(α,C) and therefore does not degrade its opinion of node C. If however, node α is almost definite, then the increment will be close to $T_{counter\_threshold}$, thus taking the MalC(α,C) value above the threshold with a high likelihood. This in turn leads to detection of the malicious node.

When the MalC(α,C) crosses the threshold value $T_{counter\_threshold}$, α sends a message to the base station carrying the counter value and the malicious node's ID. However, in sensor networks where nodes may be compromised easily, it is clearly undesirable to base a decision on the input of only one other node. Therefore, the base station waits for a short time, $T_{suspect\_collection}$, to allow other nodes that should have noticed the same malicious event to send in their opinions. If the base station does not receive these alerts, it polls the corresponding nodes directly to send their MalC values. The base station considers the node to be malicious if a weighted majority of the polled nodes agree. This majority reduces the likelihood of blackmailing in which a compromised node falsely accuses a good node to degrade its trust level. The trust level, $L_{trust}$, of each node is a value between zero and one, where zero represents a mistrusted node and one represents a fully trusted node. The trust level is initialized to one. This is used as the weight in the calculations at the base station. The trust level for a node, say B, is calculated as $$L_{trust}(B) = 1 - \left\{ \sum_J \frac{L_{trust}(J) \cdot MalC(J, B)}{N_m(B) \cdot MalC_{max}} \right\} \quad (1)$$

where $L_{trust}(J)$ is the trust level of node J and $N_m(B)$ is the number of monitors of node B that report their MalC values to the base station. The sum is taken over each observer, J, of node B that reports its malicious counter value to the base station. This formula computes the weighted average of the malicious counter values. The weights in calculating the average are the trust levels of the nodes that report their malicious counter values.

The base station decides whether the node under investigation is malicious or not based on the trust level of the node. If the trust level goes under a pre-determined threshold value, $T_{trust\_level}$, the base station declares the node as a compromised node. Each neighbor of the malicious node is informed of the event. In response, each neighbor drops the malicious node from its neighbor list and ceases to forward its packets.

If a certain fraction of nodes erroneously report a control node to be suspicious, the base station may degrade their trust level. A table summarizing the timers and the threshold values used in SECOS and their effects on the protocol is presented in the Appendix.

3 Security Analysis

In this section, we discuss the ability of SECOS to deal with the three major classes of security attacks—confidentiality violation, denial of service attacks, and authentication violation.

3.1 Confidentiality Attacks

The key exchange protocol between two end points of a communication is described in Sections 2.7 and 2.8. We now show that this key exchange protocol does not reveal the shared key between two legitimate nodes irrespective of the number of compromised nodes if either of the following features is used. Note that these features are individually sufficient but not necessary for the proposition to hold.

1. The initial message E(K, k̃) sent by the initiator of the key exchange, A, to the destination, B, cannot be obtained by the control node, or
2. The two parties involved in the key exchange, A and B, share an old session key in addition to k̃ and use a combination of the new and previous session key for the communication. For example, if the previous session key was $\overline{\kappa}$, then A uses $\kappa \oplus \overline{\kappa}$ as the current session key for communication with B. In case a previous shared session key is not available, nodes A and B must establish the session through the secure base station and not through the control node.

Proposition:

Under feature 1 or 2 above, it follows that compromising any number of nodes other than the two end-points does not reveal the shared key between them. This proposition holds even if the control node for the two end points is compromised.

Proof:

Case1: If feature number 1 is valid, then B is the only node in possession of the encrypted packet holding the key E(K, $\check{\text{k}}$). Thus, the control node, C, does not have it and though it has K, it can never obtain the shared key $\check{\text{k}}$.

Case2: If feature number 2 holds, the proposition can be proved using mathematical induction as follows.

Base case: Let the number of compromised nodes in the network be $N_C$. If $N_C=0$, there is no compromised node and the claim is trivially satisfied. If $N_C=1$, this compromised node could be either the control node of A and B or any other node. If it is not the control node then the session can not be disclosed since only the control node, other than A, can decrypt the packet holding the Envelop. Consider that the single compromised node is the control node. Two cases are possible. (1) Nodes A and B have a previous shared key using an old control node. The current compromised control node does not know this key because the old control node was not compromised since the current control node is the only compromised node in the network by assumption. (2) Nodes A and B do not have a previous shared old key so they use the secure base station to start up the shared key and not the compromised control node. In both cases 1 and 2, the compromised control node cannot disclose the secure session between A and B.

Inductive step: Assume that the session between A and B is secure under ($N_C-1$) compromised nodes, we want to show that it will be secure when a new node gets compromised for a total of $N_C$ compromised nodes.

Inductive proof: If the $N_C^{th}$ compromised node is not the control node, the claim is trivially satisfied. If the $N_C^{th}$ node is the control node, then as in the base case, two cases are possible. (1) Nodes A and B share an old key ($K_{old}$), or (2) nodes A and B do not share an old key. In case (1), by the induction hypothesis, none of the ($N_C-1$) compromised nodes know the key, $K_{old}$. The new compromised node does not know $K_{old}$ since the key was exchanged before the node got compromised. So if the new key exchanged through the compromised control node is $K_{new}$, then the new session key will be ($K_{old} \oplus K_{new}$). While the compromised node can know $K_{new}$, it cannot know $K_{old}$. In case (2), nodes A and B do not share an old key and hence obtain their key directly from the secure base station. This exchange is done using the shared session key with the base station and therefore the key is unknown to the control node. This completes the proof of the proposition.

Comments: The proof excludes the following cryptanalysis scenario. Assume the two nodes A and B have the startup key $K_{old}$ from the main base station and then they use the $K_{new_1}$ from control node $C_1$, $K_{new_2}$ from control node $C_2, \ldots, K_{new_m}$ from control node $C_m$. An attacker may capture the packet holding $K_{old}$ and crypt-analyze it to obtain $K_{old}$. By the time this is done, the control node is $C_m$. Then the session key at that time will be $K_{old} \oplus K_{new_1} \oplus K_{new_2} \oplus \ldots \oplus K_{new_m}$. To know this key, the attacker must either compromise all the control nodes $C_1$ up through $C_m$ or crypt-analyze all the packets holding the keys $K_{new_1}$ up through $K_{new_m}$. It is expected that m will be a large number due to the small number of cipher packets the adversary has to crypt-analyze a key. It will be practically infeasible to compromise selectively all the control nodes $C_1, \ldots, C_m$, especially considering that control nodes are pseudo-randomly chosen from among the ordinary sensor nodes. Alternatively, it will be practically infeasible to crypt-analyze all the keys $K_{new_1}, \ldots, K_{new_m}$.

However, it is possible, though difficult, that neither of the features mentioned above is satisfied. In feature 1, the control node may be able to buffer all packets between A and B, either directly or with the help of a malicious colluding nodes, decrypts them and thus acquires k. Even if the communication of the initial message and the Envelop are randomized in time and order, it is possible that C buffers all messages within a window. Feature 2 is violated if the two parties do not share an old key and are unwilling to initiate key exchange using the main base station, possibly because it is far from either party. Section 3.1.1 presents a mathematical analysis of the probability of disclosing the secure session between A and B under certain number of compromised nodes if neither of the above features is used.

3.1.1 Probability of Secure Session Disclosure

In this subsection we provide a mathematical analysis of the probability of compromising the link between two arbitrary nodes A and B lying in the same control group with the number of compromised nodes in the network being a parameter. For the purpose of comparison with other key management protocols, we assume in this analysis that only compromised nodes may exist in the network (no external malicious nodes). We perform the analysis for SECOS, SPINS (a representative Kerberos like protocol), and a protocol as described in W. Du, J. Deng, Y. Han, and P. Varshney, "A Pair-wise Key Pre-distribution Scheme for Wireless Sensor Networks," *Proceedings of the 10th ACM conference on Computer and communication security* (CCS'03), Washington D.C., USA. Oct. 27-30, 2003, which is hereby incorporated by reference (a representative key pre-distribution protocol), and compare the results. We assume that SPINS has as many base stations as the number of control groups in SECOS ($N_B$) and that the nodes are uniformly distributed in the sensor field.

For the mathematical analysis, we use a restricted version of SECOS which does not use the two features mentioned in Section 3.1, i.e., the node does not use the multiple keys from previous control nodes or the communication with the base station and the control node may overhear communication between the two nodes in its control group. This serves as a plausible operating region for the protocol where resources are constrained, the control group size is small, or the control node colludes with a neighbor of the source-destination pair. The restriction on SECOS also serves to shed light on the advantages obtained by a specific feature of SECOS, namely using two packets—K($\check{\text{k}}$) and the Envelop for key exchange between two arbitrary nodes. Note that if we use the unrestricted version of SECOS, the analysis would become trivial since the probability of compromising the link between an uncompromised source-destination pair would be zero.

To disclose the session key between A and B, an attacker must obtain both the Envelop (K) and the packet that is sent directly from A to B (E(K, $\check{\text{k}}$)). To obtain the Envelop, the control node for A and B must be compromised. To analyze the probability of capture of E(K, $\check{\text{k}}$), we create a bounding path between A and B which is the rectangular bounding box containing nodes that may overhear the communication from A to B. This is shown by the dotted box in FIG. 31. This is an overestimate since we use a square that circumscribes the circular transmission range of a node. To capture $E(K, \check{k})$, there must be at least one node in the bounding path from A to B that is compromised (we assume no compromised nodes exist in the network). Let the average number of hops between a pair of nodes in the control group be $H_{ctrl}$, the density of nodes in the sensor field be D, and the communication range be R. The probability of capturing $E(K, \check{k})$ is less than or equal to the probability of having at least one compromised node in the bounding path. Let N be the total number of nodes in the sensor field and $SG_{ctrl}=N/N_B$ is the size of a control group. Let the number of compromised nodes in the network be $N_C$ and assume that the compromised nodes are uniformly distributed in the field. Let $E_2$ represent the event that there is at least one compromised node in the bounding path.

The identity of the current control node in a control group can be easily deduced by an attacker. However, as mentioned in the assumptions, it takes a finite amount of time $T_{comp}$ to compromise a node. The period of rotation of the control node is smaller than $T_{comp}$. Thus, starting from an uncompromised network, it will be impossible for an attacker to compromise the control node after identifying it. So the attack model for the analysis is that the attacker randomly picks a node to compromise Let $E_1$ be the event that this randomly chosen node is a control node, for some arbitrary source-destination pair A and B.

$$P(E_1) = \frac{\text{\# Compromised Nodes}}{\text{\#Nodes in Network}} = \frac{N_C}{N} \quad (2)$$

The probability of compromising the link between A and B ($P_{C(A-B)}$) is $$P_{C(A-B)} = P(E_1 E_2) = P(E_2|E_1)P(E_1) \quad (3)$$

The number of nodes within the bounding path $N_{bp}$ is given by its area times the density of nodes in the network.

$$N_{bp} = (H_{ctrl}+1)R \cdot 2R \cdot D = 2(H_{ctrl}+1)R^2 D \quad (4)$$

Let $E_3$ be the event that the control node lies in the bounding path. Then the probability of $E_3$ is $$P(E_3) = \frac{N_{bp}}{SG_{ctrl}} \quad (5)$$

Note that in the previous formula we consider the size of the control group since A and B lie within the same control group.

$$P(E_2|E_1) = P(E_2|E_1 E_3)P(E_3) + P(E_2|E_1 \bar{E}_3)P(\bar{E}_3) \quad (6)$$

Let $N_G = N - N_C$ represents the number of uncompromised (good) nodes in the network. The number of ways in which we can choose $N_{bp}$ good nodes is $$\binom{N_G - 2}{N_{bp} - 2} \quad (7)$$

The total number of ways in which we can choose $N_{bp}$ nodes is $$\binom{N - 2}{N_{bp} - 2} \quad (8)$$

Since A and B both are assumed to be non-compromised nodes, they are subtracted from $N_{bp}$, $N_G$, and N.

$$P(E_2|E_1\bar{E}_3) = 1 - \left[\frac{\binom{N_G - 2}{N_{bp} - 2}}{\binom{N - 2}{N_{bp} - 2}}\right] \quad (9)$$

$$P_{C(A-B)} = \left(\frac{N_C}{N}\right)\left\{\left(1 - \left[\frac{\binom{N_G - 2}{N_{bp} - 2}}{\binom{N - 2}{N_{bp} - 2}}\right]\right)(1 - P(E_3)) + 1 \cdot P(E_3)\right\} = \quad (10)$$

$$\left(\frac{N_C}{N}\right)\left\{\left(1 - \left[\frac{\binom{N - N_C - 2}{2R^2D(H_{ctrl}+1) - 2}}{\binom{N - 2}{2R^2D(H_{ctrl}+1) - 2}}\right]\right)(1 - P(E_3)) + 1 \cdot P(E_3)\right\}$$

In SPINS, which represents an example of the Kerberos-like protocols, the base stations are fixed. In order to make the sensor network economical, the authors assume that the base stations are not equipped with any specialized mechanisms or hardware to prevent compromise They only assume that the base station has sufficient battery power to surpass the lifetime of all sensor nodes, sufficient memory to store cryptographic keys, and means for communicating with outside networks. Therefore the base stations in SPINS are equally likely to be compromised as any other sensor nodes. The model for the adversary is that it can target the base stations for compromising them. The attacker can identify the base stations and they are fixed so the adversary has enough time to try to compromise them. Thus $$P_{C(A-B)} = \begin{cases} \frac{N_C}{N_B} & \text{if } N_C < N_B \\ 1 & \text{if } N_C \geq N_B \end{cases} \quad (11)$$

The protocol by Du et al. represents an example of a key-pre-distribution scheme and is summarized above. The authors present a corresponding calculation of $P_{C(A-B)}$ as $$P_{C(A-B)} = \sum_{i=\delta+1}^{N_C} \binom{N_C}{i}\left(\frac{\tau}{\omega}\right)^i\left(1 - \frac{\tau}{\omega}\right)^{N_C - i} \quad (12)$$

where $\delta$ is the key space threshold, i.e. compromising $(\delta+1)$ nodes will compromise the whole key space. $\omega$ is the size of the key space's pool, i.e. there are $\omega$ key spaces for each node to pick from. $\tau$ is the number of different key spaces that each node holds. The memory requirement at each node is mem= $(\delta+1)\times\tau$. Also, they provide the formula for the probability that any two neighboring nodes can establish a secure session between them as $$P_{actual} = 1 - \frac{((\omega - \tau)!)^2}{(\omega - 2\tau)!\omega!} \quad (13)$$

FIG. 32 shows the comparison among these three schemes (SECOS, SPINS, Du) using: $\omega=50$, mem=200, $\tau=5$, and Pactual=0.42 as parameters for Du's scheme (δ is calculated as 39 based on the memory constraint mem), $N_B$=20 for SPINS, and. N=2000, R=30, D=15 neighbors for each node, and $H_{ctrl}$=10 as parameters for SECOS. Notice that Du's scheme has only 0.42 for $P_{actual}$ while SECOS and SPINS both have 100% probability for any two nodes to establish a secure session between them. According to FIG. 32, SECOS has lower probability of compromising a link than the other two protocols over a large range of the operating region. The probability goes to one for SPINS when the number of compromised nodes is greater than the number of base stations. Also, the link disclosure probability goes to one for Du's scheme when the number of compromised nodes is greater than the δ threshold. However, for a small number of compromised nodes, Du's scheme is the most robust.

3.2 Denial of Service (DoS) attack

1. DOS attack against a control node. This may be launched through a compromised node when it repeatedly asks the control node for forwarding a key. This kind of attack is handled by keeping a state vector at the control node for the currently active nodes that have recently requested key forwarding, and ignoring and sending feedback to the base station if a node behaves abnormally, e.g., asking for keys to communicate more than the feasible data rate. The feasible data rate is determined using a running window of the last m key requests and considers the communication bandwidth and the key cache size.

2. DOS attacks by a compromised control node: We reduce the probability of the presence of a compromised control node by a judicious selection of the control node based on trust level by periodically changing the control node. However, for the time period when a compromised node serves as a control node, it can prevent two legitimate nodes, A and B, from establishing a common key between them. In such a situation when the initiator cannot establish the secure session using the control node, it can perform the key exchange using the base station as an intermediary. Each of A and B share a session key with the base station, which is distinct from the shared session key with the control node, and this can be used to establish a secure channel. This solution is also valid when control node is unavailable due to a natural failure. The base station verifies that the requests for Envelop forwarding are coming from a legitimate node in the network and if it finds the control node is non-existent, installs a new control node. This scheme is identical to that used in SPINS in the general no-attack case.

Control node monitoring results in detecting the control node if it launches a DoS attack. To see this, consider the following two possible DoS attacks that a malicious control node could launch. In the first DoS attack, the control node refuses to forward the Envelop it received from the source to the intended destination. This is an easy attack to detect and can be detected by both the guards and the destination. The guards see a packet entering the control node but no corresponding packet sent out. The destination detects the attack since it does not get the Envelop though it receives the communication from the source. However, the assurance value of the guards is higher than that of the destination. At the destination there is a possibility that the Envelop is lost in the path from the source to the control node or from the control node to the destination. So the opinion counter at a guard is incremented by a value greater than that at the destination. The determination by the guard is still not full-proof since it is possible that the error is in the last hop to the control node or first hop out of the control node. Let $P_{Lerr}$ represent the probability of natural error in a packet on one link Let the number of hops the Envelop traverses from the control node to the destination be $H_{com}$, and the average number of hops in the same control group be $H_{ctrl}$ (the number of hops between the source and the control node), then the probability of incorrect reception at the destination is $$\text{Drop}_{natural}=1-(1-P_{Lerr})^{(N_{com}+N_{ctrl}-2)} \quad (14)$$

Let $P_{CD}$ represents the probability that a node is compromised and dropping packets. The probability that the packet will not reach the destination due to a malicious node other than the control node is $$\text{Drop}_{malicious}=1-(1-P_{CD})^{(N_{com}+N_{ctrl}-2)} \quad (15)$$

Then assurance value of this malicious event at a guard is $L_{assurance}=1-2P_{Lerr}$, and at the destination is $$L_{assurance}=1-(\text{Drop}_{natural}+\text{Drop}_{malicious})= \\ (1-P_{Lerr})^{(N_{com}+N_{ctrl}-2)}+(1-P_{CD})^{(N_{com}+N_{ctrl}-2)}-1 \quad (16)$$

In the second DOS attack, the control node forwards a modified Envelop, either by modifying the Envelop while keeping the same hash value associated with it, or by modifying both the Envelop and the hash value. The technique to circumvent the two types of DoS attacks is discussed in detail in Section 2.9.

3. DoS attacks against regular nodes: It is relevant to talk of only those DoS attacks against regular nodes that are enabled by mechanisms in SECOS. One possible DoS attack that may be launched against a legitimate node, B, is storage exhaustion by sending garbage packets to B, which buffers it in the expectation that the key needed to decrypt the packet is forthcoming from the control node. Requiring B to limit the number of unencrypted packets received from a specific source, accompanied by the inability of that source to launch an ID spoofing attack due to the neighbor watch (Section 3.3) alleviates this attack.

3.3 Authentication Attack

Another possible class of attacks is The ID spoofing and Sybil attacks in which a node impersonates other nodes. Through this attack, a compromised node can obtain knowledge of shared keys between other nodes. This class of attacks may be launched by a compromised control node, a regular node, or multiple nodes in collusion. SECOS handles the problem of regular nodes trying to masquerade as the control node by providing the control node challenge mechanism (Section 2.5) and for control nodes trying to masquerade as a different sensing node by using local monitoring (Section 2.9). The two kinds of authentication attack whereby a node impersonates a neighboring node or a non-neighboring node are detected by the neighbor watch mechanism by the neighbors of the compromised node according to the scheme described in Section 2.9.

If the control node, C, is compromised, it may launch the following attack to uncover the key between two nodes in its control group, A and B. Node C sends to B a key k encrypted using the Envelop K claiming that it is from A. Node C performs the same communication with A, claiming it is from B. Then C sends the Envelop K to both A and B after encrypting it with the respective session keys. The communication between A and B is now under the control of C. In SECOS, this attack is prevented through two mechanisms—local monitoring. First, if C tries to impersonate B and sends a packet, any of its neighbors, which does not have B in its neighbor list detects this while A itself will not be able to detect the impersonation. So $L_{assurance}$ value for the guards will be one and it will be zero for the destination. Second, if C generates the spurious messages and claims it is forwarding the message from B through a neighbor, O in FIG. 30, this is detected by the nodes Y and Z, which are acting as the guard nodes for the communication through O, while it can not be detected by the destination, A. So $L_{assurance}$ value for the guards is one and it is zero for the destination.

We quantify the overhead in terms of control messages for each of the operations in SECOS, such as key establishment within and across control groups, neighbor watch, and control node monitoring. The analysis is presented in the Appendix.

4 Determining Control Group Size

In this section, we perform mathematical analysis to determine the optimal control group size in SECOS based on the constraints of the sensor network and the desired level of security. We introduce some notations for this analysis. The regular cache size at each node is $S_C$, the hit rate in the cache $\alpha_C$, and the miss rate $\beta_C = 1 - \alpha_C$. The control cache size is $S_{CC}$, and its hit and miss rates are $\alpha_{CC}$ and $\beta_{CC}$, respectively. The hit rate is the probability that an item is found in the cache while the miss rate is the probability that an item is missed from the cache. The control group size that is to be optimized is $SG_{ctrl}$, and the communication group size is $SG_{com}$. We introduce the communication group for a node as the neighborhood of that node, with which it predominantly communicates. The quantitative meaning of predominant is made clear in the particular discussion. For the analysis in this section, we assume that the communication happens completely within the communication group. Each node generates packets according to a Poisson process with rate $1/\lambda$. The destination is chosen at random from the communication group. The destination is changed once every μ seconds on an average, again using an exponential distribution. The control node has an average lifetime of $T_{ctrl}$. S(Pkt) gives the size of the Pkt packet. $H_{com}$, $H_{ctrl}$, and $H_{all}$ are the average number of hops between nodes within the same communication group, between a node and the control node, and between a node and the base station. $E_{nergy}$ gives the energy for transmission and reception of one bit. The summary and notations for some of the control packets used in SECOS are given in Table 1.

TABLE 1

Summary of relevant Secos packet types

| Packet Notation | Description | Packet Notation | Description |
|---|---|---|---|
| K_req | The Envelop from the source to the control node or from the control node to the destination. | K_repf | Relay the Envelop from one control node to another, used in inter-group key establishment |
| Data | Data packet | K_rep | The encrypted key from the source to the destination |

4.1 Maximum Control Group Size

The maximum allowable size of the control group is determined by three factors—computational capabilities of the control node, bandwidth available around the control node, and the storage capacity for keys in the control node. These factors are discussed below. Here, $G_{COMP}$ is the maximum control group size under the computational limitation only, $G_{BW}$ is the maximum control group size under the bandwidth limitation only, and $G_{STORE}$ is the maximum control group size under the storage limitation only.

1. Computational Capabilities ($G_{COMP}$). The computational capability of the control node to service key requests from nodes in its group is one of the factors that bound the control group size. Assume that the computational capability of the control node allows it to process IP instructions per second and the encryption algorithm for the Envelop encryption and decryption, the hash function computation, and the MAC encryption and decryption according to the steps shown in FIG. 29(a) require IK instructions. The maximum number of keys that can be serviced is IP/IK keys per second. So if the node changes a destination every μ seconds and the miss rate in the regular cache is $\beta_C$, a request is generated by a single node once every $\mu/\beta_C$ seconds.

$$G_{COPM} \leq \frac{IP \cdot \mu}{IK \cdot \beta_C} \quad (17)$$

2. Channel Bandwidth ($G_{BW}$). On average the available bandwidth for each node given channel bandwidth BW is $BW/N_{nbr}$ where $N_{nbr}$ is the number of one-hop neighbors of the node. Given the range of wireless transmission (r) and the density of nodes (ρ): $D = \Pi r^2 \rho$. Part of this traffic bandwidth is consumed by data. Thus the available BW for control communication ($BW_c$) is the total bandwidth per node minus the amount of data traffic $$BW_c = \frac{BW}{N_{nbr}} - \frac{2 \cdot S(Data)}{\lambda} \quad (18)$$

Each new session key served generates 2S(K_req) amount of traffic Taking into account the regular cache misses and the key request rate this term is multiplied by $(\beta_C \cdot 1/\mu)$.

$$BW_c \geq G_{BW}(2 \cdot S(K\_req))(\beta_C/\mu) \Rightarrow G_{BW} \leq BW_c/(2 \cdot S(K\_req)(\beta_C/\mu)) \quad (19)$$

3. Storage Capacity ($G_{STORE}$). The storage refers to the ring cache in the control node which stores the keys of nodes in the control group. If the storage requirement of each key is $S_{Key}$ and the available flash memory for the ring cache is FM, then the storage upper bound is given by $$G_{STORE} \leq FM/S_{Key} \quad (20)$$

The maximum size of the control group is the minimum of those calculated from equations (21), (22), and (23) above.

$$G_{max} = \min(G_{COMP}, G_{BW}, G_{STORE}) \quad (21)$$

The previous three factors came from resource constraints. A fourth factor arises from the security requirement. This is the security tolerance ($G_{SEC}$) when a control node gets compromised. $G_{SEC}$ represents the maximum size of the control group under a certain acceptable number of compromised sessions or exposed messages. It is assumed that all the sessions that are established after the control node is compromised are disclosed.

4. Security tolerance ($G_{SEC}$). We want to limit the amount of communication that will become exposed due to the control node being compromised. Let N(s) be the acceptable number of message communications that can be exposed. Let the rate at which nodes are compromised be $\lambda_{SEC}$. Consider a round as the time a control node maintains its privileged position. The length of a round is $T_{ctrl}$. Consider an infinitesimally small time slice dt, after time t has elapsed in a round. The number of nodes that can be compromised in this time slice is $\lambda_{SEC} dt$. In the worst case, all the compromised nodes are control nodes. As a result of compromising these control nodes, the number of communication sessions that will become exposed are $G_{SEC} \cdot (T_{ctrl} - t)/\mu) \times \beta_C$. Integrating over the entire round, we have $$\int_0^{T_{ctrl}} \frac{\lambda_{SEC} G_{SEC} \beta_C (T_{ctrl} - t)}{\mu} dt = \frac{\lambda_{SEC} G_{SEC} \beta_C}{2\mu} T_{ctrl}^2 \leq N(S) \quad (22)$$

$$G_{SEC} \leq \frac{2 \mu N(S)}{\lambda_{SEC} \beta_C T_{ctrl}^2} \quad (23)$$

The maximum size of the control group becomes, $$G_{max} = \min(G_{COMP}, G_{BW}, G_{STORE}, G_{SEC})$$

4.2 Energy-Wise Optimal Control Group Size

Here we wish to find the optimal control group size based on security and energy concerns. For this analysis, we consider the energy consumed in the entire network per unit time, which is equivalent to the power requirement of the network. We want to increase the security by minimizing the time between control node refreshments and we want to decrease the overhead energy of the protocol. The security requirement favors decreasing the time to refresh the control nodes and the smallest is the best while a larger period is more optimal energy wise. So we will proceed to optimize the energy overhead. In doing so, we face two conflicting factors. The first is the number of nodes that can be served by the same control node, and the second is the average number of hops to the control node. The first factor favors increasing the control group size, since that will reduce the occurrence of the energy expensive inter-control group key setup communication. The second factor favors decreasing the control group size, since that will reduce the number of hops between a sensing node and the control node.

Three factors are to be considered for the overhead energy consumption of SECOS: the destination of the packet to be sent (whether within the same control group or outside), the probability of regular cache hit, and the probability of control cache hit. In the following derivation, we assume that the average number of hops between nodes is proportional to the number of nodes under the same density and traffic conditions, such that: $H_{ctrl} = \max(H_{com} \times SG_{ctrl}/SG_{com}, 1)$. From these we derive the following four cases:

Case 1: Hit in the regular cache. This occurs with probability $\alpha_C$ that can be calculated as follows:

$$\alpha_C = \frac{S_C \times \lambda}{SG_{com} \times \mu} + \left(1 - \frac{\lambda}{\mu}\right) \sum_{k=0}^{S_C} \left\{ \binom{N-1}{K} \left(\frac{1}{N-1}\right)^k \left(1 - \frac{1}{N-1}\right)^{N-1-k} \right\} \quad (25)$$

The term $(S_C \times \lambda)/(SG_{com} \times \mu)$ represents the probability that the key is found in the regular cache during the send of the first packet and the subsequent terms represent the probability that the second, the third, the fourth, etc packets hit. We assume that the size of the regular cache is greater than the number of packets sent in p seconds. However, $\alpha_C = 1$ if the cache size is greater than the communication group size $(S_C > SG_{com})$. If there is a hit in the regular cache, no overhead energy is spent.

Weighted energy overhead=Energy overhead per miss.
Probability=0.

Case 2: Miss in the regular cache and the destination is in the same control group. The probability of regular cache miss is $\beta_C = 1 - \alpha_C$. The probability of communication within one control group is $SG_{ctrl}/SG_{com}$. If $SG_{ctrl} > SG_{com}$, i.e., the control group is larger than the communication group, then the communication is always within one control group and the probability is one.

Weighted energy overhead = Energy overhead per miss. (26)

$$\text{Probability} = (2 \times S(k\_req) + S(k\_rep)) \times H_{ctrl} \times E_{nergy} \times \beta_c \times \left(\frac{SG_{ctrl}}{SG_{com}}\right)$$

Case 3: Miss in the regular cache, the destination is outside the control group and hit in the control cache. The probability of control cache hit, given that the number of control groups within the communication group is $N_{BC} = SG_{com}/SG_{ctrl}$, is given by: $\alpha_{CC} = S_{CC}/(N(SG_{com})-1) = S_{CC}/((SG_{com}/SG_{ctrl})-1) = SG_{ctrl} \times S_{CC}/(SG_{com}-SG_{ctrl})$. However, if $SG_{ctrl} > SG_{com}/(S_{CC}+1)$, $\alpha_{CC}=1$.

Weighted energy overhead = Energy overhead per miss. (27)

$$\text{Probability} = \{(2 \times S(K\_req) + S(K\_rep))H_{ctrl} + S(K\_repf) \times H_{com}\}$$

$$E_{nergy} \times \beta_C \left(1 - \frac{SG_{ctrl}}{SG_{com}}\right)\left(\frac{SG_{ctrl} \times SG_{com}}{SG_{com} - SG_{ctrl}}\right)$$

Case 4: Miss in the regular cache, the destination is outside the control group, and miss in the control cache. The probability of control cache miss $\beta_{CC} = 1 - \alpha_{CC} = 1 - SG_{ctrl} \times S_{CC}/(SG_{com} - SG_{ctrl}) = (SG_{com} - SG_{ctrl} - SG_{ctrl} \times SG_{com})/(SG_{com} - SG_{ctrl})$ Weighted energy overhead = Energy overhead per miss. (28)

$$\text{Probability} \{(2 \times S(K\_req) + S(K\_rep))H_{ctrl} + S(k\_repf) \times H_{com} + 2 \times S(K\_req) H_{all}\}$$

$$E_{nergy} \times \beta_C \left(1 - \frac{SG_{ctrl} \times S_{CC}}{SG_{com} - SG_{ctrl}}\right)\left(1 - \frac{SG_{ctrl}}{SG_{com}}\right)$$

The total overhead energy of the protocol equals the sum of the contributions of the above four cases. Let the size of the key reply be $S_R$, i.e. $S(K\_rep) = S_R$. And since the size of key request equals the size of key reply forward which is approximately three times the size of the key reply, we have $S(K\_req) = S(K\_repf) = 3S_R$. The total overhead energy $T_E$ is written as several separate equations each for a region bounded by discontinuities: If $SG_{ctrl} > SG_{com}$ then $$T_E = 7 \times S_R \times H_{ctrl} \times E_{nergy} \times \beta_C \quad (29)$$

If $SG_{ctrl} < SG_{com}$ and $SG_{com} < SG_{ctrl}(S_{CC}+1)$ then $$T_E = \left\{7 \times S_R \times H_{ctrl} \times E_{nergy} \times \beta_C \frac{SG_{ctrl}}{SG_{com}}\right\} + \quad (30)$$

$$\left\{(7 \times S_R \times H_{ctrl} + 3 \times S_R H_{com}) \times E_{nergy} \times \beta_C \left(1 - \frac{SG_{ctrl}}{SG_{com}}\right)\right\}$$

If $SG_{com} > SG_{ctrl}(S_{CC}+1)$ then $$T_E = \left\{7 \times S_R \times H_{ctrl} \times E_{nergy} \times \beta_C \frac{SG_{ctrl}}{SG_{com}}\right\} + \quad (31)$$

$$\left\{\left(7 \times S_R \times H_{ctrl} + 3 \times S_R \times H_{com}\right) \times \right.$$

$$\left. E_{nergy} \times \beta_C \left(1 - \frac{SG_{ctrl}}{SG_{com}}\right)\left(\frac{SG_{ctrl} \times S_{CC}}{SG_{com} - SG_{ctrl}}\right)\right\} +$$

$$(7 \times S_R \times H_{ctrl} + 3 \times S_R H_{com} + 6 \times S_R \times H_{all}) E_{nergy} \times$$

$$\beta_C \left(1 - \frac{SG_{ctrl}}{SG_{com}}\right)\left(\frac{SG_{ctrl} \times S_{CC}}{SG_{com} - SG_{ctrl}}\right)$$

We substitute $H_{ctrl}=1$ when $SG_{ctrl} \times H_{com} < SG_{com}$ and $H_{ctrl}=SG_{ctrl} \times H_{com}/SG_{com}$ when $SG_{ctrl} \times H_{com} \geq SG_{com}$ in the above set of equations.

By minimizing $T_E$ with respect to $SG_{ctrl}$, we get a value of $SG_{ctrl}=G_{energy\_opt}$ that minimizes the overhead energy of SECOS. This does not give a closed form solution since there are discontinuities due to $\alpha_C$, $\alpha_{CC}$, and $H_{ctrl}$. The equation can be solved numerically as shown below.

If the above analysis gives a control group size that is smaller than the maximum size calculated in Section 4.1, then we choose that. Else, we are bounded by the maximum control group size. Mathematically, the chosen control group size is $SG_{ctrl}=\min(G_{energy\_opt}, G_{max})$.

FIG. 33 presents a numerical solution for the optimal control group size for optimizing the total power consumption for a network of 2000 nodes with $H_{all}=100$, $H_{com}=10$, $SG_{com}=200$, $\beta_c=0.2$, $E_{nergy}=100$ pJ, $S_R=128$ bit, and three different values for $S_{CC}$ 1, 4, and 9. As FIG. 33 shows, the optimal group size occurs when $SG_{ctrl}=SG_{com}/(S_{CC}+1)$. The consumed power starts very high for small control group sizes relative to the communication group size because a large portion of the communication goes through the costly inter-group communication. As the control group size increases, the power decreases due to the decrease in the inter-group communication to the point where the number of control groups within the communication group equals the size of the control cache. Thus, decreasing the number of control groups, by increasing the control group size beyond this point does not provide any additional gains since all inter-group communication hits in the control cache. Increasing the control group size after this point starts increasing the power linearly due to the increase in the average number of hops to the control node within the same control group. In our analysis, the increase in the number of hops is assumed to be linear with the size of the control group.

5 Experiments & Results

We build simulation models for SECOS and SPINS using the network simulator, ns-2. We generate a grid topology for the sensor field and distribute the nodes randomly on it. We distribute the nodes into control groups based on geographical location and place the base station at the top right corner of the field. We simulate 9 different communication patterns by changing the communication group size and the average percentage of communications that go within that group, for example 90/10 communication means that 90% of the destinations are chosen from within the communication group while the rest are picked randomly from the whole network. Four different values of the relative size of the communication and control group are chosen for the experiment—0.5, 1, 2, and 4. The simulation parameters used are shown in Table 2.

We measure two parameters for both SECOS and SPINS: the total overhead energy due to key management and the average end-to-end delay of data packets. The end-to-end delay of a data packet is the sum of the delay of key management and data transmission delay. For the plots, we use the ratio of the SPINS value to the SECOS value. A higher value on the plot implies better performance by SECOS with a value of one being the crossover point.

In the first experiment, we vary the size of the regular cache at each sensing node and observe the output parameters for 4 different sizes of the communication group. The 100%:0% and 90%:10% communication patterns show identical trends but the 90%:10% case is less favorable to SECOS because occasionally the destinations could be far, outside the control group. Focusing on the less favorable 90%:10% case, we show the results in FIGS. 34(a) and (b).

Note that in these results, the two energy consuming but security enhancing parts of SECOS are simulated, namely, the periodic refreshment of the session keys, and the periodic change of the control node. From these graphs we find that SECOS outperforms SPINS both in terms of saving energy and reducing end-to-end delay. SECOS reduces the energy consumption by a factor ranging from 1.2 to 5.7, depending on the communication pattern and the cache size.

If the cache can store the keys of all the nodes that a node may communicate with, SPINS performs comparably in energy to SECOS. But this is inadvisable from the point of view of forward security since a number of old sessions may be exposed if the node gets compromised. If we use the most secure configuration with no cache, SECOS has a 2.8-5.7 fold energy reduction. As the cache size increases, the need for key exchange decreases and thus the difference between SECOS and SPINS decreases until the point when the cache can hold all the needed keys. For the simulation parameters here, the maximum benefit to SECOS is when the control group size equals the communication group size. As the communication group size increases beyond this, SECOS is favored less and less. The difference between SECOS and SPINS decreases as more inter-group communication takes place and this process is more energy consuming in SECOS than in SPINS. However, a reasonable sized control cache as used in these experiments still ensures that SECOS performs better than SPINS. This is explained by the fact that the control cache eliminates the necessity of a control node to create a new secure channel with another control node using the base station as the intermediary for every inter-group communication. It is seen that the difference between SECOS and SPINS decreases more sharply for $SG_{com}/SG_{ctrl}=0.5$ and 1. This is due to the fact that for these ratios, SECOS initially far outperformed SPINS with small cache sizes. The trend in delay is identical to that for the energy overhead. The reason behind the lower energy con-

TABLE 2

| Simulation Parameters for Evaluation | | | |
|---|---|---|---|
| Bandwidth | 40 Kbps | Control group size ($SG_{ctrl}$) | 10 |
| Transmission range in meters | 50 | Ring cache size | 20 |
| Number of nodes in the sensor field | 200 | Regular cache size ($S_C$) | 0, 5, 10 |
| The topology in square meters | 120 × 600 | Simulation Time | $10^5$ s |
| Frequency of destination change ($\mu$) | 20 s | Frequency of control node change ($T_{ctrl}$) | 200 s |
| Frequency of packet generation ($\lambda$) | 5 s | Frequency of session key refreshment | 200 s |
| Number of control groups | 20 | Control cache size | 5 | sumption is that the number of hops to exchange the keys is lower, which translates directly to a lower delay.

Next, we consider the communication pattern where any node can talk to any other node in the sensor field, which is referred to as all-to-all communication. The results are shown in FIG. 35(a). In all-to-all communication, the energy ratio decreases as the cache size increases for a reason similar to that in the other communication patterns. However, it is seen that the reduction becomes flat beyond 10 cache entries. With 20-entry control cache, which effectively mimics an infinite cache, SECOS consumes 58% less energy and incurs 8.8% less delay. This indicates that even if the possibility of a sensing node being compromised can be disregarded, and the cache size made arbitrarily large, SECOS outperforms SPINS. This is explained by the fact that relative to the number of control groups in the entire network, the control cache is large enough that SECOS does not have to resort frequently to the expensive inter-group communication. In a real-world deployment, it is likely that the communication group of a node will not span too many control groups, since a node is unlikely to communicate frequently with nodes geographically very distant from it. Therefore, with reasonable control cache sizes, SECOS will perform well.

Finally, we bring out the overhead SECOS incurs due to two mechanisms for improving security, namely refreshment of session keys, and change of the control node. FIG. 35(b) shows that the energy overhead of SECOS is 25% compared to SECOS-no-refresh when there is no cache. Relative overhead of SECOS with respect to SECOS-no-refresh increases as the cache size increases since SECOS increasingly sees the performance impact of purging the cache. At higher cache sizes, 93% energy may be saved if refreshment and control node change are suppressed. The reduction in delay is about 9% at high cache sizes.

6 Conclusions

SECOS, a key management protocol for resource constrained sensor networks, divides the sensor field into control groups with a control node in each group. Key exchange between nodes within a control group happens through the mediation of the control node while inter-group communication involves establishing a secure channel between two control nodes with the mediation of the base station. The keys are refreshed and the control nodes changed periodically to ensure higher security. Simulation runs are conducted to bring out the difference in overhead energy expended and data delay between SECOS and SPINS. SECOS is seen to perform better under a wide variety of communication patterns and cache sizes. A security analysis of SECOS is presented and comparison performed with previous protocols. The analysis shows that SECOS can outperform these protocols in terms of the number of compromised nodes that it can tolerate. A mathematical analysis is performed to determine the optimal control group-size in terms of energy overhead. An upper and a lower bound are derived based on the memory, computational, and bandwidth constraints, the level of security tolerance afforded, and the energy expended in key management.

The issue of when to trigger the key refreshment and control node change is addressed and involves monitoring anomalous behavior in the network, such as abnormal traffic patterns, which may indicate a security breach. A second issue is the determination of the control node. It is desirable that this be a trusted entity to avoid the energy overhead of changing a control node. The protocol also preferably uses collaborative monitoring of a sensor node's behavior by its neighbors to determine the trustworthiness of the node.

The following thesis and paper are hereby incorporated by reference in their entireties:
1. Khalil, Issa, "Mitigation of Control and Data Traffic Attacks in Wireless Ad-Hoc and Sensor Networks," Ph.D. Thesis, Purdue University, West Lafayette, Ind., May 2007.
2. Khalil, I., Bagchi, S., and Shroff, N., "Analysis and Evaluation of SECOS, a Protocol for Energy Efficient and Secure Communication in Sensor Networks". *Elsevier Journal of Ad Hoc Networks*, Vol. 5, No. 3, April 2007, pp. 360-391.

Multi-Hop Wireless Sensor Network with Combined Connectivity/Coverage Protocol, Push-Pull Communication Protocol, and Integrated RFID System Another aspect of the present invention has as one application the monitoring and controlling of processes involved in a pharmaceutical manufacturing environment, and a preferred embodiment of the invention uses a reconfigurable wireless sensor network (WSN) and a radio frequency identification (RFID) system. The goals in such an application are to provide real time monitoring of the environmental parameters in the pharmaceutical manufacturing plant areas where raw materials are received and processed to make the medicinal drugs, and take necessary repair action through interfacing with the building's environment control system. FDA regulations termed as current Good Manufacturing Practices (cGMP) mandate tight control of the environment and corrective action if the parameters go out of spec during the processing of any batch of raw materials. Current state-of-the-art practice is to employ costly data loggers that are wired and from which data is collected typically once in several days or a week. There exists no feature for taking proactive corrective action, leading to waste of raw materials. Also the process of collecting the monitored data is human intensive, leading to a decrease in the facility utilization. The existing technologies used for monitoring in the pharmaceutical industry are estimated to cost 6.5% of sales, which translates to a current industry cost of $16.25 billion dollars.

Embodiments of the present invention are described herein in the context of a facility that provides non-sterile current Good Manufacturing Practices (cGMP) manufacturing of, for example, clinical trial and small-scale commercial materials such as pharmaceutical products. In a highly regulated industry, there are many steps that must be performed and precautions taken to ensure that incoming raw materials are handled appropriately. This involves tight control of the environmental parameters in the facility during the processing of the raw materials in the manufacture of the pharmaceutical products. It is required that anomalies in the environmental parameters be quickly detected and contained with the goal of minimizing the number of batches of finished product that must be analyzed and evaluated to perhaps determine the disposition of the product.

To address such challenges and others, one preferred embodiment of the present invention uses Radio Frequency Identification (RFID) and wireless sensor network (WSN) technology. RFID is a wireless identification and data capture technology that includes three primary components: a transponder or a tag, a transceiver or a reader, and a data collection device. The tag is an integrated circuit that is encoded with an identification number that may send and receive information to and from the transceiver via an antenna. We are concerned with passive tags that must use the radio signal emitted from the reader to send information back to it. The reader is composed of a radio frequency module, a control unit, and an antenna that is used to interrogate and communicate with the tags. The data collection device acts as the repository of data gathered by multiple readers. A WSN is composed of devices called sensor nodes that are small, power-efficient, battery-powered nodes with short-range radio communication capability. They have the capacity for computation (through a low complexity on-board microprocessor) and for sensing different parameters of the surrounding physical space. The system advantageously monitors environmental parameters—such as temperature, humidity, barometric pressure, and particulate matter concentration—from a multitude of points in the facility, thereby forming a continuous sampling space. While the sensing range of each node is limited, they can be placed closely spaced together due to the small form factor, lack of infrastructure requirement, and comparatively lower cost. The system preferably integrates an RFID system with an energy optimized WSN having customized scalable communication protocols in order to provide an intelligent infrastructure tailored to pharmaceutical manufacturing plants, for example, that can monitor, reason about, and generate alerts based on application-specific requirements and dynamic environmental conditions within a facility.

For example, RFID readers may be located at a loading dock to read passive RFID tags on incoming raw material containers and interface with the WSN system to regulate the environmental condition required for the specific raw material. A back-end server will act as the point where a user can see the monitored data visually and also as the intermediary for communication from the RFID system to the WSN system.

Combined Connectivity/Coverage Protocol

The monitoring network preferably operates for extended periods of time without human intervention. The WSN nodes desirably have long battery lifetimes, due in part to operations being optimized to minimize the amount of energy consumed. A fundamental technique for achieving energy efficiency is to put the nodes in a sleep mode where the power consumption is two to three orders of magnitude smaller than in the active mode. Certain embodiments of this invention impose requirements that necessitate specific design tradeoffs in this energy optimization strategy. First, it is important that the entire physical space be covered, i.e., every point in the monitored space must be within the sensing range of some WSN node. Additionally, for robustness to failures of some nodes (which are by nature quite failure prone), each point must be within the sensing range of multiple nodes, called K-covered (implying K nodes cover each point). Second, it is important that the sensed parameters can be communicated through multi-hop communication to the back-end server for storage, processing, and further action. Therefore, the entire network must be connected with all nodes capable of reaching the server. This property, called connectivity, depends on the transmission range of the nodes. Additionally, for reliability, the network must be K-connected, i.e., it should still remain connected if any K nodes fail (where K is a design parameter). Third, the network should have an approximately uniform drain of energy of nodes in a geographically proximate location, i.e., the load on the network should be efficiently balanced. This prevents the network from losing connectivity earlier than it should and enables the replacement of multiple nodes (or their batteries) at the same time during a period of planned maintenance.

The protocol simultaneously provides K-connectivity and K'-coverage in a decentralized manner. The duty cycle for sensing may be higher than that for communication, and therefore one optimization is to activate the sensing functionality while the communication functionality stays asleep. As an additional source of energy, the system interfaces solar cells with the sensor nodes. The solar cells are preferably augmented with regular batteries. The system also extends network lifetime by employing energy-efficient routes across the multi-hop sensor network, with the objective of achieving the right balance between using a smaller transmission power (resource conservation) and avoiding routes (load balancing) that are low on battery. One energy-efficient routing algorithm employs techniques described in the following papers regarding the Energy-Opportunistic Weighted Minimum Energy (E-WME) algorithm that is shown to maximize the network lifetime among all online algorithms: L. Lin, N. B. Shroff, and R. Srikant, "Power Aware Routing for Multi-hop networks with Energy Replenishment" in the 38th Conference on Information Sciences and Systems (CISS), Mar. 17-19, 2004, Princeton, N.J.; and L. Lin, N. B. Shroff, and R. Srikant "Asymptotically Optimal Power-Aware Routing for Multihop Wireless Networks with Renewable Energy Sources," in the proceedings of IEEE INFOCOM'05, Miami, Fla., March 2005. This solution works with systems with and without solar cells, and can be implemented as a reactive or a proactive routing algorithm. An extension of this work which incorporates interference from other network nodes is described in the following paper (hereby incorporated by reference) and is preferably included in the algorithm of the present invention: S. Kwon and N. B. Shroff, "Energy-Efficient Interference-Based Routing for Multi-hop Wireless Networks" IEEE INFOCOM 2006.

Preferably, the protocol simultaneously provides a given level of coverage and connectivity in the network, and is reconfigurable through lightweight localized transmission of control information to provide an application specified level of connectivity and coverage.

Push-Pull Based Scalable Communication Protocol

The system includes a protocol for communication between the sensing nodes and the back-end server. The nodes are organized in a hierarchy with the server at the root. The data may flow from any node in the tree to the root. Since the network is K'-covered, the basic communication protocol can generate much redundant communication. It is desired to suppress the redundant communication containing environmental parameters for a region that are already available from a different WSN node. The network may have variable density—highly dense in regions where accurate monitoring of the physical parameters is needed and less so in other regions. The physical parameters being measured—temperature, pressure, humidity, etc.—are not point parameters, such as a source of light, but are diffused parameters. They can therefore be sensed by multiple sensor nodes even if they are not co-located. An algorithm executes on the backend server that correlates information from multiple sensor nodes to come up with a profile of each of the environmental parameters through the facility. The monitored region may be large (thousands of square feet) and since the sensing radius is typically of the order of a few feet, a large number of nodes may be deployed in the WSN. The communication protocol is therefore able to scale to a large number of nodes.

The preferred communication protocol is a hybrid push-pull protocol. In a push-based mechanism, sensors push data proactively towards the sink (i.e., the intended destination of the monitored data). Examples are flooding and directed diffusion, as described in Intanagonwiwat, C., Govindan, R., Estrin, D., Heidemann, J. and Silva, F., "Directed Diffusion for Wireless Sensor Networking," IEEE/ACM Trans. Netw., 11 (1). 2-16, which is hereby incorporated by reference. In a pull-based mechanism, the sink(s), oftentimes mobile, queries the sensors for data, as described in the following papers, which are hereby incorporated by reference: Kim, S., Son, S. H., Stankovic, J. A., Li, S. and Choi, Y., "SAFE: a data dissemination protocol for periodic updates in sensor networks," *Distributed Computing Systems Workshops, 2003. Proceedings. 23rd International Conference on,* (2003), 228-234, and Ye, F., Luo, H., Cheng, J., Lu, S. and Zhang, L, "A Two-Tier Data Dissemination Model For Large-Scale Wireless Sensor Networks," *Proceedings Of The 8th Annual International Conference On Mobile Computing And Networking,* ACM Press, Atlanta, Ga., USA, 2002, 148-159. Neither class of protocols leverages the inherent redundancy in the data sources of a K-covered network in order to minimize the amount of data exchanges. SPIN initially proposed the idea of exchanging compact data descriptors called meta-data amongst the nodes, prior to data exchange to reduce the redundant data transmissions. See, e.g., Kulik, J., Heinzelman, W. and Balakrishnan, H., "Negotiation-Based Protocols for Disseminating Information In Wireless Sensor Networks," *Wirel. Netw.,* 8 (2/3). 169-185, which is hereby incorporated by reference. Thus, a three-way handshake between the source and the destination occurs through advertisement of data (broadcast by source), request for data (destination to source), and data transmission (source to destination). The key point is only interested nodes need request for the data after examining the meta-data in the advertisement. A protocol called Shortest Path Minded SPIN (SPMS) extends SPIN by performing multi-hop communication for the request and the data, within a node's transmission radius termed as zone. See, e.g., Khanna, G., Bagchi, S. and Wu, Y.-S., "Fault Tolerant Energy Aware Data Dissemination Protocol In Sensor Networks," 2004 *International Conference on Dependable Systems and Networks,* (2004), 795-804, which hereby incorporated by reference. SPMS reduces the energy and the delay compared to SPIN and is designed to be resilient to the failures of the intermediate relay nodes.

The present invention provides a further optimized protocol that can leverage overheard communication in a neighborhood. Thus a node may suppress its data exchange if its neighbor is known to have already obtained the monitored parameter for the same geographical region. The hierarchical communication pattern in protocols such as in the following papers is modified such that no node has to perform a specialized role (such as aggregating and forwarding all the data) throughout its lifetime: Heinzelman, W. B., Chandrakasan, A. P. and Balakrishnan, H., "An application-specific protocol architecture for wireless microsensor networks," *IEEE Transactions on Wireless Communications,* 1 (4). 660-670, and Lindsey, S., Raghavendra, C. and Sivalingam, K. M., "Data Gathering Algorithms In Sensor Networks Using Energy Metrics," *IEEE Transactions on Parallel And Distributed Systems,* 13 (9). 924-935, which are hereby incorporated by reference. The choice of the node to play the specialized role may be made dynamically using parameters such as the available energy, the fidelity of its previous actions, and the position of the node in the network. The hybrid push-pull protocol of the present invention is integrated with existing pure push and pure pull based protocols, and includes triggers for switching from one to the other.

Integration of RFID System and WSN for Feedback Control

The system preferably includes one or more RFID readers, e.g., at a loading dock for gathering information about raw materials entering the warehouse. At the most basic level the environmental requirements for processing different raw materials may vary. Therefore, the environmental control requirements will depend on the type of raw material and the current step in the manufacturing process. This leads to the requirement of "re-tasking" the WSN based on the specific raw material being processed. The re-tasking may include changing the frequency of monitoring the environment, modifying the conditions for generating an alert, or changing the level of redundancy required (either in connectivity or coverage). These may be done immediately on arrival of the raw material. Criteria for multiple types of raw materials may be fed into the system at the same time and the WSN is responsible for ensuring that conditions for all the raw materials are satisfied. The system allows timely action to be taken when the environment specifications go out of the requirement for the processing of the raw material, using an interface to systems used for controlling fan, heating-cooling, humidity, etc. in the facility. The goal is to enable direct control of these systems through software without operator intervention.

The present invention an integrated RFID system and WSN for environment monitoring. It uses a back-end server in a factory or other facility as the intermediary for communication from the RFID system to the WSN system. This enables the system to remain consistent (i.e., independent nodes do not do conflicting activities) through cohesive actions directed by software running at the centralized site (the server). The software that runs on the server is interfaced with the existing environmental control systems in the facility.

The system may be designed to work with passive RFID tags on the raw material containers, and moderate to highly sophisticated RFID readers. The integrated system works with different kinds of raw material introduced into the facility, some of them concurrently. Re-tasking of the WSN may be achieved through a multi-hop network reprogramming protocol, such as that described above.

The following papers are hereby incorporated by reference in their entireties:
1. Cabuk, S., Malhotra, N., Lin, L., Bagchi, S., Shroff, N., "Analysis and Evaluation of Topological and Application Characteristics of Unreliable Mobile Wireless Ad-hoc Network," 10th IEEE Pacific Rim Dependable Computing Conference (PRDC '04), March 2004.
2. Khosla, R., Zhong, X., Khanna, G., Bagchi, S., Coyle, E., "Performance Comparison of SPIN based Push-Pull Protocols," IEEE Wireless Communications and Networking Conference (WCNC), Hong Kong, Mar. 11-15, 2007.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

APPENDIX

[I] Timers and Threshold Values

The following table presents a summary of the timers and the threshold values used in SECOS.

| | Name | Description | Tradeoffs |
|---|---|---|---|
| 1 | Session & authentication | When the timer expires, the session and authentication keys are refreshed | A higher value makes it less secure by facilitating |

| Name | Description | Tradeoffs |
|---|---|---|
| key refreshment timer | applying a MAC function on the SC(M, S) XOR-ed with the volatile secret key and concatenated with 1 for the session key and 2 for the authentication key. | cryptanalysis and allowing past communication of a compromised node to be divulged.<br>A lower value makes it energy inefficient. |
| 2 Control node refreshment timer ($T_{ctrl}$) | When the timer expires the control node is changed. A new control node is selected and delivered the list of control group members.<br>The old control node returns to the normal sensing mode. | A higher value makes it less secure in case the control node gets compromised.<br>A lower value makes it energy inefficient. |
| 3 Opinion counter threshold value ($T_{counter\_threshold}$) | When the opinion counter at a node, X, crosses the threshold for a certain monitored node, Y, then X sends the opinion counter value and the ID of Y to the base station | A higher value makes it less secure since many malicious events may not be detected because they do not increment the opinion counter to the threshold value.<br>A lower value makes it energy inefficient. |
| 4 Alert collection timer ($T_{suspect\_collection}$) | When the timer fires, the base station either starts correlating the received alerts if they are sufficient, or polls certain nodes to send their opinion counters to collect sufficient alerts. | A higher value allows sufficient alerts from most involved observer nodes to arrive to the base station. But it makes the network less secure by delaying the malicious event detection and response. |
| 5 Trust level threshold ($T_{trust\_level}$) | When the trust level of a node, X, in the network goes below the threshold, the base station declares X as a malicious node. | A higher value makes it more secure since only highly trusted nodes are allowed in the network. But it may result in high node revocation due to false alarms by natural faults and communication errors. |

[II] Notations

This table provides a summary of the notations used throughout the section regarding SECOSW.

| Acronym | Description | Acronym | Description |
|---|---|---|---|
| S | A generic sensor node | C | A generic control node |
| M | The base station | N | The total number of nodes in the network |
| D | The density of the nodes in the network | R | The communication range |
| MAC | Message Authentication Code | E(K, X) | Encryption of message X using key K |
| MAC(K, Z⊕X∥Y) | The application of the MAC algorithm, keyed by key K, to the result of the concatenation of Y with the result of Z XOR-ed with X | H(X) | The hash value of the message X |
| $MK_{AB}$ | The master key shared between A and B | $VK_{AB}$ | The volatile secret key shared by A and B |
| $SK_{AB}$ | The session (encryption/decryption) key shared between A and B | $AK_{AB}$ | The Authentication (MAC) key shared between A and B |
| $RK_{AB}$ | The random number generator key shared between A and B | $K_{AB}$ (= $K_{BA}$) | Any secret key ($MK_{AB}$, $VK_{AB}$, $SK_{AB}$, $AK_{AB}$, $RK_{AB}$) shared between A and B |
| $SG_{ctrl}$ | The size of the control group (i.e., the number of nodes in the control group) | S(Pkt) | The size of the Pkt packet. Pkt is one of the packets defined in Table 1 |
| $SG_{com}$ | The communication group size | $S_R$ | Size of the key reply (i.e., $S_R = S(K\_rep)$) |
| $S_{Key}$ | The amount of storage required to store a cryptographic key such as the session key | $H_{ctrl}$ | The average number of hops between a pair of nodes in a control group |
| $H_{com}$ | The average number of hops between a pair of nodes in the communication group | $H_{all}$ | The average number of hops between a pair of nodes in the whole network |

-continued

| Acronym | Description | Acronym | Description |
| --- | --- | --- | --- |
| $N_{BC}$ | The number of control groups within one communication group | $N_G$ | The number good (uncompromised) nodes in the network |
| $N_C$ | The number of compromised nodes in the network | $N_B$ | The number of control groups in the network |
| MalC(i, j) | The malicious counter at node i about node j | $MalC_{max}$ | Maximum value of the malicious counter |
| $N_m(i)$ | The number of monitors of node i that report their opinions to the base station | $T_{counter\_threshold}$ | The threshold value of the malicious counter above which a node becomes suspicious |
| $L_{assurance}$ | The level of detection assurance at a monitoring node a bout a suspected event | $L_{trust}(i)$ | The trust level of node i that is maintained by the base station |
| $T_{trust\_level}$ | The trust level threshold beyond which the base station identify a node as malicious | Sync_diff | The maximum acceptable difference between the counters shared by a pair of nodes in the network |
| $T_{suspect\_collection}$ | The time the base station waits to collect more opinions a bout a suspected event starting from time of the first arrived opinion | SC(i,j) | The sending counter value of node i that is shared with node j (SC(i, j) = RC(j, i)) |
| RC(i,j) | The receiving counter of node i that is shared with node j (RC(i, j) = SC(j, i)) | $Counetr_{ij}$ | Refers to both SC(i, j) and RC(i, j) |
| $T_{Comp}$ | The time that is minimally required to compromise a node | $E_1$ | The event that the control node of a certain control group is compromised |
| $E_2$ | Thee event that there is at least one compromised node in the bounding path between a pair of nodes in the control group | $E_3$ | The event that the control node lies in the bounding path between a pair of nodes in the same control group |
| $P_{C(A-B)}$ | The probability of compromising the link between A and B | $N_{bp}$ | The number of nodes within the bounding path between a pair of nodes in the same control group |
| $P_{Lerr}$ | The probability of natural error in a packet over a link between a pair of neighbor nodes | $P_{CD}$ | The probability that a node is compromised and dropping packets |
| $S_C$ | The regular cache size at each node | $S_{CC}$ | The control cache size at each node |
| $\alpha_C$ | The hit rate in the regular cache (i.e., the probability of finding an element in the cache) | $\beta_C$ | The miss rate in the regular cache (i.e., the probability of not finding an element in the cache, ($\beta_C = 1 - \alpha_C$) |
| $\alpha_{CC}$ | The hit rate in the control cache (i.e., the probability of finding an element in the cache) | $\beta_{CC}$ | The miss rate in the control cache (i.e., the probability of not finding an element in the cache, $\beta_{CC} = 1 - \alpha_{CC}$) |
| $T_{ctrl}$ | The average time a node stays in the control role for a single round | $E_{nergy}$ | The energy for the transmission and the reception of a single bit |
| $G_{Comp}$ | The maximum control group size under the computational limitation only | $G_{BW}$ | The maximum control group size under the bandwidth limitation only |
| $G_{SEC}$ | The maximum control group size under an acceptable number of compromised sessions. | $G_{STORE}$ | The maximum control group size under the storage limitation only |
| $\mu$ | The reciprocal of the rate of the Poisson process used for changing the destination of a packet (i.e., a new destination is selected on average every ix time units) | $\lambda$ | The reciprocal of the rate of the Poisson process used for data packet generation (i.e., one packet is generated on average every $\lambda$ time units) |
| BW | The channel bandwidth | $N_{nbr}$ | The average number of one hop neighbors of a node |
| $T_E$ | The total overhead energy | | |

[III] Message Overhead

In this section, we analyze the overhead in terms of control messages for each of the operations in SECOS. The overhead is calculated as the product of the number of bytes and the number of hops.

Some Notation:

Let $N_{nbr}$ be the average number of neighbors of a node, $H_{cmax}$ be the maximum number of hops between any two nodes in the control group, and D be the density of nodes in the network. Further, R is the range of transmission, and $H_{com}$, $H_{ctrl}$, and $H_{all}$ are the average number of hops between nodes within the same communication group, between a node and the control node, and between a node and the base station, respectively.

We now calculate the overhead involved in the various functions of SECOS.

1. Building the Neighbor List:

(i) One HELLO message from a node to its neighbors, (ii) $N_{nbr}$ HELLO reply messages from the neighbors to the node, and (iii) one message containing the list of neighbors from the node to the base station. The size of each HELLO or the HELLO reply message is 9 bytes; 8 for the IDs of the sender and the receiver, and one holding the packet data. The size of the neighbor list packet is $4(N_{nbr}+2)$ bytes. The HELLO message travels one hop where the neighbor list message travels $H_{all}$ hops on average to the base station. The total overhead in byte-hop product equals $9(N_{nbr}+1)+4(N_{nbr}+2)H_{all}$.

2. Setting the Control Node:

(i) One message holding the list of members of the control group from the base station to the control node, (ii) one message for control announcement from the control node to the members of control group, and (iii) one message for neighbor list announcement from the control node to its neighbors. The member list message travels $H_{all}$ hops on average and its size equal to $12 \times SG_{ctrl}$ bytes; 4 bytes for each member node ID and 8 bytes for the session key between the member and the control node. The size of the control announcement is 5 bytes and it travels $H_{cmax}$ hops. The number of nodes involved in broadcasting the announcement depends on the range of transmission R and density of nodes in the network D. This number equals to $\pi \times (R \times H_{cmax})^2 D$. The size of the neighbor list is $4 N_{nbr}$ and it travels one hop. The total overhead in byte-hop product equals $12 \times SG_{ctrl} \times H_{all} + 5\pi(R \times H_{cmax})^2 D + 4(N_{nbr}+1)$.

3. Key Establishment within the Same Control Group:

(i) One message holding the key from the initiator to the target, (ii) one message holding the Envelop from the initiator to the control node, and (iii) one message holding the Envelop from the control node to the target. The message holding the key travels $H_{ctrl}$ hops on average and its size equals to 16 bytes, 8 bytes for the ID's of the initiator and the target and 8 bytes for the key. The message holding the Envelop also travels $H_{ctrl}$ hops on average and its size equals 44 bytes, 8 bytes for the ID's of the initiator and the target of the communication, 8 bytes for the ID's of the intermediate sender and receiver of the message, 8 bytes for the key, 10 bytes for the hash value of the key, and 10 bytes for the MAC value, which provides freshness to the message. The total overhead in byte-hop product equals $104 \times H_{ctrl}$.

4. Key Establishment Across Control Groups with a Shared Key Already Exists Between the Corresponding Control Nodes:

(i) One message holding the key from the initiator to the target, (ii) one message holding the Envelop from the initiator to its control node, (iii) one message holding the Envelop from the control node of the initiator to the control node of the target, (iv) one message holding the Envelop from the target's control node to the target. Message (i) travels $H_{com}$ hops on average and its size equals to 16 bytes, 8 bytes for the ID's of the initiator and the target and 8 bytes for the key. Message (ii) or message (iv) travels $H_{ctrl}$ hops on average and its size equals to 44 bytes, 8 bytes for the ID's of the initiator and the target, 8 bytes for the ID's of the intermediate sender and receiver of the message, 8 bytes for the key, 10 bytes for the hash value of the key, and 10 bytes for the MAC value, which provides freshness to the message. Message (iii) travels $H_{con}$, hops on average and its size equals to 44 bytes, 8 bytes for the ID's of the initiator and the target, 8 bytes for the ID's of the intermediate sender and receiver of the message, 8 bytes for the key, 10 bytes for the hash value of the key, and 10 bytes for the MAC value, which provides freshness to the message. The total overhead in byte-hop product equals $60 \times H_{com} + 88 \times H_{ctrl}$.

5. Key Establishment Across Control Groups with No Shared Key Between the Corresponding Control Nodes:

The same messages as in the previous case in addition to (i) one message holding a key from the initiator's control node to the base station and (ii) one message holding the same key from the base station to the target's control node. The size of each of these messages equals to 16 bytes, 8 bytes for the ID's of the initiator and the target and 8 bytes for the key, each of them travels $H_{all}$ hops. The total overhead in byte-hop product equals $32 \times H_{all}$.

6. Neighbor Watch and Control Node Monitoring:

One message from a sensor to the base station holding the opinion counter. The size of the message is 13 bytes; 8 bytes for the IDs of the sender and the base station, 4 bytes for the ID of the monitored node, and one byte for the counter. The message travels $H_{all}$ hops on average. The total overhead in byte-hop product equals to $9 \times H_{all}$. This is the overhead when a suspicious node is detected.

We claim:

1. A method of reprogramming for a wireless sensor network using a three-way handshake protocol for transfer of new code from an originator of new code to a plurality of sensor nodes in the network, said handshake protocol including advertising, request and data transfer messages, said method comprising:

segmenting said new code into multiple pages each split into multiple packets;

performing a three-way handshake in units of a page, transmitting each page of said new code in units of a packet; and enabling each node to receive pages of said new code out of order from multiple sources;

propagating a warning message containing information about the nature of new code to be transmitted, said warning message including network topology information indicative of the routing of the warning message from the originator;

at each node which receives the warning message, estimating the propagation time from the originator based on the network topology information contained in said warning message and, based on the propagation time length, conditionally disabling RF circuitry to reduce power consumption during a corresponding sleep period;

each node updating the network topology information indicative of the routing of said warning message and forwarding the updated warning message to other nodes in the network; and each node waking up at the end of said sleep period and initiating a three-way handshake protocol for transfer of code, said node receiving advertising messages from other nodes relating to new code, sending request messages for needed code, receiving needed code, and sending advertising messages to other nodes in the network relating to received code.

2. The method of claim 1, wherein a node is adapted to forward code to neighboring nodes once it has one page of a new version of code.

3. The method of claim 1, wherein said originator is a base station for said plurality of sensor nodes, and wherein said new code is broadcast from said base station and propagated by sensor nodes through said wireless sensor network to other sensor nodes in the network via multiple hops from said base station.

4. The method of claim 1, wherein each node cyclically turns its RF circuitry on and off during a quiescent phase between introductions of new code, the off time during each cycle based on the number of neighboring nodes in the network.

5. The method of claim 4 wherein each node is awake at least half the time.

6. The method of claim 5, further comprising a pull-based mechanism for servicing new nodes in the network, each new node alerting other nodes by advertising its current code, other nodes responding by advertising available new code.

* * * * *